United States Patent
Raether et al.

(10) Patent No.: US 9,527,027 B2
(45) Date of Patent: *Dec. 27, 2016

(54) FILTER ASSEMBLY; COMPONENTS THEREFOR; AND, METHODS

(71) Applicant: Donaldson Company, Inc., Minneapolis, MN (US)

(72) Inventors: Thomas Raether, St. Louis Park, MN (US); Benny K. Nelson, Bloomington, MN (US); Jared Niccum, Lafayette, IN (US)

(73) Assignee: Donaldson Company, Inc., Minneapolis, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/274,887

(22) Filed: May 12, 2014

(65) Prior Publication Data

US 2015/0007534 A1 Jan. 8, 2015

Related U.S. Application Data

(63) Continuation of application No. 13/685,030, filed on Nov. 26, 2012, now Pat. No. 8,721,757, which is a
(Continued)

(51) Int. Cl.
*B01D 46/52* (2006.01)
*B01D 46/10* (2006.01)
*B01D 46/24* (2006.01)

(52) U.S. Cl.
CPC ........... *B01D 46/526* (2013.01); *B01D 46/103* (2013.01); *B01D 46/2411* (2013.01); *B01D 46/522* (2013.01); *B01D 46/525* (2013.01)

(58) Field of Classification Search
CPC ... B01D 46/522; B01D 46/525; B01D 46/526; B01D 46/103; B01D 2275/206
See application file for complete search history.

(56) References Cited

U.S. PATENT DOCUMENTS 710,264 A    12/1902 Sly
2,044,221 A   6/1936 Myers et al.
(Continued)

FOREIGN PATENT DOCUMENTS

DE        296 13 098      10/1996
DE     10 2007 005613      8/2007
(Continued)

OTHER PUBLICATIONS

International Search Report corresponding to PCT/US2009/055396 mailed Oct. 30, 2009.

*Primary Examiner* — Robert Clemente
(74) *Attorney, Agent, or Firm* — Merchant & Gould P.C.

(57) ABSTRACT

Air filter assemblies and components therefor are described. The air filter assembly typically includes an air filter cartridge. Air filter cartridges including a media pack comprising at least a first stack of single facer strips are described. In examples described, at least a portion of the first stack of single facer strips is arcuate. Air filter assemblies are characterized that are configured, for example, to advantageously use such air filter cartridges. Example air filter assemblies are described that include pulse jet air cleaning systems.

20 Claims, 51 Drawing Sheets

Related U.S. Application Data continuation of application No. 12/583,965, filed on Aug. 27, 2009, now Pat. No. 8,317,890.

(60) Provisional application No. 61/190,495, filed on Aug. 29, 2008.

(56) References Cited

U.S. PATENT DOCUMENTS

| | | |
|---|---|---|
| 2,329,356 A | 11/1943 | Moore |
| 2,731,155 A | 1/1956 | James |
| 2,853,153 A | 9/1958 | Sexton |
| 2,914,785 A | 12/1959 | Ela |
| 2,966,959 A | 1/1961 | Neumann |
| 3,058,594 A | 10/1962 | Hultgren et al. |
| 3,166,391 A | 1/1965 | Keser |
| 3,383,841 A | 5/1968 | Olson et al. |
| 3,393,498 A | 7/1968 | Shoen |
| 3,402,531 A | 9/1968 | Farr |
| 3,423,908 A | 1/1969 | Hart |
| 3,434,269 A | 3/1969 | Hyatt |
| 3,507,100 A | 4/1970 | Neumann |
| 3,576,095 A | 4/1971 | Rivers |
| 3,593,503 A | 7/1971 | Andrews |
| 3,691,736 A | 9/1972 | Neumann |
| 3,757,497 A | 9/1973 | Ray |
| 3,816,984 A | 6/1974 | Neumann |
| 3,870,489 A | 3/1975 | Shaddock |
| 3,936,902 A | 2/1976 | Shackleton et al. |
| 3,999,964 A | 12/1976 | Carr |
| 4,002,443 A | 1/1977 | Lorenz |
| 4,009,011 A | 2/1977 | Ross |
| 4,065,341 A | 12/1977 | Cub |
| 4,124,361 A | 11/1978 | Revell |
| 4,127,457 A | 11/1978 | Hirozawa |
| 4,129,429 A | 12/1978 | Humbert et al. |
| 4,138,234 A | 2/1979 | Kubesa |
| 4,204,846 A | 5/1980 | Brenholt |
| 4,214,882 A | 7/1980 | Brenholt |
| 4,217,122 A | 8/1980 | Shuler |
| 4,218,227 A | 8/1980 | Frey |
| 4,225,328 A | 9/1980 | Stiehl |
| 4,233,044 A | 11/1980 | Allan |
| 4,242,115 A | 12/1980 | Harold et al. |
| 4,247,315 A | 1/1981 | Neümann |
| 4,251,246 A | 2/1981 | Andreychek |
| 4,266,953 A | 5/1981 | Matthys et al. |
| 4,266,956 A | 5/1981 | Revell |
| 4,272,262 A | 6/1981 | Britt et al. |
| 4,277,260 A | 7/1981 | Browning |
| 4,290,792 A | 9/1981 | Eckstein et al. |
| 4,298,474 A | 11/1981 | Sillers, Jr. |
| 4,299,597 A | 11/1981 | Oetiker et al. |
| 4,303,423 A | 12/1981 | Camplin et al. |
| 4,306,896 A | 12/1981 | O'Dell |
| 4,322,231 A | 3/1982 | Hilzendeger |
| 4,323,376 A | 4/1982 | Rosenquest |
| 4,331,459 A | 5/1982 | Copley |
| 4,334,900 A | 6/1982 | Neumann |
| 4,359,330 A | 11/1982 | Copley |
| 4,364,251 A | 12/1982 | Nishihara et al. |
| 4,395,269 A | 7/1983 | Schuler |
| 4,407,664 A | 10/1983 | Sillers, Jr. |
| 4,411,674 A | 10/1983 | Forgac |
| 4,452,616 A | 6/1984 | Gillingham et al. |
| 4,482,365 A | 11/1984 | Roach |
| 4,482,366 A | 11/1984 | Camplin et al. |
| 4,498,914 A | 2/1985 | Erickson |
| 4,504,293 A | 3/1985 | Gillingham et al. |
| 4,509,960 A | 4/1985 | Engel |
| 4,514,193 A | 4/1985 | Booth |
| 4,537,608 A | 8/1985 | Koslow |
| 4,560,396 A | 12/1985 | O'Dell |
| RE32,185 E | 6/1986 | Copley |
| 4,622,995 A | 11/1986 | Gillingham |
| 4,637,825 A | 1/1987 | Howeth |
| 4,648,889 A | 3/1987 | Jensen |
| 4,650,506 A | 3/1987 | Barris et al. |
| 4,743,280 A | 5/1988 | Pappas |
| 4,746,340 A | 5/1988 | Durre et al. |
| 4,765,810 A | 8/1988 | Wetzel |
| 4,767,425 A | 8/1988 | Camplin et al. |
| 4,786,293 A | 11/1988 | Labadie |
| 4,822,386 A | 4/1989 | Duchesneau |
| 4,871,380 A | 10/1989 | Meyers |
| 4,895,581 A | 1/1990 | Starling |
| 4,904,282 A | 2/1990 | Stuble et al. |
| 4,925,468 A | 5/1990 | Kishi et al. |
| 4,961,762 A | 10/1990 | Howeth |
| 4,997,556 A | 3/1991 | Yano et al. |
| 5,013,333 A | 5/1991 | Beaufoy et al. |
| 5,042,999 A | 8/1991 | Ernst et al. |
| 5,094,675 A | 3/1992 | Pitt et al. |
| 5,108,604 A | 4/1992 | Robbins |
| 5,128,037 A | 7/1992 | Pearl et al. |
| 5,174,797 A | 12/1992 | Yow, Sr. et al. |
| 5,207,811 A | 5/1993 | Buonpastore |
| 5,223,011 A | 6/1993 | Hanni |
| 5,273,563 A | 12/1993 | Pasch et al. |
| 5,304,351 A | 4/1994 | Tanaka et al. |
| 5,346,533 A | 9/1994 | Jelich et al. |
| 5,391,218 A | 2/1995 | Jorgenson et al. |
| 5,401,285 A | 3/1995 | Gillingham et al. |
| 5,490,930 A | 2/1996 | Krull |
| 5,505,754 A | 4/1996 | Gasser |
| 5,512,074 A | 4/1996 | Hanni et al. |
| 5,562,746 A | 10/1996 | Raether |
| 5,575,826 A | 11/1996 | Gillingham et al. |
| 5,616,171 A | 4/1997 | Barris et al. |
| 5,622,537 A | 4/1997 | Kahlbaugh et al. |
| 5,656,049 A | 8/1997 | Diachuk |
| 5,669,947 A | 9/1997 | Diachuk |
| 5,672,399 A | 9/1997 | Kahlbaugh et al. |
| 5,683,479 A | 11/1997 | Gillingham et al. |
| 5,693,109 A | 12/1997 | Coulonvaux et al. |
| 5,755,842 A | 5/1998 | Patel et al. |
| 5,772,883 A | 6/1998 | Rothman et al. |
| D396,098 S | 7/1998 | Gillingham et al. |
| 5,792,247 A | 8/1998 | Gillingham et al. |
| 5,797,973 A | 8/1998 | Dudrey et al. |
| D398,046 S | 9/1998 | Gillingham et al. |
| 5,803,954 A | 9/1998 | Gunter et al. |
| D399,944 S | 10/1998 | Gillingham et al. |
| 5,820,646 A | 10/1998 | Gillingham et al. |
| 5,830,249 A | 11/1998 | Hori et al. |
| 5,895,574 A | 4/1999 | Friedmann et al. |
| 5,897,676 A | 4/1999 | Engel et al. |
| 5,931,988 A | 8/1999 | LeBlanc et al. |
| D416,308 S | 11/1999 | Ward et al. |
| D417,268 S | 11/1999 | Gillingham |
| D425,189 S | 5/2000 | Gillingham et al. |
| 6,090,173 A | 7/2000 | Johnson et al. |
| 6,099,606 A | 8/2000 | Miller et al. |
| 6,113,674 A | 9/2000 | Graham et al. |
| 6,129,852 A | 10/2000 | Elliott et al. |
| 6,165,355 A | 12/2000 | Coulonvaux et al. |
| 6,179,890 B1 | 1/2001 | Ramos et al. |
| D437,401 S | 2/2001 | Ramos et al. |
| D437,402 S | 2/2001 | Gieseke et al. |
| D439,963 S | 4/2001 | Gieseke et al. |
| 6,210,469 B1 | 4/2001 | Tokar |
| 6,221,122 B1 | 4/2001 | Gieseke et al. |
| 6,235,195 B1 | 5/2001 | Tokar |
| D444,219 S | 6/2001 | Gieseke et al. |
| D447,549 S | 9/2001 | Gieseke et al. |
| D450,827 S | 11/2001 | Gieseke et al. |
| D450,828 S | 11/2001 | Tokar |
| 6,348,084 B1 | 2/2002 | Gieseke et al. |
| 6,348,085 B1 | 2/2002 | Tokar et al. |
| D455,826 S | 4/2002 | Gillingham et al. |
| 6,368,374 B1 | 4/2002 | Tokar et al. |
| D460,169 S | 7/2002 | Anderson et al. |
| D461,003 S | 7/2002 | Gieseke et al. |
| 6,416,605 B1 | 7/2002 | Golden |
| D464,129 S | 10/2002 | Xu et al. |

(56) References Cited

U.S. PATENT DOCUMENTS

| | | |
|---|---|---|
| 6,458,418 B2 | 10/2002 | Langer et al. |
| 6,475,446 B1 | 11/2002 | Horiike et al. |
| 6,485,538 B1 | 11/2002 | Toyoshima |
| 6,517,598 B2 | 2/2003 | Anderson et al. |
| 6,517,919 B1 | 2/2003 | Griffin |
| D473,637 S | 4/2003 | Golden |
| 6,605,131 B2 | 8/2003 | Vanderveen et al. |
| 6,610,126 B2 | 8/2003 | Xu et al. |
| D483,459 S | 12/2003 | DeWit et al. |
| D484,584 S | 12/2003 | Anderson et al. |
| 6,673,136 B2 | 1/2004 | Gillingham et al. |
| 6,676,721 B1 | 1/2004 | Gillingham et al. |
| D497,202 S | 10/2004 | Carter et al. |
| 6,852,141 B2 | 2/2005 | Bishop et al. |
| 6,872,237 B2 | 3/2005 | Gillingham et al. |
| 6,908,494 B2 | 6/2005 | Gillingham et al. |
| 6,966,940 B2 | 11/2005 | Krisko et al. |
| 7,090,711 B2 | 8/2006 | Gillingham et al. |
| 7,282,075 B2 | 10/2007 | Spone et al. |
| 7,329,326 B2 | 2/2008 | Wagner et al. |
| 7,351,270 B2 | 4/2008 | Olson et al. |
| 7,364,601 B2 | 4/2008 | Xu et al. |
| 7,396,375 B2 | 7/2008 | Nepsund et al. |
| 7,396,376 B2 | 7/2008 | Schrage et al. |
| 7,488,365 B2 | 2/2009 | Golden et al. |
| 7,569,090 B2 | 8/2009 | Nelson |
| 7,625,419 B2 | 12/2009 | Nelson et al. |
| 7,655,074 B2 | 2/2010 | Nepsund et al. |
| 7,674,308 B2 | 3/2010 | Krisko et al. |
| 7,682,416 B2 | 3/2010 | Engelland et al. |
| 7,708,797 B2 | 5/2010 | Kuempel et al. |
| 7,713,321 B2 | 5/2010 | Kuempel et al. |
| 7,736,410 B2 | 6/2010 | Kuempel et al. |
| D635,233 S | 3/2011 | Nelson et al. |
| 7,905,936 B2 | 3/2011 | Coulonvaux et al. |
| 7,967,886 B2 | 6/2011 | Schrage et al. |
| 7,972,404 B2 | 7/2011 | Kuempel et al. |
| 7,981,183 B2 | 7/2011 | Nepsund et al. |
| 7,997,425 B2 | 8/2011 | Golden et al. |
| 8,002,869 B2 | 8/2011 | Nepsund et al. |
| 8,012,233 B2 | 9/2011 | Kuempel et al. |
| 8,016,903 B2 | 9/2011 | Nelson et al. |
| D646,369 S | 10/2011 | Nelson et al. |
| 8,034,145 B2 | 10/2011 | Boehrs et al. |
| 8,048,188 B2 | 11/2011 | Widerski et al. |
| 8,062,399 B2 | 11/2011 | Nelson et al. |
| 8,075,648 B2 | 12/2011 | Raether |
| 8,083,825 B2 | 12/2011 | Mosset |
| 8,152,888 B2 | 4/2012 | Nelson |
| 8,157,880 B2 | 4/2012 | Muenkel et al. |
| 8,317,890 B2 | 11/2012 | Raether et al. |
| 8,721,757 B2 * | 5/2014 | Raether et al. ............. 55/521 |
| 2002/0096247 A1 | 7/2002 | Wydeven et al. |
| 2005/0120881 A1 | 6/2005 | Sporre et al. |
| 2006/0112667 A1 | 6/2006 | Sporre et al. |
| 2007/0039296 A1 | 2/2007 | Schrage et al. |
| 2008/0276582 A1 | 11/2008 | Boehrs et al. |
| 2008/0307759 A1 | 12/2008 | Reichter et al. |
| 2009/0064646 A1 | 3/2009 | Reichter et al. |
| 2009/0151311 A1 | 6/2009 | Reichter et al. |
| 2009/0223187 A1 | 9/2009 | Nelson et al. |
| 2009/0301045 A1 | 12/2009 | Nelson et al. |
| 2010/0032365 A1 | 2/2010 | Moe et al. |
| 2010/0043366 A1 | 2/2010 | Boehrs et al. |
| 2010/0146919 A1 | 6/2010 | Nelson et al. |
| 2010/0293906 A1 | 11/2010 | Flagstad et al. |
| 2011/0113736 A1 | 5/2011 | Raether et al. |
| 2011/0173937 A1 | 7/2011 | Nelson |
| 2011/0185689 A1 | 8/2011 | Raether et al. |

FOREIGN PATENT DOCUMENTS

| | | |
|---|---|---|
| EP | 0 897 317 B1 | 5/1997 |
| FR | 2473348 | 7/1981 |
| WO | 2004/020075 | 3/2004 |
| WO | 2004/052504 A2 | 6/2004 |
| WO | 2009/124284 | 10/2009 |

\* cited by examiner

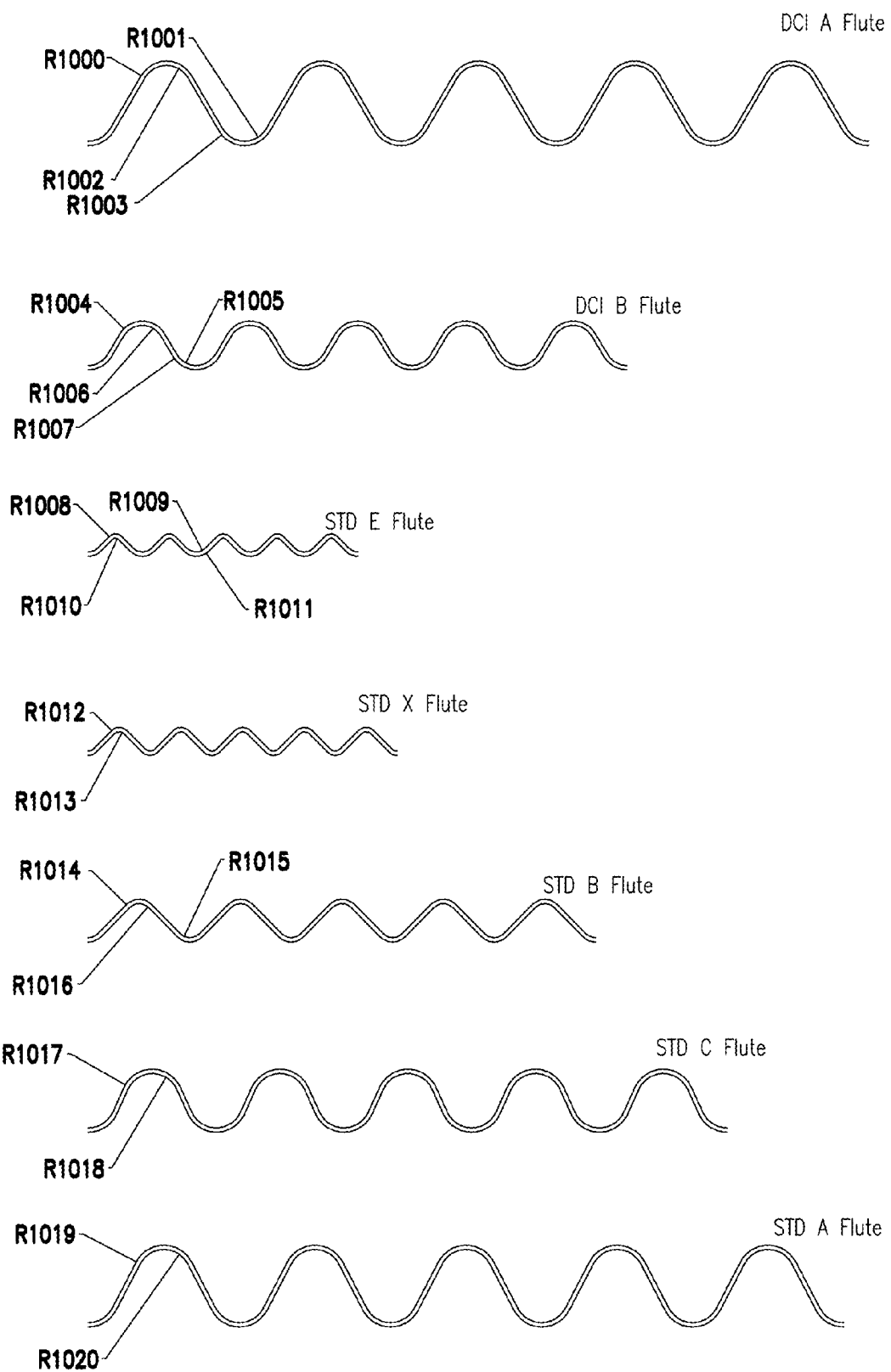

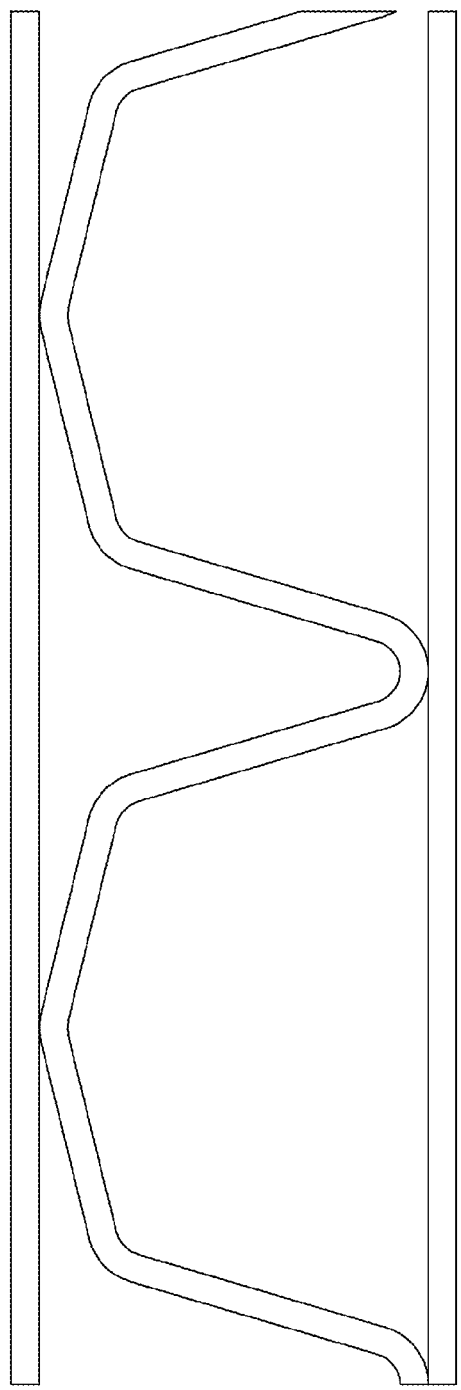
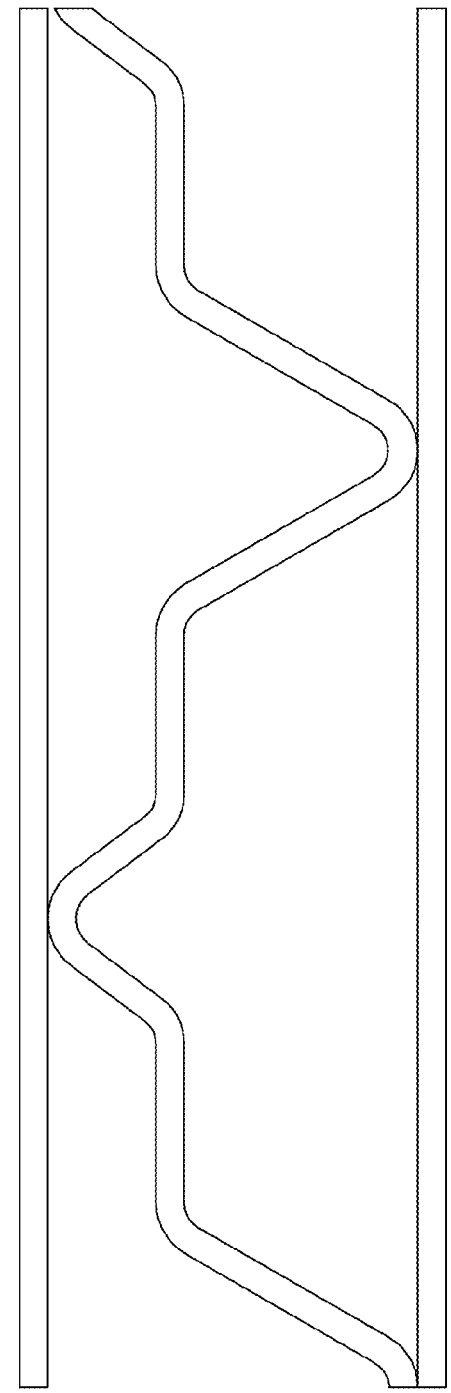
FIG. 3A
FIG. 3B

FILTER ASSEMBLY; COMPONENTS THEREFOR; AND, METHODS

CROSS-REFERENCE TO RELATED APPLICATION

The present application is a continuing application of U.S. Ser. No. 13/685,030, filed Nov. 26, 2012, and which has issued as U.S. Pat. No. 8,721,757. U.S. Ser. No. 13/685,030 is a continuation of U.S. Ser. No. 12/583,965, which has issued as U.S. Pat. No. 8,317,890. U.S. Ser. Nos. 13/685,030 and 12/583,965 includes the disclosure of, with edits and additions, U.S. provisional application 61/190,495, filed Aug. 29, 2008. The complete disclosures of U.S. Ser. Nos. 13/685,030; 12/583,965 and 61/190,495 are incorporated herein by reference. A claim of priority is made to each of U.S. Ser. Nos. 13/685,030; 12/583,965 and 61/190,495 to the extent appropriate.

FIELD OF THE DISCLOSURE

The present disclosure relates to filter arrangements for use in filtering fluids, such as air. The disclosure in part relates to air filter arrangements including media packs that use media as characterized herein. The media generally comprises flutes formed into a media pack having inlet and outlet flow faces with flutes extending therebetween. More specifically, the disclosure in part relates to such media packs and their inclusion in serviceable filter cartridges. filter arrangements and methods of assembly and use are described. In some applications, pulse jet cleaning assemblies are characterized.

BACKGROUND

Fluid (gas or liquid) streams can carry contaminant material therein. In many instances, it is desired to filter some or all of the contaminant material from the air stream. For example: air flow streams to engines, for example combustion air for motorized vehicles or for power generation equipment; gas (for example air) streams to gas turbine systems; gas (for example, air) streams to various combustion furnaces; and, cabin air and air in industrial systems, carry particulate contaminant therein that should be filtered. It is preferred for such systems, that selected contaminant material be removed from (or have its level reduced in) the fluid. A variety of fluid filter arrangements have been developed for contaminant collection. Improvements are sought.

SUMMARY

Fluid assemblies and components therefore are described. Also methods of assembly and use are characterized. There is no specific requirement that a component, assembly or method include all of the features and characteristics characterized herein, to obtain some advantage according to the present disclosure.

Herein, the term "fluid" is meant to refer to the carrier fluid in which the material to be separated by filtration is carried. The term "fluid" is intended to include within its scope gases (for example air) and/or liquids. However, the techniques described herein are specifically, and advantageously, developed for use with gas filter systems, specifically air filter systems.

In an aspect of the present disclosure, a filter cartridge (for example air filter cartridge) is provided including a media pack comprising at least a first media stack having a plurality of single facer strips defining an inlet flow face and an outlet flow face. Each single facer strip of the plurality of single facer strips typically comprises a sheet of fluted media secured to a sheet of facing media. A stack of single facer strips includes a stacking bead between adjacent single facer strips; the stacking beads typically being adjacent a flow face, in some examples an outlet flow face, of the media pack. At least a portion of the filter media stack of single facer strips is configured in an arcuate configuration. The term "arcuate" in this context is meant to indicate that the stack (or stack portion) is curved over an arcuate configuration in cross-section. A variety of arcuate configurations are possible. In examples described, in the arcuate section, the single facer strips are fanned; the term "fanned" in this context indicating that the single facer strips (of the stack or stack portion) generally diverge from one another an extension away from a smaller side (or end; i.e. inner or interior arc) of the arcuate shape or configuration toward a larger side (or end; i.e. outer or exterior arc) of the arcuate shape or configuration. Typically the media pack is closed to passage of unfiltered fluid (for example air) completely therethrough. That is, for fluid (air) entering an inlet flow face of the media pack to exit an outlet flow face of the media pack, it typically must pass through the media of the media pack, with filtering.

A variety of specific media pack configurations are characterized. In some the media is configured a closed loop. In certain others, the media includes at least a portion curved into an arcuate shape but does not extend through a complete closed loop.

Some arrangements comprise a single stack while others comprise more than one. In some, one or more blocked stacks are used; in others one or more slanted stacks are used.

Various features for filter cartridges are described, including features providing for an appropriate sealing of the media pack with an air cleaner a framework or housing.

Air filter assemblies are described and depicted that are configured, for example, for use with one or more such filter cartridges. An example air filter assembly is described which includes a pulse jet cleaning arrangement associated therewith.

In another aspect of the present disclosure, an air filter assembly is provided which includes at least one, and typically two or more, venturi members associated with each filter cartridge installed therein. The filter cartridges can be generally in accord with those described above.

Herein, in this context the term "associated with" means that a venturi member is positioned to receive filtered air (gas) flow from the media pack and to direct a pulse jet gas flow into the media pack. When two or more venturi members are associated with the same filter cartridge, each venturi member is positioned to accomplish this. In an example characterized, the media pack is configured as a closed loop, with media extending around an open filter interior; and, each of two venturi members is oriented to receive air (gas) flow from, and to direct a selected pulse jet into, the open filter interior.

Again, there is no specific requirement that component, assembly or method include all of the features characterized herein, or only features characterized herein, to obtain some benefit according to the present disclosure.

BRIEF DESCRIPTION OF THE DRAWINGS

FIG. 3 includes schematic views of examples of various fluted media definitions.

FIG. 3A includes a schematic, fragmentary, cross-sectional view of a further fluted media configuration in a single facer media pack.

FIG. 3B includes a schematic, fragmentary, cross-sectional view of a still further alternate flute definition in a media pack comprising single facer strips.

DETAILED DESCRIPTION

I. Media Configurations, Generally

Figure 1:
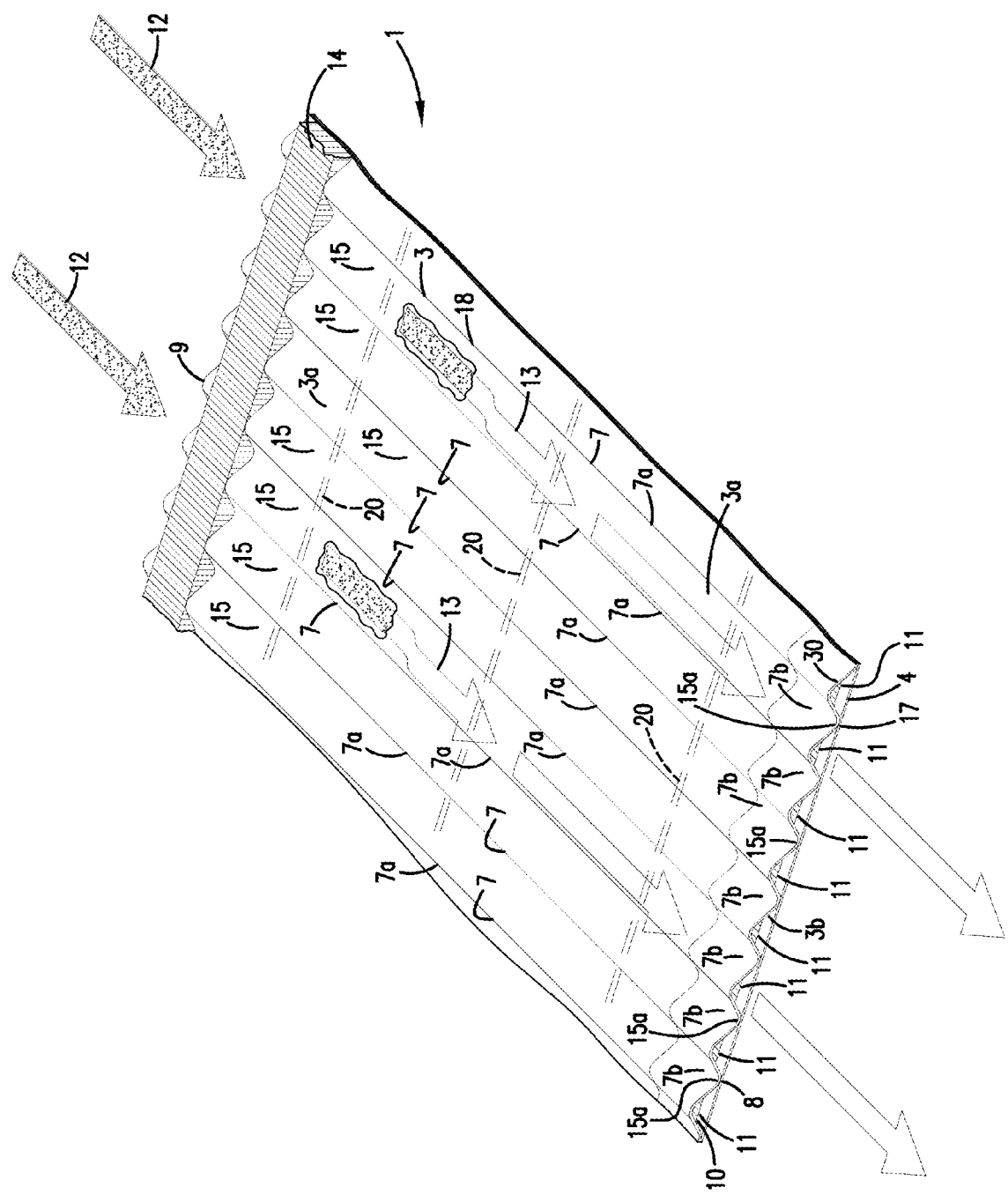
FIG. 1 is a fragmentary, schematic, perspective view of example filter media useable in selected arrangements according to the present disclosure.

Fluted filter media can be used to provide fluid filter constructions in a variety of manners. One well known manner is characterized herein as a z-filter construction. The term "z-filter construction" as used herein, is meant to refer to a type of filter construction in which individual ones of corrugated, folded or otherwise formed filter flutes are used to define sets of longitudinal, typically parallel, inlet and outlet filter flutes for fluid flow through the media; the fluid flowing along the length of the flutes between opposite inlet and outlet flow ends (or flow faces) of the media. Some examples of z-filter media are provided in U.S. Pat. Nos. 5,820,646; 5,772,883; 5,902,364; 5,792,247; 5,895,574; 6,210,469; 6,190,432; 6,350,296; 6,179,890; 6,235,195; Des. 399,944; Des. 428,128; Des. 396,098; Des. 398,046; and, Des. 437,401; each of these fifteen cited references being incorporated herein by reference.

One type of z-filter media, utilizes two specific media components joined together, to form the media construction. The two components are: (1) a fluted (typically corrugated) media sheet; and, (2) a facing media sheet. The facing sheet is typically non-corrugated, however it can be corrugated, for example perpendicularly to the flute direction as described in U.S. provisional 60/543,804, filed Feb. 11, 2004, and published as PCT WO 05/077487 on Aug. 25, 2005, incorporated herein by reference.

The fluted (typically corrugated) media sheet and the facing media sheet together, are used to define media having parallel inlet and outlet flutes. In some instances, the fluted sheet and facing sheet are secured together and are then coiled to form a z-filter media construction. Such arrangements are described, for example, in U.S. Pat. Nos. 6,235,195 and 6,179,890, each of which is incorporated herein by reference. In certain other arrangements, some non-coiled sections or strips of fluted (typically corrugated) media secured to facing media, are stacked on one another, to create a filter construction. An example of this is described in FIG. 11 of U.S. Pat. No. 5,820,646, incorporated herein by reference.

Herein, strips of material comprising fluted sheet secured to corrugated sheet, which are then assembled into stacks to form media packs, are sometimes referred to as "single facer strips" or a "single facer". The term "single facer strip", and "single facer" and variants thereof, is meant to refer to a fact that one face, i.e., a single face, of the fluted (typically corrugated) sheet, is faced by the facing sheet, in each strip.

Typically, coiling of the fluted sheet/facing sheet (i.e., single facer) combination around itself, to create a coiled media pack, is conducted with the facing sheet directed outwardly. Some techniques for coiling are described in U.S. provisional application 60/467,521, filed May 2, 2003 and PCT Application U.S. Pat. No. 04/07927, filed Mar. 17, 2004, now published as WO 04/082795, each of which is incorporated herein by reference. The resulting coiled arrangement generally has, as the outer surface of the media pack, a portion of the facing sheet, as a result.

The term "corrugated" used herein to refer to structure in media, is meant to refer to a flute structure resulting from passing the media between two corrugation rollers, i.e., into a nip or bite between two rollers, each of which has surface features appropriate to cause a corrugation affect in the resulting media. The term "corrugation" is not meant to refer to flutes that are formed by techniques not involving passage of media into a bite between corrugation rollers. However, the term "corrugated" is meant to apply even if the media is further modified or deformed after corrugation, for example by the folding techniques described in PCT WO 04/007054, published Jan. 22, 2004, incorporated herein by reference.

Corrugated media is a specific form of fluted media. Fluted media is media which has individual flutes (for example formed by corrugating or folding) extending thereacross. In general, the flutes are three-dimensional structures formed in the filtration media that provide: advantageous flow along the media surface; allow for advantageous flow of fluids through the media; and, provide for efficient contaminant removal.

Serviceable filter element or filter cartridge configurations utilizing z-filter media are sometimes referred to as "straight through flow configurations" or by variants thereof. In general, in this context what is meant is that the serviceable filter elements or cartridges generally have an inlet flow end (or face) and an opposite exit flow end (or face), with flow entering and exiting the filter cartridge in generally the same straight through direction. The term "serviceable" in this context is meant to refer to a media containing filter cartridge that is periodically removed and replaced from a corresponding fluid (e.g. air) cleaner or filter assembly. In some instances, each of the inlet flow end (or face) and outlet flow end (or face) will be generally flat or planar, with the two parallel to one another. However, variations from this, for example non-planar faces, are possible.

A straight through flow configuration (especially for a coiled or stacked media pack) is, for example, in contrast to serviceable filter cartridges such as cylindrical pleated filter cartridges of the type shown in U.S. Pat. No. 6,039,778, incorporated herein by reference, in which the flow generally makes a turn as its passes through the serviceable cartridge. That is, in a U.S. Pat. No. 6,039,778 filter, the flow enters the cylindrical filter cartridge through a cylindrical side, and then turns to exit through an end face (in forward-flow systems). In a typical reverse-flow system, the flow enters the serviceable cylindrical cartridge through an end face and then turns to exit through a side of the cylindrical filter cartridge. An example of such a reverse-flow system is shown in U.S. Pat. No. 5,613,992, incorporated by reference herein.

The term "z-filter media construction" and variants thereof as used herein, without more, is meant to refer to any or all of: a web of corrugated or otherwise fluted media secured to (facing) media with appropriate sealing to allow for definition of inlet and outlet flutes; and/or a media pack constructed or formed from such media into a three dimensional network of inlet and outlet flutes; and/or, a filter cartridge or construction including such a media pack.

In FIG. 1, an example of media 1 useable in z-filter media is shown. The media 1 is formed from a fluted, in this instance corrugated, sheet 3 and a facing sheet 4. A construction such as media 1 is deferred to herein as a single facer or single facer strip.

In general, the corrugated sheet 3, FIG. 1 is of a type generally characterized herein as having a regular, curved, wave pattern of flutes or corrugations 7. The term "wave pattern" in this context, is meant to refer to a flute or corrugated pattern of alternating troughs 7b and ridges 7a. The term "regular" in this context is meant to refer to the fact that the pairs of troughs and ridges (7b, 7a) alternate with generally the same repeating corrugation (or flute) shape and size. (Also, typically in a regular configuration each trough 7b is substantially an inverse of each ridge 7a.) The term "regular" is thus meant to indicate that the corrugation (or flute) pattern comprises troughs and ridges with each pair (comprising an adjacent trough and ridge) repeating, without substantial modification in size and shape of the corrugations along at least 70% of the length of the flutes. The term "substantial" in this context, refers to a modification resulting from a change in the process or form used to create the corrugated or fluted sheet, as opposed to minor variations from the fact that the media sheet 3 is flexible. With respect to the characterization of a repeating pattern, it is not meant that in any given filter construction, an equal number of ridges and troughs is necessarily present. The media 1 could be terminated, for example, between a pair comprising a ridge and a trough, or partially along a pair comprising a ridge and a trough. (For example, in FIG. 1 the media 1 depicted in fragmentary has eight complete ridges 7a and seven complete troughs 7b.) Also, the opposite flute ends (ends of the troughs and ridges) may vary from one another. Such variations in ends are disregarded in these definitions, unless specifically stated. That is, variations in the ends of flutes are intended to be covered by the above definitions.

In the context of the characterization of a "curved" wave pattern of corrugations, the term "curved" is meant to refer to a corrugation pattern that is not the result of a folded or creased shape provided to the media, but rather the apex 7a of each ridge and the bottom 7b of each trough is formed along a radiused curve. A typical radius for such z-filter media would be at least 0.25 mm and typically would be not more than 3 mm.

An additional characteristic of the particular regular, curved, wave pattern depicted in FIG. 1, for the corrugated sheet 3, is that at approximately a midpoint 30 between each trough and each adjacent ridge, along most of the length of the flutes 7, is located a transition region where the curvature inverts. For example, viewing back side or face 3a, FIG. 1, trough 7b is a concave region, and ridge 7a is a convex region. Of course when viewed toward front side or face 3b, trough 7b of side 3a forms a ridge; and, ridge 7a of face 3a, forms a trough. (In some instances, region 30 can be a straight segment, instead of a point, with curvature inverting at ends of the segment 30.)

A characteristic of the particular regular, wave pattern fluted (in this instance corrugated) sheet 3 shown in FIG. 1, is that the individual corrugations are generally straight. By "straight" in this context, it is meant that through at least 70%, typically at least 80% of the length between edges 8 and 9, the ridges 7a and troughs 7b do not change substantially in cross-section. The term "straight" in reference to corrugation pattern shown in FIG. 1, in part distinguishes the pattern from the tapered flutes of corrugated media described in FIG. 1 of WO 97/40918 and PCT Publication WO 03/47722, published Jun. 12, 2003, incorporated herein by reference. The tapered flutes of FIG. 1 of WO 97/40918, for example, would be a curved wave pattern, but not a "regular" pattern, or a pattern of straight flutes, as the terms are used herein.

Referring to the present FIG. 1 and as referenced above, the media 1 has first and second opposite edges 8 and 9. When the media 1 is formed into a media pack, in general edge 9 will form an inlet end for the media pack and edge 8 an outlet end, although an opposite orientation is possible.

Adjacent edge 8 is provided a sealant bead 10, sealing the corrugated sheet 3 and the facing sheet 4 together. Bead 10 will sometimes be referred to as a "single facer" bead, since it is a bead between the corrugated sheet 3 and facing sheet 4, which forms the single facer or media strip 1. Sealant bead 10 seals closed individual flutes 11 adjacent edge 8, to passage of air therefrom.

Adjacent edge 9, is provided seal bead 14. Seal bead 14 generally closes flutes 15 to passage of unfiltered fluid therein, adjacent edge 9. Bead 14 would typically be applied as strips of the media 1 are secured to one another during stacking Thus bead 14 will form a seal between a back side 17 of facing sheet 4, and side 18 of the next adjacent corrugated sheet 3. When the media 1 is cut in strips and stacked, instead of coiled, bead 14 is referenced as a "stacking bead." (When bead 14 is used in a coiled arrangement formed from media 1, not depicted herein, it is referenced as a "winding bead.")

Referring to FIG. 1, once the media 1 is incorporated into a media pack, for example by stacking, it can be operated as follows. First, air in the direction of arrows 12, would enter open flutes 11 adjacent end 9. Due to the closure at end 8, by bead 10, the air would pass through the media, for example as shown by arrows 13. It could then exit the media pack, by passage through open ends 15a of the flutes 15, adjacent end 8 of the media pack. Of course operation could be conducted with air flow in the opposite direction.

For the particular arrangement shown herein in FIG. 1, the parallel corrugations 7a, 7b are generally straight completely across the media, from edge 8 to edge 9. Straight flutes or corrugations can be deformed or folded at selected locations, especially at ends. Modifications at flute ends for closure are generally disregarded in the above definitions of "regular," "curved" and "wave pattern."

Z-filter constructions which do not utilize straight, regular curved wave pattern corrugation shapes are known. For example in Yamada et al. U.S. Pat. No. 5,562,825 corrugation patterns which utilize somewhat semicircular (in cross section) inlet flutes adjacent narrow V-shaped (with curved sides) exit flutes are shown (see FIGS. 1 and 3, of U.S. Pat. No. 5,562,825). In Matsumoto, et al. U.S. Pat. No. 5,049,326 circular (in cross-section) or tubular flutes defined by one sheet having half tubes attached to another sheet having half tubes, with flat regions between the resulting parallel, straight, flutes are shown, see FIG. 2 of Matsumoto '326. In Ishii, et al. U.S. Pat. No. 4,925,561 (FIG. 1) flutes folded to have a rectangular cross section are shown, in which the flutes taper along their lengths. In WO 97/40918 (FIG. 1), flutes or parallel corrugations which have a curved, wave patterns (from adjacent curved convex and concave troughs) but which taper along their lengths (and thus are not straight) are shown. Also, in WO 97/40918 flutes which have curved wave patterns, but with different sized ridges and troughs, are shown.

In general, the filter media is a relatively flexible material, typically a non-woven fibrous material (of cellulose fibers, synthetic fibers or both) often including a resin therein, sometimes treated with additional materials. Thus, it can be conformed or configured into the various corrugated patterns, without unacceptable media damage. Also, it can be readily coiled or otherwise configured for use, again without unacceptable media damage. Of course, it must be of a nature such that it will maintain the required corrugated configuration, during use.

In the corrugation process, an inelastic deformation is caused to the media. This prevents the media from returning to its original shape. However, once the tension is released the flute or corrugations will tend to spring back, recovering only a portion of the stretch and bending that has occurred. The facing media sheet is sometimes tacked to the fluted media sheet, to inhibit this spring back in the corrugated sheet. Such tacking is shown at 20.

Also, typically, the media contains a resin. During the corrugation process, the media can be heated to above the glass transition point of the resin. When the resin then cools, it will help to maintain the fluted shapes.

The media of the corrugated sheet 3 facing sheet 4 or both, can be provided with a fine fiber material on one or both sides thereof, for example in accord with U.S. Pat. No. 6,673,136, incorporated herein by reference. In some instances, when such fine fiber material is used, it may be desirable to provide the fine fiber on the upstream side of the material and inside the flutes. When this occurs, air flow, during filtering, will typically be into the edge comprising stacking bead.

An issue with respect to z-filter constructions relates to closing of the individual flute ends. Although alternatives are possible, typically a sealant or adhesive is provided, to accomplish the closure. As is apparent from the discussion above, in typical z-filter media, especially that which uses straight flutes as opposed to tapered flutes and sealant for flute seals, large sealant surface areas (and volume) at both the upstream end and the downstream end are needed. High quality seals at these locations are critical to proper operation of the media structure that results. The high sealant volume and area, creates issues with respect to this.

Figure 2:
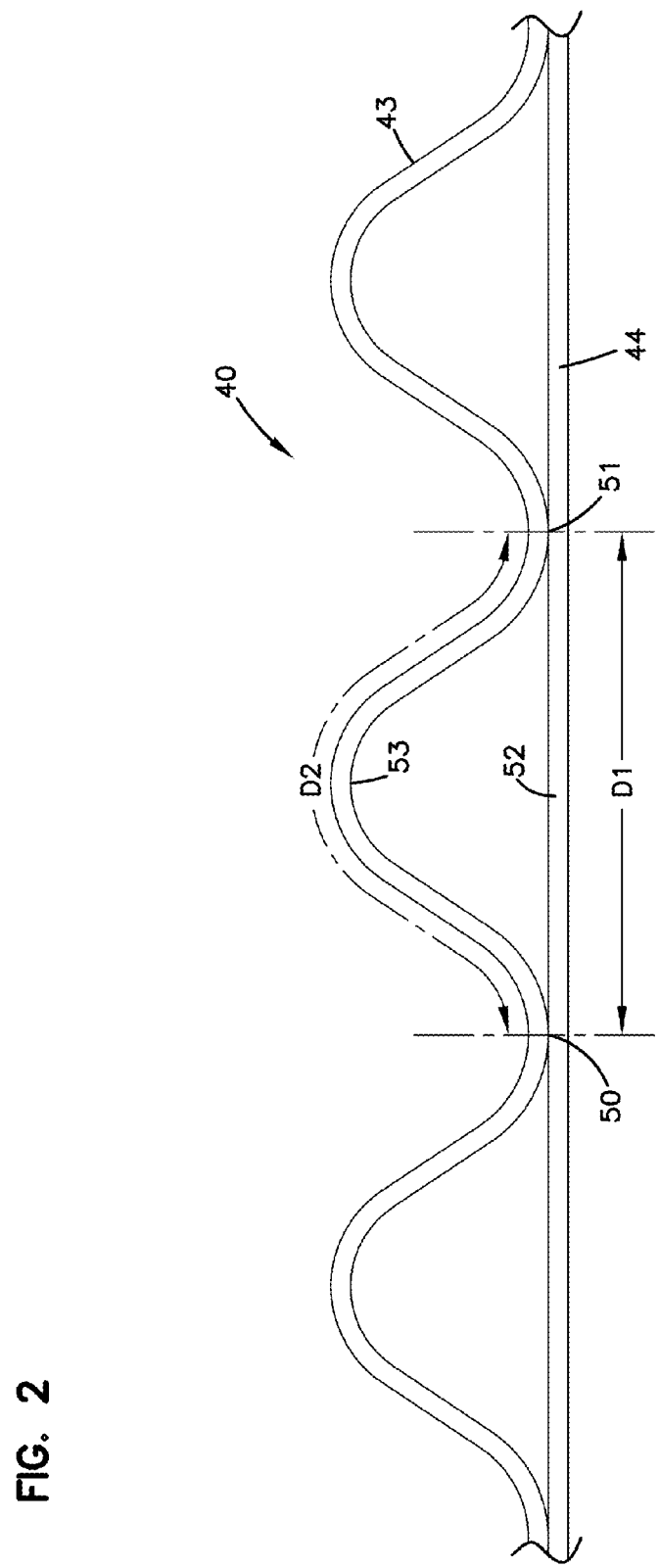
FIG. 2 is an enlarged, schematic, cross-sectional view of a portion of the media depicted in FIG. 1.

Attention is now directed to FIG. 2, in which a z-filter media construction 40 utilizing a regular, curved, wave pattern corrugated sheet 43, and a non-corrugated flat sheet 44, i.e., a single facer strip is schematically depicted. The distance D1, between points 50 and 51, defines the extension of flat media 44 in region 52 underneath a given corrugated flute 53. The length D2 of the arcuate media for the corrugated flute 53, over the same distance D1 is of course larger than D1, due to the shape of the corrugated flute 53. For a typical regular shaped media used in fluted filter applications, the linear length D2 of the media 53 between points 50 and 51 will often be at least 1.2 times D1. Typically, D2 would be within a range of 1.2-2.0 times D1, inclusive. One particularly convenient arrangement for air filters has a configuration in which D2 is about 1.25-1.35× D1. Such media has, for example, been used commercially in Donaldson Powercore™ Z-filter arrangements. Another potentially convenient size would be one in which D2 is about 1.4-1.6 times D1. Herein the ratio D2/D1 will sometimes be characterized as the flute/flat ratio or media draw for the corrugated media.

In the corrugated cardboard industry, various standard flutes have been defined. For example the standard E flute, standard X flute, standard B flute, standard C flute and standard A flute. FIG. 3, attached, in combination with Table A below provides definitions of these flutes.

Donaldson Company, Inc., (DCI) the assignee of the present disclosure, has used variations of the standard A and standard B flutes, in a variety of z-filter arrangements. These flutes are also defined in Table A and FIG. 3.

TABLE A (Flute definitions for FIG. 3)

| | |
|---|---|
| DCI A | Flute/flat = 1.52:1; The Radii (R) are as follows: |
| Flute: | R1000 = .0678 inch (1.72 mm); R1001 = .058 inch (1.48 mm); R1002 = .058 inch (1.46 mm); R1003 = .068 inch (1.73 mm); |
| DCI B | Flute/flat = 1.32:1; The Radii (R) are as follows: |
| Flute: | R1004 = .060 inch (1.52 mm); R1005 = .052 inch (1.32 mm); R1006 = .050 inch (1.27 mm); R1007 = .062 inch (1.58 mm); |
| Std. E | Flute/flat = 1.24:1; The Radii (R) are as follows: |
| Flute: | R1008 = .020 inch (.51 mm); R1009 = .030 inch (.76 mm); R1010 = .010 inch (.25 mm); R1011 = .040 inch (1.02 mm); |
| Std. X | Flute/flat = 1.29:1; The Radii (R) are as follows: |
| Flute: | R1012 = .025 inch (.64 mm); R1013 = .015 inch (.38 mm); |
| Std. B | Flute/flat = 1.29:1; The Radii (R) are as follows: |

TABLE A-continued (Flute definitions for FIG. 3)

| | |
|---|---|
| Flute: | R1014 = .041 inch (1.04 mm); R1015 = .031 inch (.787 mm); R1016 = .031 inch (.787 mm); |
| Std. C | Flute/flat = 1.46:1; The Radii (R) are as follows: |
| Flute: | R1017 = .072 inch (1.83 mm); R1018 = .062 inch (1.58 mm); |
| Std. A | Flute/flat = 1.53:1; The Radii (R) are as follows: |
| Flute: | R1019 = .072 inch (1.83 mm); R1020 = .062 inch (1.58 mm). |

Of course other, standard, flutes definitions from the corrugated box industry are known.

In general, standard flute configurations from the corrugated box industry can be used to define corrugation shapes or approximate corrugation shapes for corrugated media. Comparisons above between the DCI A flute and DCI B flute, and the corrugation industry standard A and standard B flutes, indicate some convenient variations.

It is noted that alternative flute definitions such as those characterized in U.S. Ser. No. 12/215,718, filed Jun. 26, 2008; and Ser. No. 12/012,785, filed Feb. 4, 2008 can be used, with air cleaner features as characterized herein below. The complete disclosures of each of U.S. Ser. Nos. 12/215, 718 and 12/012,785 are incorporated herein by reference.

Figure 3C:
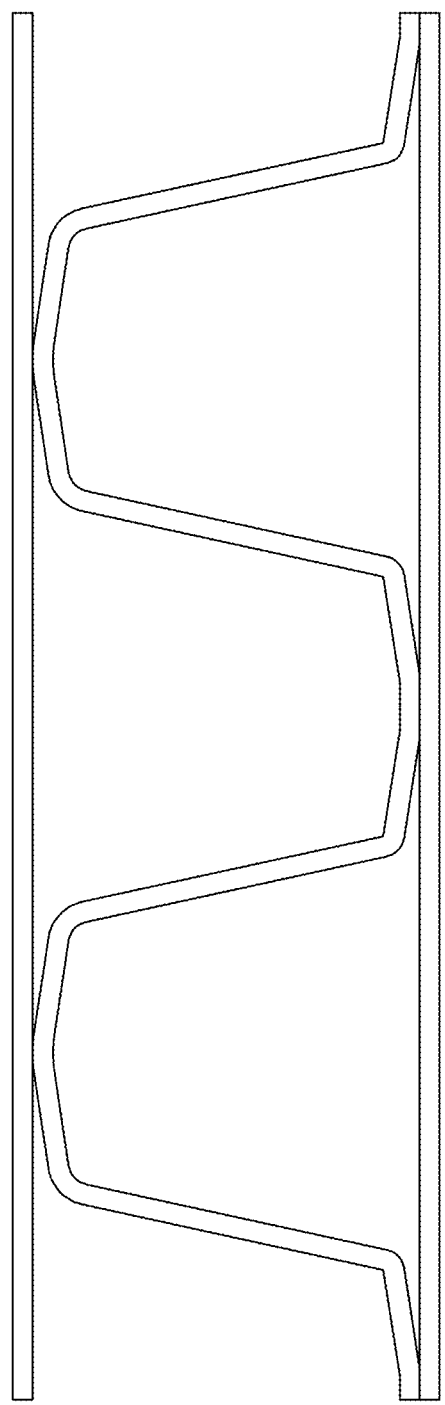
FIG. 3C includes a schematic, fragmentary, cross-sectional view of yet another flute definition in a media pack comprising single facer strips.

In FIGS. 3A-3C, cross-sectional views of exemplary portions of filtration media are shown wherein the fluted sheet has one or more non-peak ridge extending along at least a portion of the flute length. FIG. 3A shows a fluted sheet having one non-peak ridge provided between adjacent peaks, and FIGS. 3B and 3C show fluted sheets having two non-peak ridges between adjacent peaks. The non-peak ridges can extend along the flute length any amount including, for example, an amount of 20% of the flute length to 100% of the flute length. In addition, the fluted sheet can be provided without non-peak ridges between all adjacent peaks, and can be provided with differing numbers of non-peak ridges between adjacent peaks (e.g., alternating zero, one, or two non-peak ridges in any arrangement). The presence of non-peak ridges can help provide more media available for filtration in a given volume, and can help reduce stress on the fluted sheet thereby allowing for a smaller radius at the peaks and therefore reduced media masking. Such media can be used in arrangements according to the present disclosure.

II. Manufacture of Stacked Media Configurations Using Fluted Media, Generally In FIG. 4, one example of a manufacturing process for making a media strip corresponding to strip 1, FIG. 1 is shown. In general, facing sheet 64 and the fluted (corrugated) sheet 66 having flutes are brought together to form a media web 69, with an adhesive bead located therebetween at 70. The adhesive bead 70 will form a single facer bead 14, FIG. 1.

The term "single facer bead" references a sealant bead positioned between layers of a single facer; i.e., between the fluted sheet and facing sheet.

An optional darting process occurs at station 71 to form center darted section 72 located mid-web. The z-filter media or Z-media strip 74 can be cut or slit at 75 along the bead 70 to create two pieces 76, 77 of z-filter media 74, each of which has an edge with a strip of sealant (single facer bead) extending between the corrugating and facing sheet. Of course, if the optional darting process is used, the edge with a strip of sealant (single facer bead) would also have a set of flutes darted at this location. The strips or pieces 76, 77 can then be cut across, into single facer strips for stacking, as described below in connection with FIG. 6.

Figure 4:
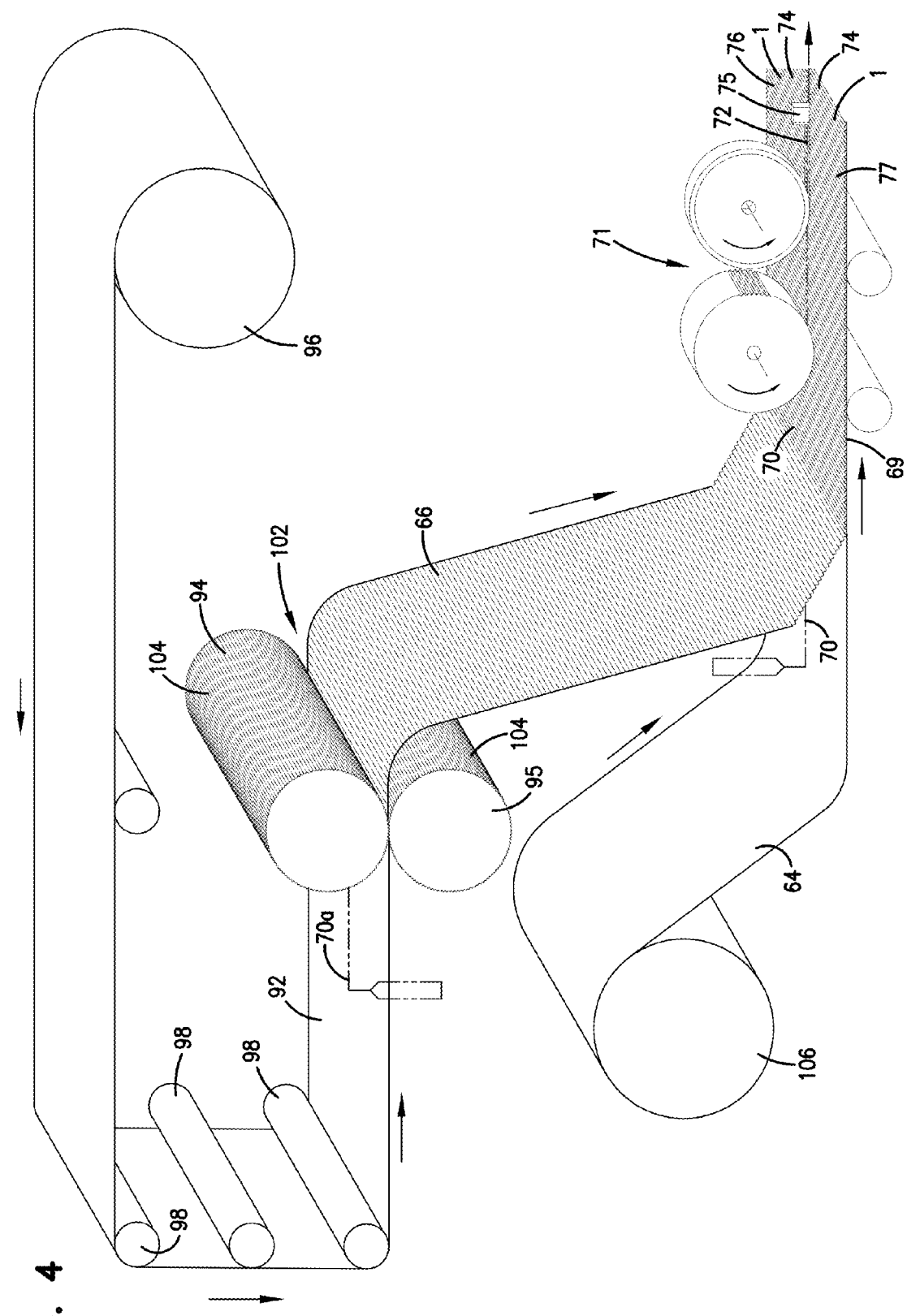
FIG. 4 is a schematic view of an example process for manufacturing media according to the present disclosure.

Techniques for conducting a process as characterized with respect to FIG. 4 are described in PCT WO 04/007054, published Jan. 22, 2004 incorporated herein by reference.

Still in reference to FIG. 4, before the z-filter media 74 is put through the darting station 71 the media 74 must be formed. In the schematic shown in FIG. 4, this is done by passing a flat sheet of media 92 through a pair of corrugation rollers 94, 95. In the schematic shown in FIG. 4, the flat sheet of media 92 is unrolled from a roll 96, wound around tension rollers 98, and then passed through a nip or bite 102 between the corrugation rollers 94, 95. The corrugation rollers 94, 95 have teeth 104 that will give the general desired shape of the corrugations after the flat sheet 92 passes through the nip 102. After passing through the nip 102, the flat sheet 92 becomes corrugated and is referenced at 66 as the corrugated sheet. The corrugated (i.e., fluted) media sheet 66 is then secured to facing media sheet 64. (The corrugation process may involve heating the media, in some instances.)

Still in reference to FIG. 4, the process also shows the facing sheet 64 being routed to the darting process station 71. The facing sheet 64 is depicted as being stored on a roll 106 and then directed to the corrugated sheet 66 to form the Z-media 74. The corrugated sheet 66 and the facing sheet 64 are secured together by adhesive or by other means (for example by sonic welding).

Referring to FIG. 4, an adhesive line 70 is shown used to secure corrugated sheet 66 and facing sheet 64 together, as the sealant bead. Alternatively, the sealant bead for forming the facing bead could be applied as shown as 70a. If the sealant is applied at 70a, it may be desirable to put a gap in the corrugation roller 95, and possibly in both corrugation rollers 94, 95, to accommodate the bead 70a.

The type of corrugation provided to the corrugated media is a matter of choice, and will be dictated by the corrugation or corrugation teeth of the corrugation rollers 94, 95. One typical type of flute pattern will be a regular, typically curved, wave pattern corrugation, of straight flutes, as defined herein above. A typical regular curved wave pattern used, would be one in which the distance D2, as defined above, in a corrugated pattern is at least 1.2 times the distance D1 as defined above. In one typical application, typically D2=1.25-1.35×D1; in another D2=1.4-1.6×D1. In some instances the techniques may be applied with curved wave patterns that are not "regular," including, for example, ones that do not use straight flutes.

Figure 5:
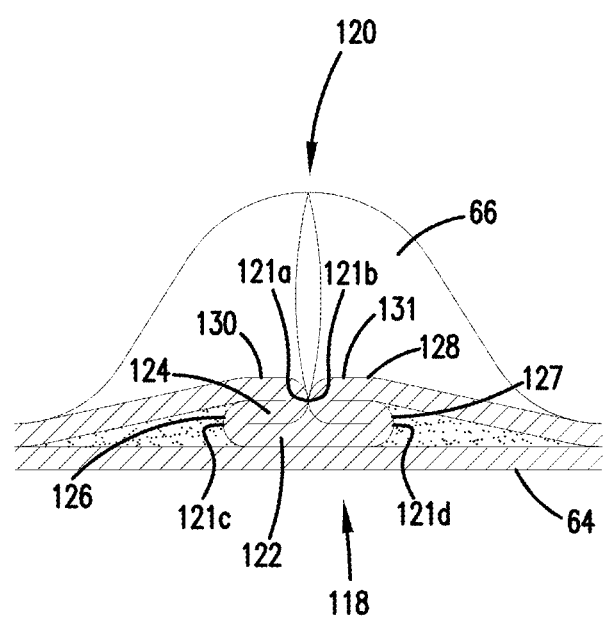
FIG. 5 is a schematic cross-sectional view of an optional end dart for media flutes useable in arrangements according to the present disclosure.

As described, the process shown in FIG. 4 can be used to create the center darted section 72. FIG. 5 shows, in cross-section, one of the flutes after darting and slitting.

A fold arrangement 118 can be seen to form a darted flute 120 with four creases 121a, 121b, 121c, 121d. The fold arrangement 118 includes a flat first layer or portion 122 that is secured to the facing sheet 64. A second layer or portion 124 is shown pressed against the first layer or portion 122. The second layer or portion 124 is preferably formed from folding opposite outer ends 126, 127 of the first layer or portion 122.

Still referring to FIG. 5, two of the folds or creases 121a, 121b will generally be referred to herein as "upper, inwardly directed" folds or creases. The term "upper" in this context is meant to indicate that the creases lie on an upper portion of the entire fold 120, when the fold 120 is viewed in the orientation of FIG. 5. The term "inwardly directed" is meant to refer to the fact that the fold line or crease line of each crease 121a, 121b, is directed toward the other.

In FIG. 5, creases 121c, 121d, will generally be referred to herein as "lower, outwardly directed" creases. The term "lower" in this context refers to the fact that the creases 121c, 121d are not located on the top as are creases 121a, 121b, in the orientation of FIG. 5. The term "outwardly directed" is meant to indicate that the fold lines of the creases 121c, 121d are directed away from one another.

The terms "upper" and "lower" as used in this context are meant specifically to refer to the fold 120, when viewed from the orientation of FIG. 5. That is, they are not meant to be otherwise indicative of direction when the fold 120 is oriented in an actual product for use.

Based upon these characterizations and review of FIG. 5, it can be seen that a preferred regular fold arrangement 118 according to FIG. 5 in this disclosure is one which includes at least two "upper, inwardly directed, creases." These inwardly directed creases are unique and help provide an overall arrangement in which the folding does not cause a significant encroachment on adjacent flutes.

A third layer or portion 128 can also be seen pressed against the second layer or portion 124. The third layer or portion 128 is formed by folding from opposite inner ends 130, 131 of the third layer 128.

Another way of viewing the fold arrangement 118 is in reference to the geometry of alternating ridges and troughs of the corrugated sheet 66. The first layer or portion 122 is formed from an inverted ridge. The second layer or portion 124 corresponds to a double peak (after inverting the ridge) that is folded toward, and in preferred arrangements, folded against the inverted ridge.

Techniques for providing the optional dart described in connection with FIG. 5, in a preferred manner, are described in PCT WO 04/007054, incorporated herein by reference. Other techniques for media management are described in PCT application U.S. Pat. No. 04/07927, filed Mar. 17, 2004, incorporated herein by reference.

Techniques described herein are well adapted for use of media packs that result from arrangements that, instead of being formed by coiling, are formed from a plurality of strips of single facer.

Opposite flow ends or flow faces of the media pack can be provided with a variety of different definitions. In many arrangements, the ends are generally flat and perpendicular to one another.

The flute seals (single facer bead, winding bead or stacking bead) can be formed from a variety of materials. In various ones of the cited and incorporated references, hot melt or polyurethane seals are described as possible for various applications. These are useable for applications described herein.

Figure 6:
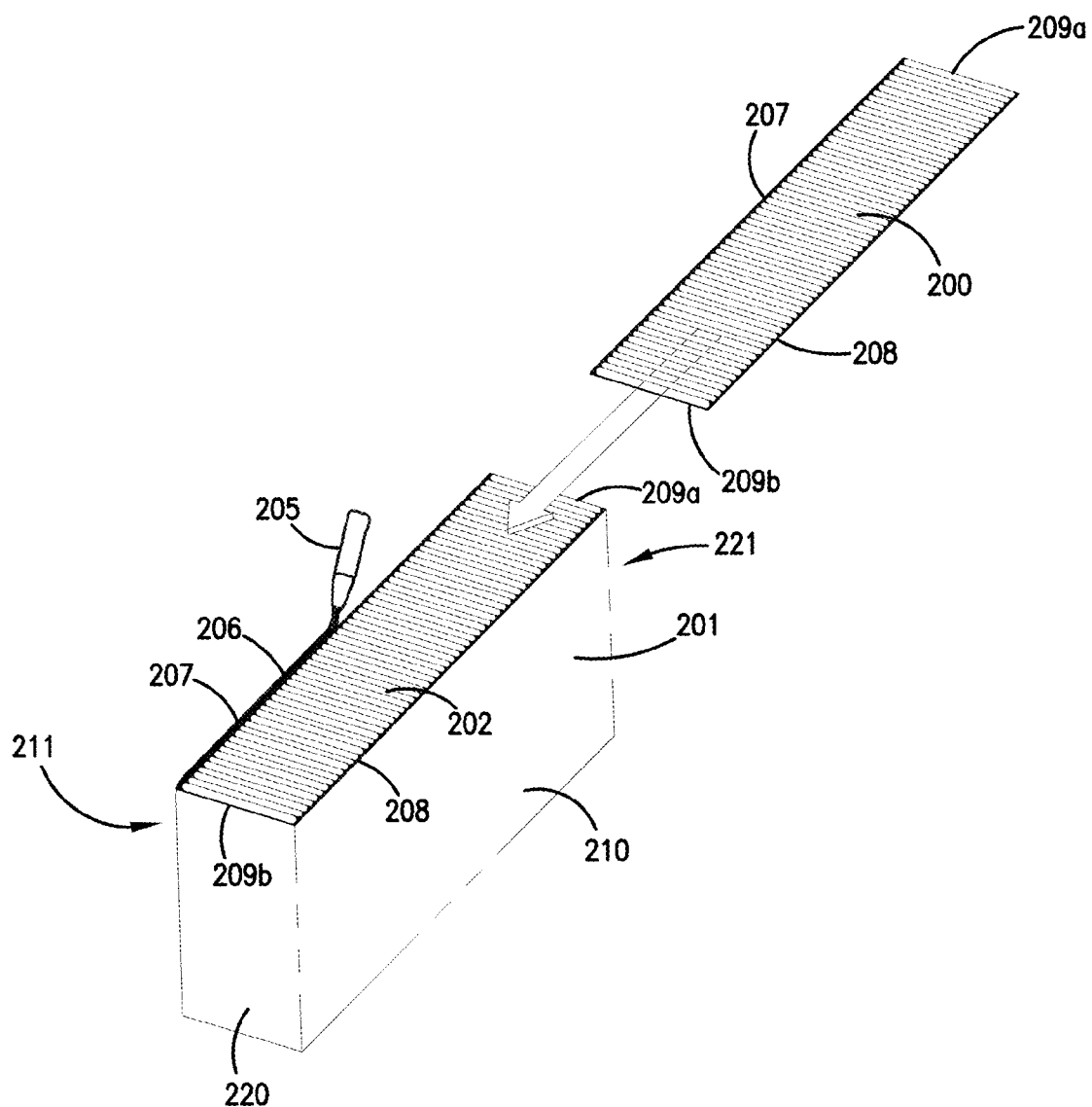
FIG. 6 is a schematic depiction of a step of creating a stacked media pack.

In FIG. 6, schematically there is shown a step of forming a stacked z-filter media pack from strips of z-filter media, each strip being a fluted sheet secured to a facing sheet. Referring to FIG. 6, single facer strip 200 is being shown added to a stack 201 of strips 202 analogous to strip 200. Strip 200 can be cut from either of strips 76, 77, FIG. 4. At 205, FIG. 6, application of a stacking bead 206 is shown, between each layer corresponding to a strip 200, 202 at an opposite edge from the single facer bead or seal. (Stacking can also be done with each layer being added to the bottom of the stack, as opposed to the top.)

Referring to FIG. 6, each strip 200, 202 has front and rear edges 207, 208 and opposite side edges 209a, 209b. Inlet and outlet flutes of the corrugated sheet/facing sheet combination comprising each strip 200, 202 generally extend between the front and rear edges 207, 208, and parallel to side edges 209a, 209b.

Still referring to FIG. 6, in the media pack 201 being formed, opposite flow faces are indicated at 210, 211. The selection of which one of faces 210, 211 is the inlet end face and which is the outlet end face, during filtering, is a matter of choice. In some instances the stacking bead 206 is positioned adjacent the upstream or inlet face 211; in others the opposite is true. The flow faces 210, 211, extend between opposite side faces 220, 221.

The stacked media pack 201 shown being formed in FIG. 6, is sometimes referred to herein as a "blocked" stacked media pack. The term "blocked" in this context, is an indication that the arrangement is formed to a rectangular block in which all faces are 90° relative to all adjoining wall faces. Alternate configurations are possible, as discussed below in connection with certain of the remaining figures.

It is noted that a blocked, stacked arrangement corresponding to FIG. 6 is described in the prior art of U.S. Pat. No. 5,820,646, incorporated herein by reference. It is also noted that stacked arrangements are described in U.S. Pat. Nos. 5,772,883; 5,792,247; U.S. Provisional 60/457,255 filed Mar. 25, 2003; and U.S. Ser. No. 10/731,564 filed Dec. 8, 2003. All four of these latter references are incorporated herein by reference. It is noted that a stacked arrangement shown in U.S. Ser. No. 10/731,504, is a slanted stacked arrangement.

III. Media Packs with Arcuate Sections, Generally

It is noted that a media pack generally in accord with the description above for FIG. 6, can be configured so that at least a portion thereof comprises a generally "arcuate" configuration, portion or shape. This will be understood by reference to FIGS. 7-10.

Figure 7:
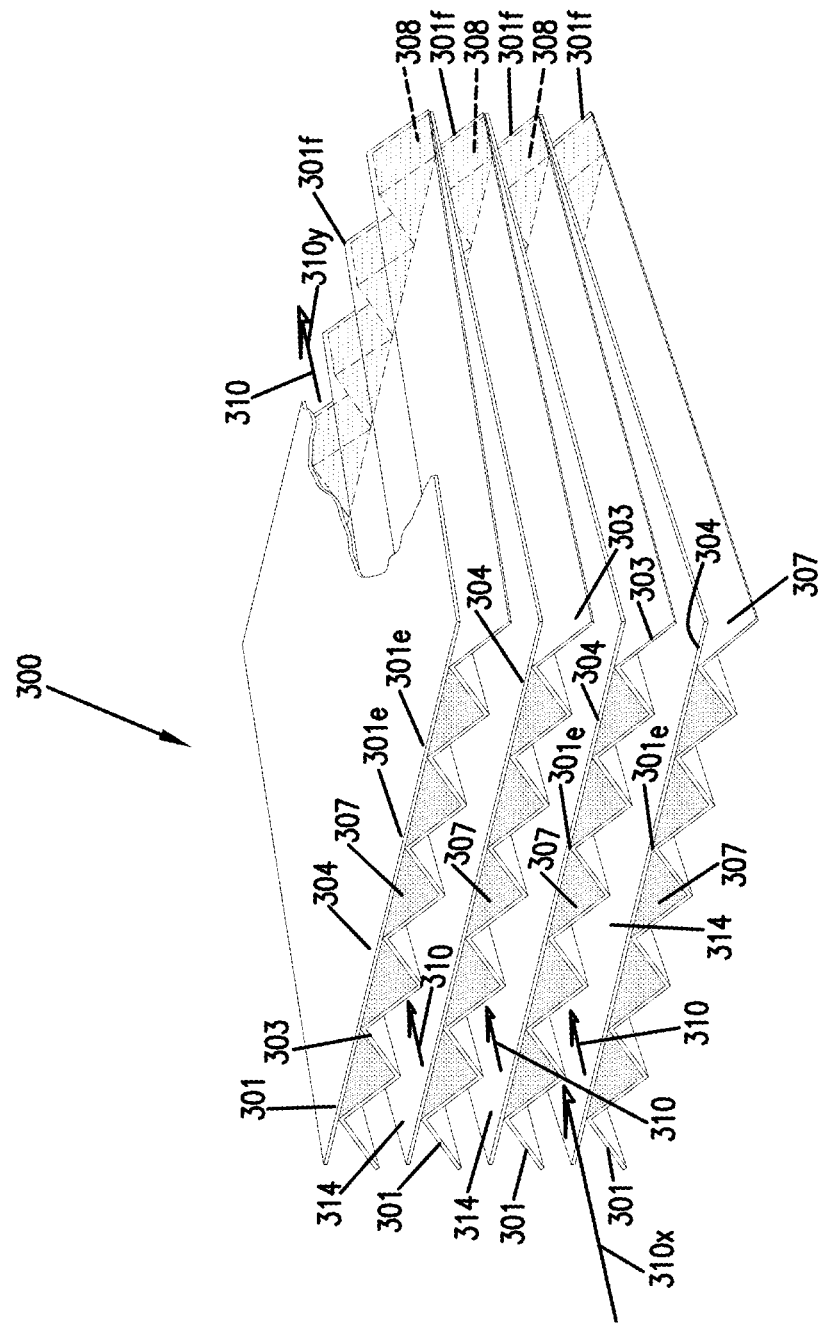
FIG. 7 is a schematic depiction of fluid flow through a stacked filter media pack generally analogous to the one depicted in FIG. 6, but fanned somewhat.

Referring first to FIG. 7, a general flow pattern for a stack of strips of media, each strip generally corresponding to a fluted sheet secured to a facing sheet in accord with the descriptions herein above for FIGS. 1-2, for example, is depicted. Referring to FIG. 7, at 300 a schematic fragmentary perspective view of such a stack is provided. The portion of the stack 300 depicted in FIG. 7, comprises four single facer strips 301, stacked with one another. Each single facer strip 301, comprises a fluted sheet 303 secured to a facing sheet 304. Referring to FIG. 7, at 307, a single facer seal (sealing) bead in each of sheets 301 is depicted. The single facer sealing bead 307 provides a seal between the fluted sheet 303 and the facing sheet 304, within each single facer strip 301.

The seal bead 307 is typically located adjacent an edge of each single facer strip 301, that edge being identified on FIG. 7 at 301e. For example, when manufactured in accord with the process of FIG. 4, the sealant bead 307 is flush with the edge of the single facer strip 301 in which it is positioned, since the seal bead 307 is cut along with the media sheets (303, 304) to form the adjacent the edge 301e of the single facer strip 301. On the other hand, in alternate manufacturing approaches, the sealant bead corresponding to the single facer bead 307 could be positioned spaced between a fluted sheet and a facing sheet that are not cut, and thus could be positioned recessed slightly from the edge to which it is adjacent. Typically, the single facer bead 307 when characterized herein as "adjacent" an associated edge 301e, is either positioned flush with that edge, or is positioned spaced from that edge no greater than 25 mm, and typically no greater than 12 mm, and often within a distance of 5 mm or less. When it is said that the bead is "positioned" within a distance as indicated, it is meant that at least an edge of the bead is within the identified distance from the associated media edge.

Along an opposite media edge 301f, each of the strips 301 is secured to a next adjacent one of the strips 301, by a stacking bead, or a seal, indicated generally at 308. Stacking bead or seal 308, then, provides a seal for selected flutes, adjacent edge 301f. It is noted that when manufactured in accord with the processes characterized in FIG. 4 for example, stacking bead 308 is typically positioned recessed slightly from edge 301f with which it is adjacent. This is to inhibit, during formation and cure, overflow of sealant material beyond the edge 301f, potentially inhibiting flow from outlet flutes. Again, when it is said that the stacking bead 308 is positioned adjacent media edge 301f, it is meant that it is either positioned flush with the media edge, or is positioned spaced therefrom by a distance of no greater than 25 mm, typically no greater than 12 mm, usually by a distance no greater than 5 mm. By this it is not meant that the entire bead is so located, but at least an edge of the bead is so located.

In FIG. 7, airflow is depicted by arrows 310. It is noted that arrow 310x, depicts the flow of air to the media pack 301 along a flow face generally defined at edges 301e of each media strip 301. This could comprise, for example, air to be filtered. This air is inhibited from entering exit flutes, by single facer seals or beads 307, and thus enters spaces 314 between strips 301. Air is inhibited from leaving end 301f, by stacking bead 308, and thus must pass through the media into outlet flutes, to leave in the general direction shown by exit arrow 310y. It is noted that a media stack 300 can be operated with an opposite air flow, i.e., into edges 301f and exiting edges 301e, in some applications.

In general, it is noted that in FIG. 7, stack 300 has been modified from stack 210, FIG. 6, in that adjacent edges 301e of individual single facer strips 301 have been spread apart slightly. Herein, this will be generally characterized as configuring the stack 300 in a "fanned" configuration. This will be understood more generally, by reference to FIGS. 8-10.

Figure 8:
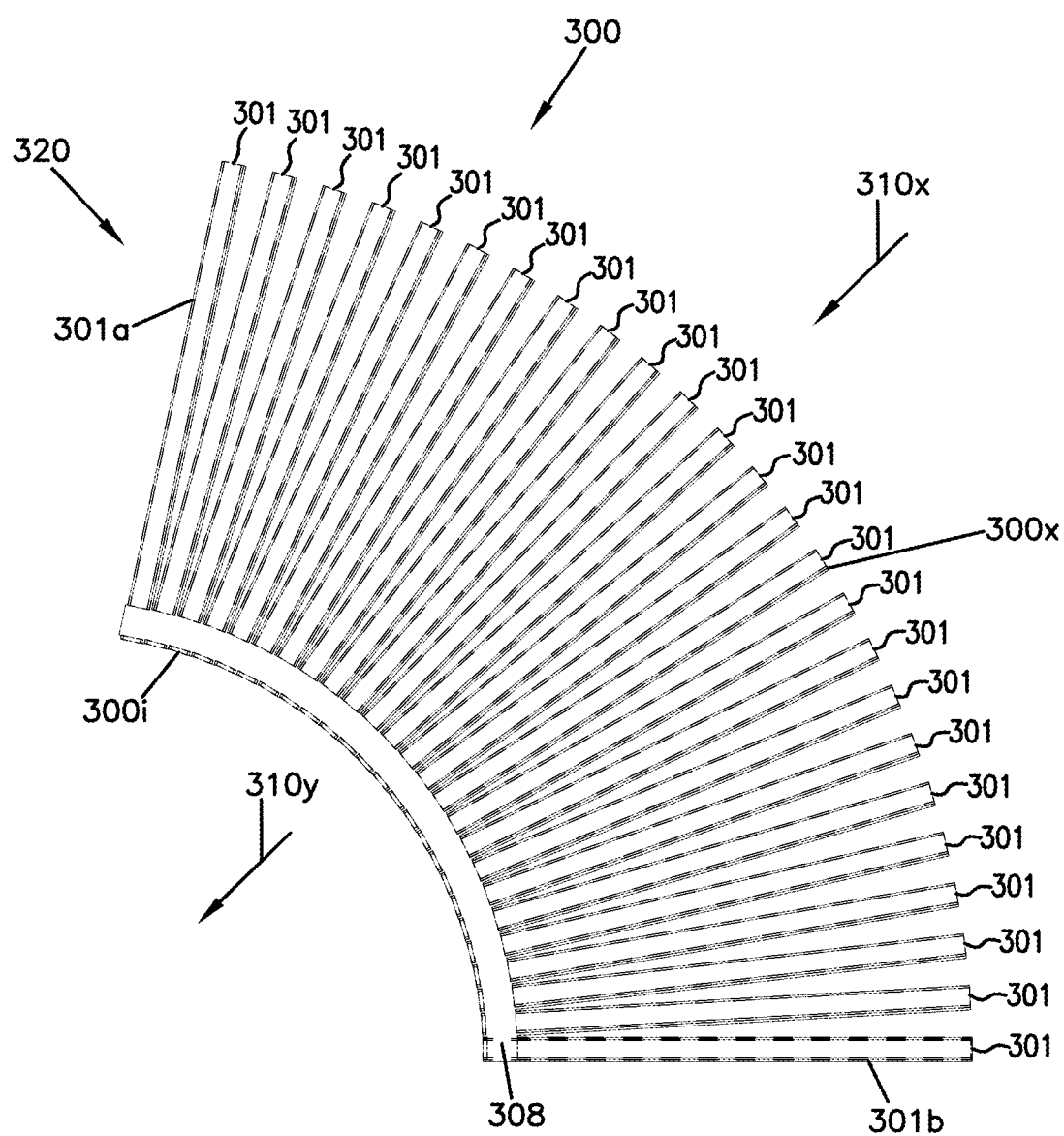
FIG. 8 is a schematic, end, depiction of a media pack in accord with FIGS. 6 and 7, configured in a selected arcuate, fanned orientation.
Figure 9:
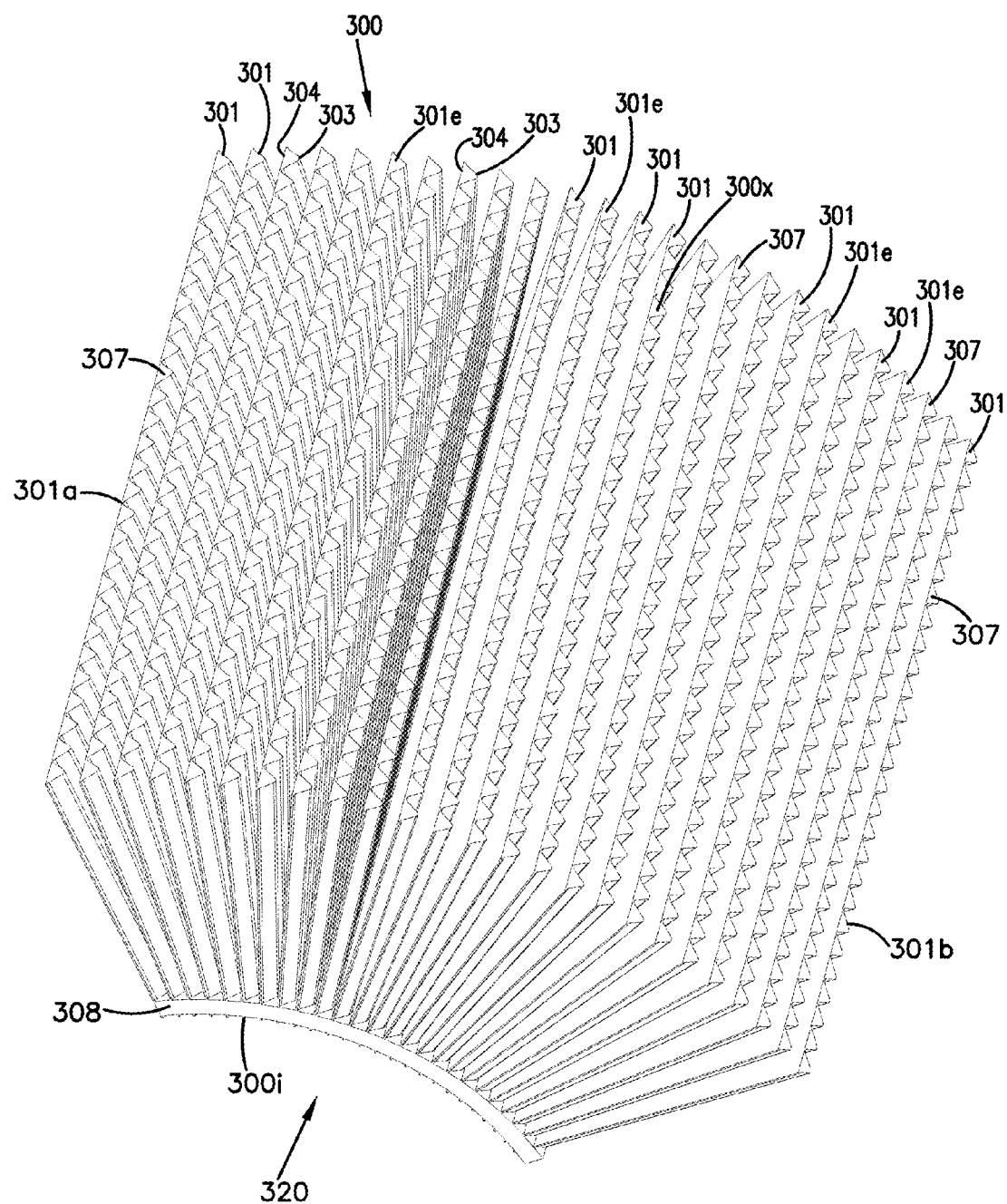
FIG. 9 is a schematic perspective view of media pack of FIG. 8.
Figure 10:
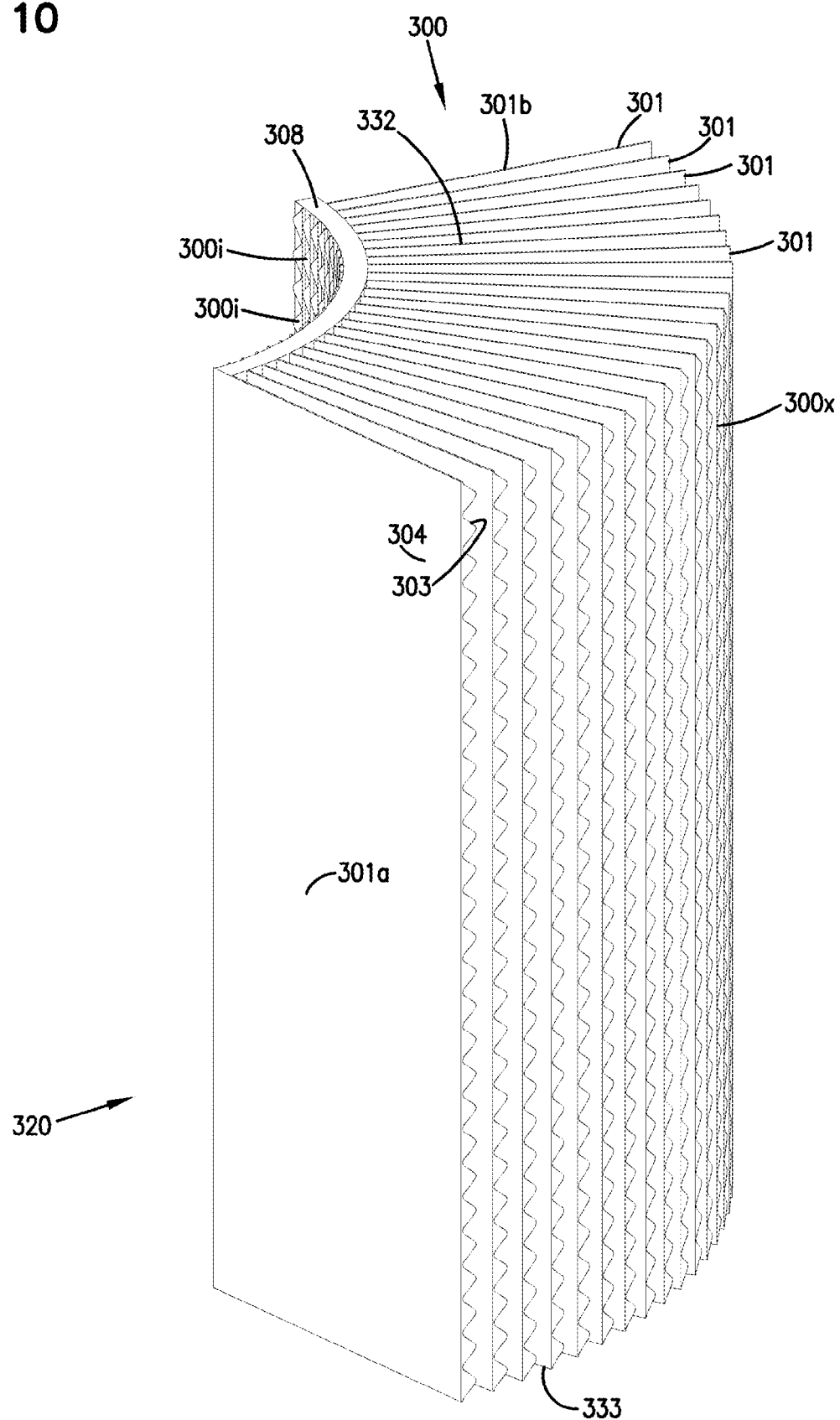
FIG. 10 is a second schematic perspective view of the media pack of FIG. 8.

Before turning to FIGS. 8-10, and still referring to FIG. 7, it is noted that for the assembly of FIG. 7, the stack 300 is depicted with the facing sheets 304 above the associated fluted sheet 303 of each single facer strip 301. This is an opposite configuration of that shown in FIG. 6, in which the fluted sheet of each strip is positioned above the facing sheet. It is noted that either orientation can be used, and the principles of operation would not change. Further, in connection with FIG. 7, it is noted that the fluted sheets 303 are shown as if formed from a folding operation, as opposed to having a rounded shape, (for example that of FIGS. 1 and 2), resulting from being corrugated in accord with descriptions associated with those figures. Corrugated shapes can be used, as well as alternate flute shapes.

Referring to FIG. 7, it is noted that the individual strips 301 within the stack 300 are not parallel to one another, but rather diverge from one another in extension from one flow face, adjacent end 301f, toward a second flow face, adjacent end 301e. Typically the amount of separation from this divergence, which is characteristic of a fanned arrangement as described herein, will increase in extension from the outlet flow face to the inlet flow face, for normal filtering operation. By the term "normal filtering operation" as used herein, and variants throughout, reference is meant to a general direction of air flow during a filtering operation by the media pack.

Attention is now directed to FIG. 8. In FIG. 8, stack 300 is viewable from a side or side edge. Thus individual single facer strips 301 can be viewed. Referring to FIG. 8, instead of being maintained in a blocked stacked configuration in accord with FIG. 6, again stack 300 has been fanned around stacking bead 308. It can be seen that this provides an arcuate configuration 320. In this context the term "arcuate" is meant to refer to the fact that when viewed from a cross-section or side, the strip of strips defines an arcuate pattern including an inner or interior arc, i.e., an arc adjacent the narrow side 300*i*, and an outer or exterior arc, i.e., an arc adjacent the wider, outer, end 300*x*.

Still referring to FIG. 8, it is noted that although alternatives are possible the typical direction of air flow during a filtering operation is depicted at arrows 310*x*, 310*y*. As described in connection with FIG. 7, arrow 310*x* generally is shown as the direction of air flow during a normal filtering operation, entering fanned media pack 300. Arrow 310*y* generally shows a direction of filtered air exit from fanned media pack 300.

Still referring to FIG. 8, media pack 300, in the example shown having a fanned configuration 320, can, again, be characterized as having an arcuate shape with a inner, smaller, arcuate face 300*i*, and an opposite outer, larger arcuate face 300*x*. Alternately stated, the maximally fanned or spread ends of the various strips 301, are generally along face 300*x*, and the minimally fanned or minimally spread ends are generally along face 300*i*. Although alternatives are possible, a typical fanned arrangement, for reasons stated below, the spread or fanned end or face 300*x* will generally be the upstream end or inlet face for normal filtering flow; and, minimally spread or minimally fanned end 300*i* will typically be the outlet end or face, for typical filtering flow operation. Advantages which result from this, are discussed further below.

Herein, in some instances, a reference will be made to a "internal" or "inner" arc of a fanned media pack. Referring to FIG. 8, the internal arc is meant to reference an arc between opposite end strips, for example between strips 301*a*, 301*b*, when measured through the media pack 300. Alternately stated, the "internal arc" is the arc over which the media pack is fanned, measured between end strips of the pack. If the media pack is coiled in a loop, the internal arc is 360°.

It is noted that in some applications the techniques described herein, a portion of the media pack can be fanned, while an alternate portion(s) or an additional portion(s) is not. When reference is meant to an internal arc in those instances, reference is meant to an arc through the media pack between end sheets (of single facer), in the arcuate portion.

FIG. 9, a perspective view of stack 300 in its fanned configuration 320 is depicted. Individual single facer strips 301 can be seen as comprising fluted sheet 303 secured to a facing sheet 304, and sealed thereto, adjacent edge 301*e*, by single facer sealer beads 307.

In FIG. 10, a second perspective view of media pack 300 in fanned configuration 320 is shown.

A number of advantages can be obtained, by configuring a media pack comprising a stack of single facer strips into a fanned or arcuate configuration, in which individual single facer strips are spread apart adjacent the upstream ends or face 300*x*.

A first of these advantages, relates to the issue of masking. In general, wherever a fluted sheet contacts a facing sheet (more generally where two adjacent media sheets connect), masking of media occurs. Masked media sections are inhibited from efficient involvement in the filtering operation. It has been found that as long as two adjacent sheets (for example of fluted sheet and facing sheet) are spaced apart by no more than 0.0035 inch (0.09 mm), masking can be an issue.

Fanning the sheets apart prevents a sheet of one single facer strip from contacting a sheet of the next adjacent strip (or at least being within a masking proximity, i.e. 0.0035 inch or 0.08 mm, of the next adjacent strip), at least along the upstream face 300*x* where the fanning spreads the strips apart the most.

In general, any fanning will lead to improved properties in the media pack for filtering, since it reduces masking Generally, it is desirable to fan the individual layers apart sufficiently so that along at least 25%, typically at least 50%; and, preferably 70% or more, of the lengths of the flutes, from the upstream single facer strip ends 300*x* toward the downstream single facer strip ends 300*y*, the individual flutes of one single facer strip 301 are spaced from the next adjacent single facer strip by at least 0.0035 inch (0.09 mm) or more. The amount of spreading at the end 300*x* which will provide for this, will be dependent, in part, upon the flute length, i.e. a length of the strips 301 between the upstream ends 300*x* and the downstream ends 300*i*. In general, however, for any given selected media pack 300, the desirable amount of spread is a simple trigonometric calculation based upon the flute length of the strips 301. In some instances, a diverging angle between adjacent strips of at least 0.5°, and sometimes 1° or more, will be sufficient. In any event, fanning can provide advantage with many alternate depths (flute length) of media packs, including, for example, ones with flute length of at least 4 inches (10.2 cm) for example 5-12 inches (12.7-30.5 cm).

The advantage discussed in the previous several paragraphs relates to an inhibition of masking, which is accomplished by providing a relatively small amount spacing between at least portions individual strips 301. As the strips 301 are spread apart (by the fanning) even further, additional advantages are obtained. For example as the entrance volume at the inlet face 300*x* is opened up, inlet air (fluid) is not forced into the narrow flute shapes, but rather can enter the larger volume between the individual strips. This provides a number of effects relating generally to improvement in inlet end restriction (air) flow. For example the air (fluid) entering the volume is not forced to accelerate into narrow flute shape volumes, as it is for a blocked, stacked, arrangement in accord with FIG. 6. This means that the air (fluid) can more readily turn to pass through the media with less restriction being involved. The dust then settles and collects more readily, with lower restriction provided by the media pack.

In addition, as the flute sheets are spread apart, a larger volume for loading dust is provided. This can lead to a longer filter life.

In applications in which the contaminant is light and fluffy, for example in an air filter for combine operation (for harvesting beans or other crops) the contaminant includes a substantial amount of "fuzz" from the matter being handled. A fanned arrangement can be advantageous in such applications since the inlet volume is relatively large, for handling such materials.

In general terms, a conventional pleated element is constrained by having the outlet pleat channels roughly equal to the inlet pleat channels. The fanned stacks of single facer strips of media characterized herein, allow the inlet volume to be substantially larger than the outlet channel volume. Thus the fan configuration provides more open channel area for low density contaminate loading and better uses the space available for the air cleaner assembly. Conversely, the only way to achieve an equivalent amount of loading volume with a pleated element would require a near equal amount of clean air volume for the outlet channel, which volume is under utilized, from a volume utilization stand point.

Another advantage to the fanning of single facer strips into an arcuate pattern, is that unusual shaped housing volumes can be more efficiently used. That is, the arcuate shapes allow for media pack configurations that can be adapted for efficient use of restricted housing volumes or shapes. For example, the air filter assembly may be incorporated in a location of limited or restricted shape. The ability to fan the media pack into a uniquely shaped cartridge, can allow for selection of cartridge shape to accommodate non-regularly shaped or sized spaces.

Also, fanning the media pack also allows for advantageous media pack adaptation in reverse pulse systems (pulse jet cleaning systems). Use of such media packs in association with reverse pulse cleaning is described below, in association with FIGS. 18-29.

It will be understood, then, that depending on a number of individual strips 301 contained within the pack 300, a media pack (or portion of a media pack) generally as characterized herein; i.e., comprising a stack of single facer strips 301, (with individual strips being secured to one another along adjacent an edge by a stacking bead 308), can be configured by a variety of fanned, arcuate, shapes. There is no specific requirement that the arcuate (for example fanned, arcuate) shape extend over any selected, specific arc, or that it be fanned only to a circular arc. A variety of alternate shapes, including up to 360° internal arc (closed loop), are possible. Further, fanning can be along an oval arc, (for example an elliptical arc, a circular arc, or alternate arc shapes.

It is noted that to facilitate formation of media stack 300, into an arced stack 320, it may be desirable that the stacking bead indicated generally at 308, FIG. 10 comprise a sealing material sufficiently flexible to facilitate the arcuate fanning. It is anticipated that a foamed polyurethane sealant, of the type characterized herein below as also useful molded-in-place side sections and housing seals, can be used for such an application. However in some instances, a hot melt which also can typically be used for the single facer bead 307, could be used for a stacking bead 308.

From the above, then, it is apparent that advantages can be obtained from incorporating arcuate (in some instances fanned) media packs (or portions of media packs) of single facers strips, into filter cartridges. However, it is generally required to configure the media packs with other cartridge features, to ensure that the cartridge can be installed in an air filter assembly without air being able to bypass filtering flow through the media. Three examples of incorporating media pack 300 into such a filter cartridge are depicted herein in FIGS. 10A-10C.

Figure 10A:
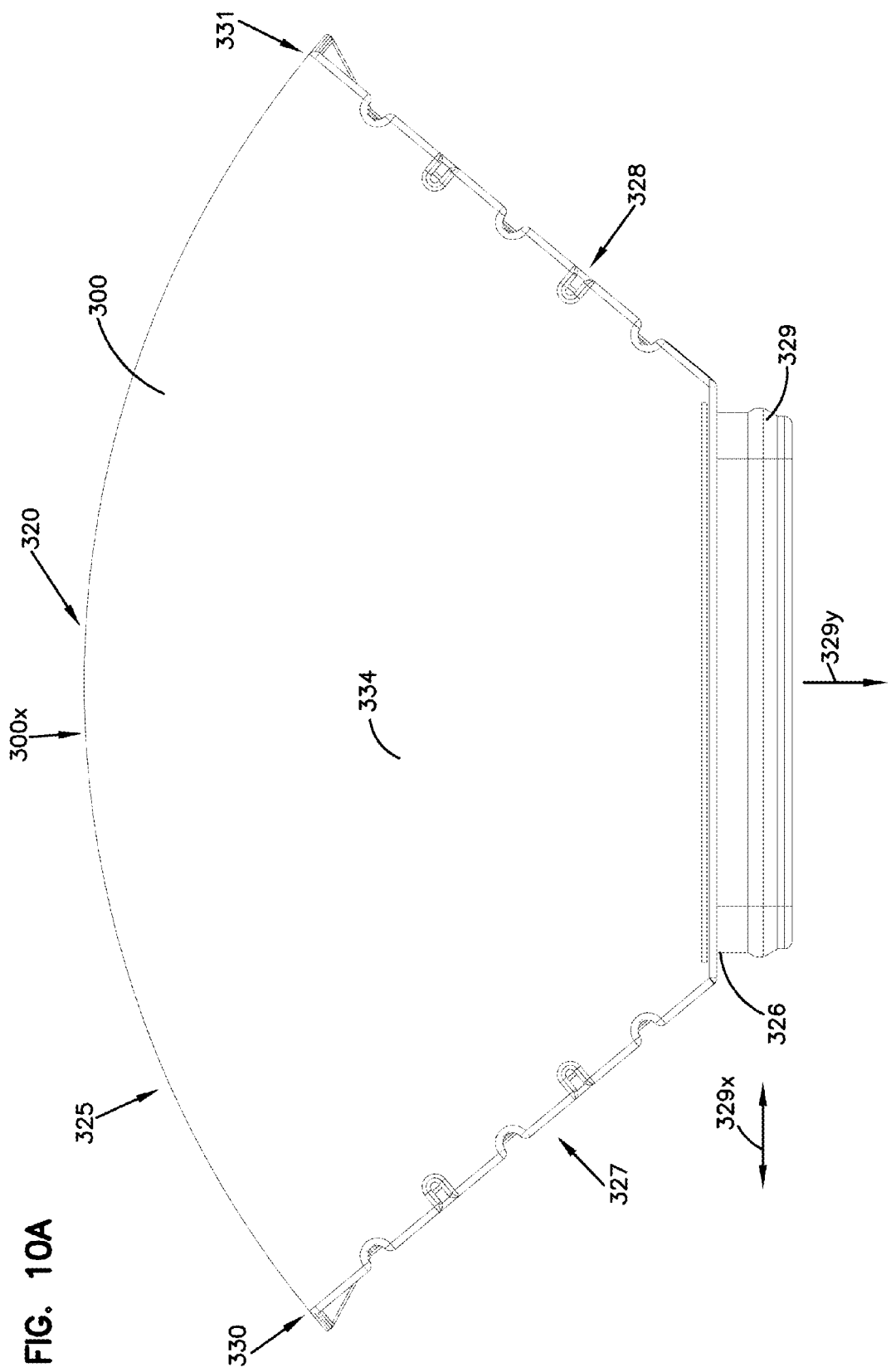
FIG. 10A is a schematic end elevational view of a first example filter cartridge incorporating the media pack of FIG. 8.

Referring to FIG. 10A, fanned media, arcuate, pack 320 is configured in a cartridge 325. Cartridge 325 is constructed analogously to those described in U.S. provisional application 61/135,595, filed Jul. 22, 2008 and incorporated herein by reference. In particular, a preform 326 is formed having sides 327, 328 and a seal arrangement 329 thereon. (In some instances seal material of the seal arrangement can be applied to preform 326 after a remainder of the cartridge 325 is formed). The media pack 320 is positioned between the sides 328, generally adhered thereto by sealant bead adjacent end 300x, for example at 330, 331. Opposite ends 332, 333, FIG. 10, of media pack 300 are sealed closed by molded side pieces (only one of which is viewable in FIG. 10A, at 334; the second would be opposite and typically a mirror image). The cartridge 325, then, is configured to be installed in a housing with which seal arrangement 329 can be sealed, for example by projecting into a groove arrangement. Of course, seal arrangement 329 can be alternately configured. The particular seal arrangement 329 depicted, is configured to form a radially directed seal; i.e., seal with sealing forces in one or both of the general directions of double headed arrow 329x; the directions being generally orthogonal to air flow exiting a cartridge 325 in the direction of outlet air flow direction arrow 329y. The particular seal arrangement 329 depicted, is configured to at least form an outwardly directed seal, and can be configured to also form an inwardly directed radial seal; or, to alternately only form an inwardly directed radial seal.

Figure 10B:
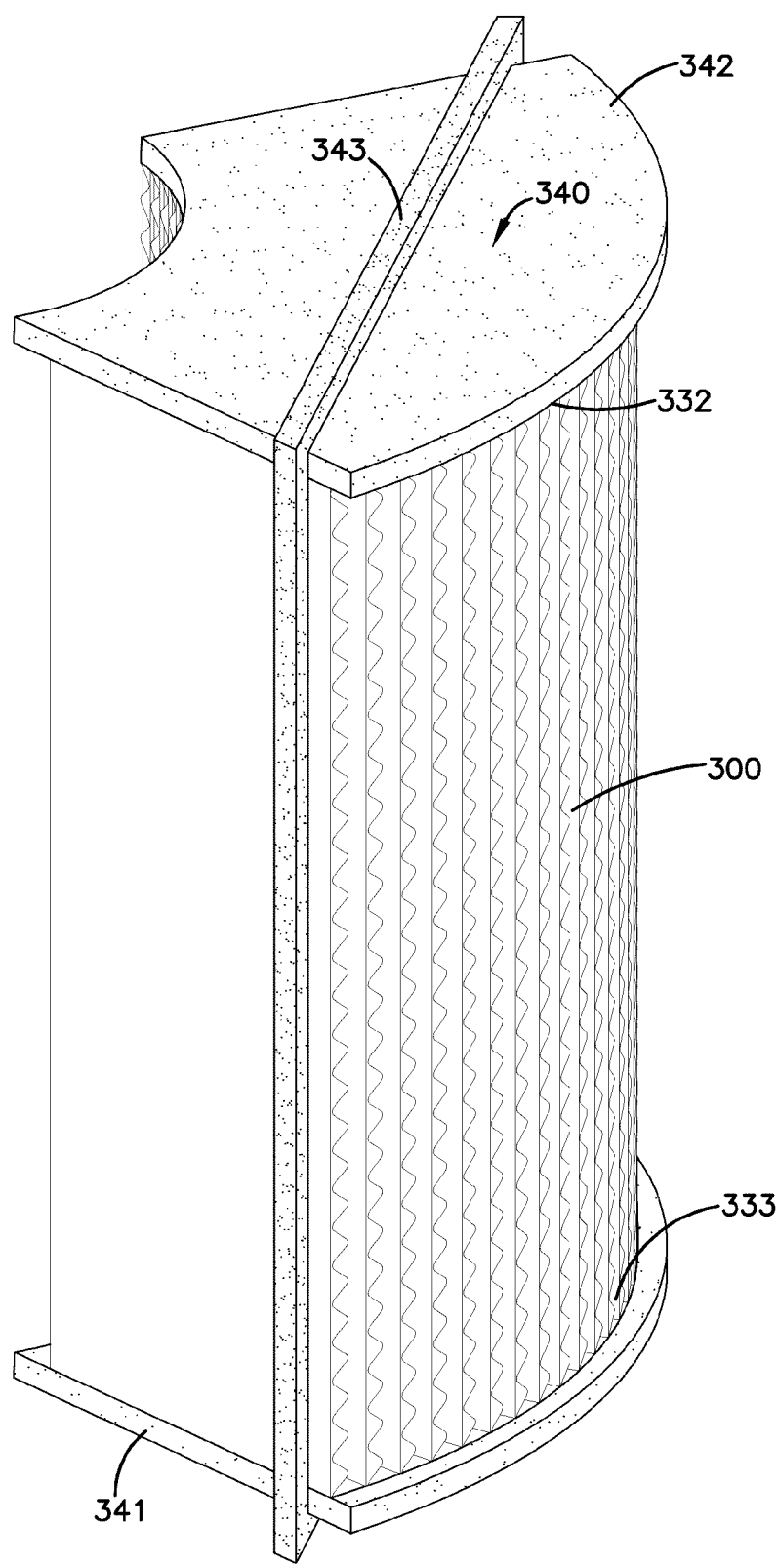
FIG. 10B is a schematic perspective view of the second example filter cartridge incorporating the media pack of FIG. 8.

A second example cartridge is depicted generally at 340, FIG. 10B. Here, the media pack 300 has molded-in-place side pieces 342, 341, positioned over opposite ends 332, 333, FIG. 10. Seal member 343 is positioned (typically molded-in-place) to completely surround the media pack 300 (including side pieces 340, 341). Seal member 343 is configured to operate as a pinch seal, between air filter assembly components, to ensure that air to be filtered must pass through the media pack 300 before filtering. Such a seal can be analogous to the ones described in WO 2007/133635, published Nov. 22, 2007, the disclosure of which is incorporated herein by reference.

Figure 10C:
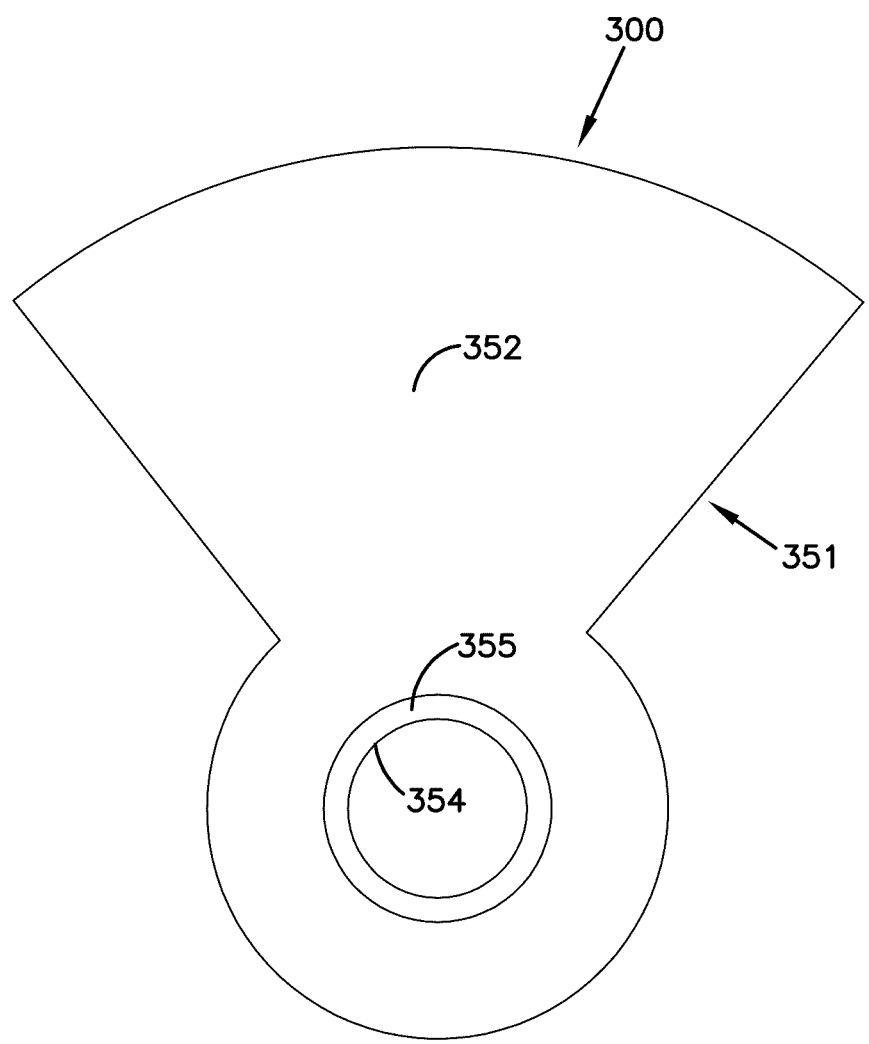
FIG. 10C is a schematic end elevational view of a third example filter cartridge incorporating the media pack of FIG. 8.

A third cartridge is depicted schematically in FIG. 10C at 350. Here, media pack 300 is positioned within a sheath 351, with oppositely positioned (typically molded-in-place) side (end) pieces (only one of which is shown at 352, the other being oppositely positioned). Molded-in-place side piece 352 includes an aperture 354 therethrough, around which is provided a seal arrangement 355. This will be a construction generally analogous to those described in U.S. provisional application 61/130,790, filed Jun. 2, 2008, the complete disclosure of which is incorporated herein by reference. The particular seal arrangement 355 depicted, is configured for formation of a radial seal with a portion of an air filter assembly.

Figure 11:
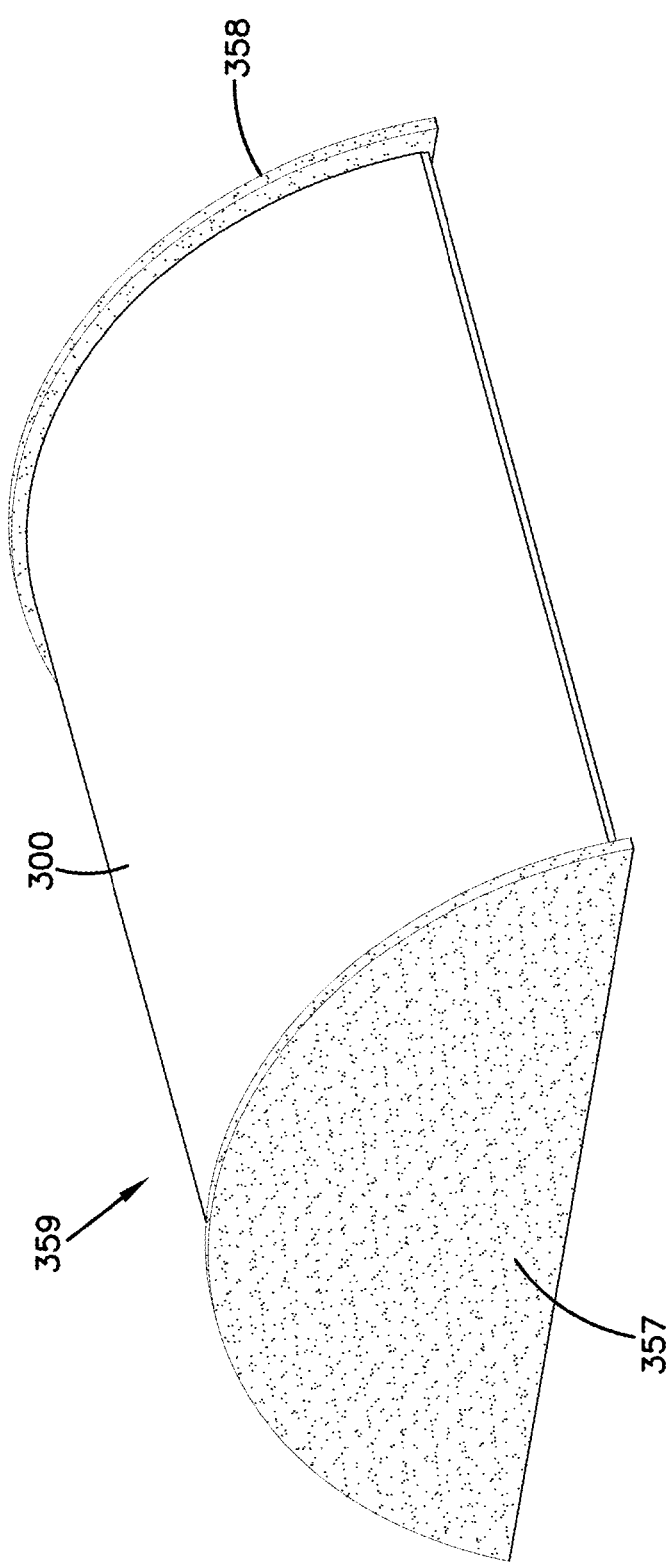
FIG. 11 is a schematic perspective view of an arcuate media pack incorporated into a semicircular shape with end pieces.

Of course, the same principles and variations can be applied, even if the media pack 300 is fanned or otherwise modified to a different arcuate shape. An example is shown in FIG. 11, in which the media pack 300 is fanned to a semi-circular shape; i.e., a 180° internal arc. Referring to FIG. 11, cartridge 300 is positioned in extension between ends pieces 357, 358, which are positioned to close end of the strips. A pinch seal analogous to pinch seal 343, FIG. 10B, could be positioned on the arrangement 359, of FIG. 11. Of course media pack 300 fanned into a semicircular shape, could be incorporated with a cartridge using alternate seal arrangements, for example analogous to those depicted in FIGS. 10A and 10B.

It is noted, of course, that the number of strips within in a stack or stack section may be varied, depending upon how large an arch, and the specific shape of the arch, over which the media pack (or media pack portion) is to be shaped, for example fanned. By using the same reference numeral, 300, for various media packs characterized herein, it is not meant that each identified media pack has the same number of strips.

Figure 12:
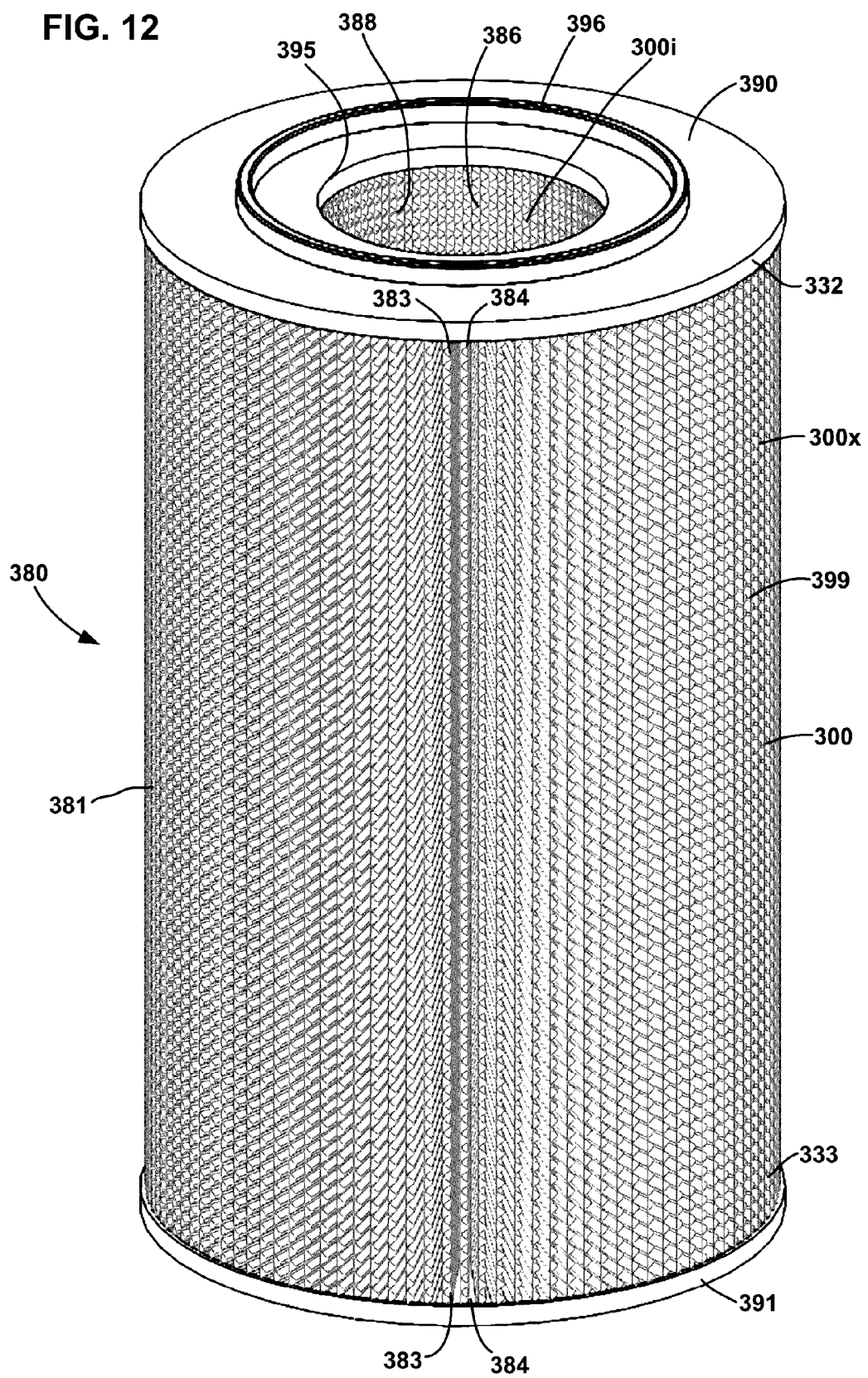
FIG. 12 is a schematic top perspective view of a filter cartridge incorporating a fanned media pack configured in a complete 360°, or closed loop, arcuate shape.
Figure 13:
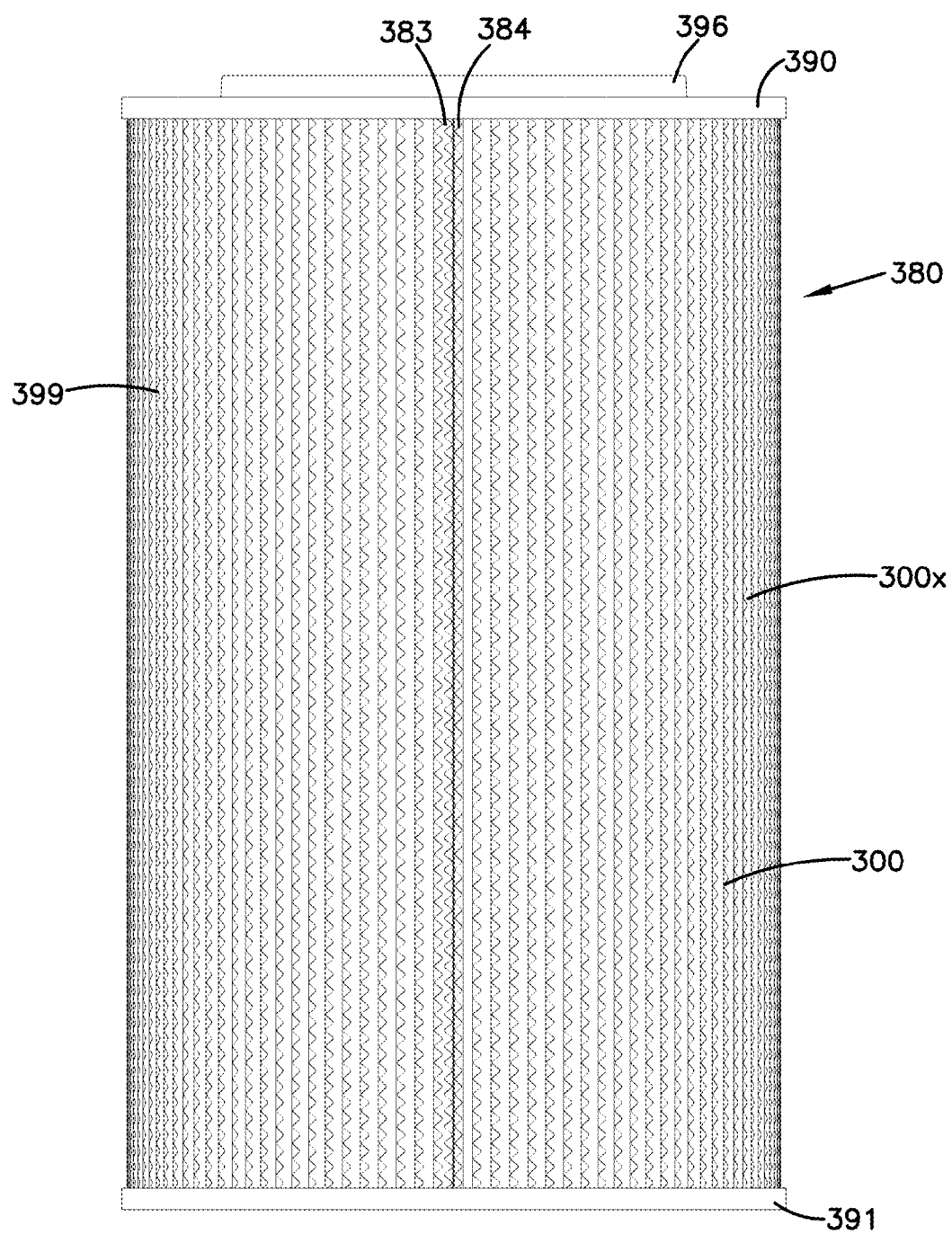
FIG. 13 is a schematic side elevational view of the cartridge of FIG. 12.

Another example air filter cartridge is depicted in FIGS. 12-13. Referring to FIG. 12, cartridge 380 is depicted as comprising a media pack 381. The particular media pack 381 comprises a stack 300 fanned into an arcuate closed loop shape which extends completely around a 360° arc. Referring to FIG. 12, assume for purposes of example, that strips 383, 384 comprise the top and bottom strips of the stack 300 before fanning into the arcuate shape 381. Adjacent inner edge 386, of the stack 300, a bead of sealant can be provided between strips 383, 384, to ensure the end strips 383, 384 do not define a leak path therebetween for air to be filtered, by cartridge 380. A media pack, 381, configured in a closed loop orientation, such as that in FIG. 12, is characterized as comprising media stack 300 fanned in an arcuate shape around the central, open, filter interior 388. There is no specific requirement that the "closed loop" of a closed loop configuration be defined as circular arc, and alternate configurations are possible.

Still referring to FIG. 12, opposite ends 332, 333, of the fanned media pack 300 are shown sealed to, or potted to, opposite end pieces 390, 391. In the particular example depicted, end piece 390 has a central aperture 395 therethrough, in communication with open central volume 388. End piece 390 includes a housing seal arrangement or member 396 thereon, which surrounds aperture 395. Seal member 396 can be pressed, axially, against a surface of an air filter assembly, to seal cartridge 380 around a clean air outlet. Thus, herein, seal member 396 will sometimes be referred to as a "housing axial seal" or by similar terms.

In some applications, for the particular configuration depicted in FIG. 12, of cartridge 380, end piece 391 would be closed, i.e., it would not include an aperture analogous to aperture 365 therethrough. In some applications, end piece 391 could be provided with an aperture analogous to aperture 395 therethrough, and also with a seal analogous to seal 396. For such an example, when cartridge 380 is used, the central aperture in end piece 391 would need to be closed, for example by a pressure plate or analogous structure.

It is noted that the example cartridge 380, depicted relies upon a sealing forces directed "axially." By the term "axial" and variants thereof in this context, reference is meant to sealing pressure in a general direction of a central longitudinal axis through open central volume 388 in a direction between end pieces 391, 390.

By comparison to a typical fluted media, typical media strips 301 can provide a cylindrical media pack 399, which is somewhat stronger in the axial direction. This in part results from the adhering of the fluted sheet to the facing sheet, in individual strips 301. The strength may be increased even further, if, adjacent the stream ends 300x, the individual strips are darted in accord with FIG. 5, or are otherwise pressed or crushed against one another, forming a strong, stiff, edge seam in each strip 301.

As a result, in some example applications, cartridge 380 may be used without further structure therein, to provide axial strength to the cartridge 380. On the other hand, in some example applications, it may be desirable to provide an expanded metal liner or other perforate support member, against either or both of inner, or downstream, face 300i and the outer, or upstream, face 300x. Such supports will provide for shape retention, as well as increasing axial strength (against deformation or collapse of cartridge 380).

It is also noted that by comparison to a cylindrical media pack of pleated paper, a cylindrical media pack comprising a fanned stack of single facer strips can be configured to advantage with a relatively long media depth. That is, ordinary pleated media is somewhat limited with respect to the depth of pleats that can be formed, due to pleat collapse masking media inhibiting air flow. When media depth comprises a single facer strip of fluted media secured to the facing media, relatively long media depths, outside edge to inside edge can be formed. Thus with arrangements in accord with the descriptions herewith, a variety of media pack depths are possible. Indeed depths (distance from upstream edge to downstream edge in the various strips) on the order of 4-12 inches (10.1-30.5 cm) can be accommodated.

In FIG. 13, a schematic side elevational view of cartridge 380 is depicted.

Figure 14:
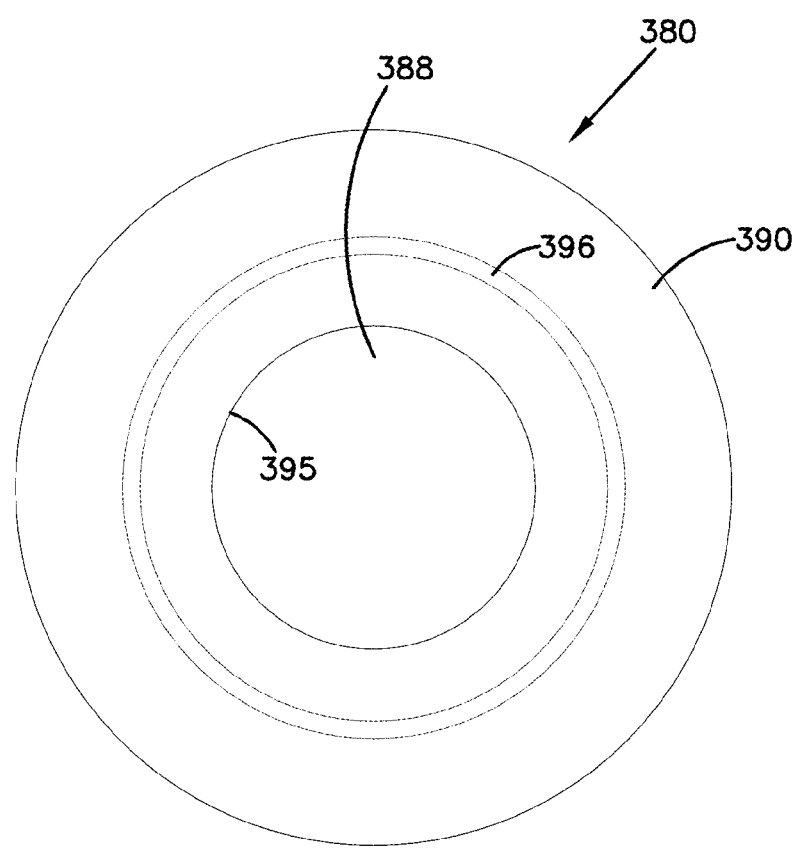
FIG. 14 is a schematic top plan view of the cartridge of FIGS. 12 and 13.

In FIG. 14, a schematic top plan view of cartridge 380 is depicted.

Still referring to FIGS. 12-14, it is noted that the particular media pack 300 depicted, being a cylindrical configuration, requires that the media pack 300 be formed in a typical manufacturing operation into a stack, which is then be fanned into the full 360° loop orientation, while a final sealant bead is positioned adjacent edge 300i. It will, in some instances, it may be desirable to use for the particular sealant bead in cartridge 380, described above as being between layers 383, 384, a material which will set relatively quickly, to inhibit media pack 300 from collapsing out of the cylindrical shape. Also it will be desirable, in some instances, during manufacture, to provide a support to retain the media pack 300 in the closed loop orientation, as the sealant bead between the end layers 383, 384 sets.

IV. Example Filter Assembly and Cartridges Therefor, FIGS. 15-26

Filter cartridges of the type generally described herein above, can be applied in a variety of fluid filter assemblies. Herein, example air filter assemblies are depicted. The term "air filter assembly" is generally meant to refer to an assembly configured for directing air to be filtered therethrough, with passage through one or more air filter cartridges. Air filter assemblies can used in a variety of applications. Air filter assemblies that are used to filter engine intake air for internal combustion engines as used in vehicles and other equipment, are sometimes referred to as air cleaner assemblies. Air filter assemblies that are used for filtering air from industrial processes, are sometimes referred to as dust collectors or by similar terms. Air filter assemblies are also used for air intake to gas turbine systems. Also, cabin air filters are air filter assemblies are used for filtering air in aircraft and vehicle (or equipment) cabins. The term "air filter assembly" as used herein generally, as not meant to indicate a specific application for air filtering, without further characterization.

In FIGS. 15-29, an air filter assembly and components therefor, configured to use a fanned or arcuate media pack generally in accord with the principles discussed above for media pack 320, are depicted. Specifically in FIGS. 15-17, filter cartridge 400 for use in an air filter assembly 401, (FIGS. 18-29) is depicted.

Figure 15:
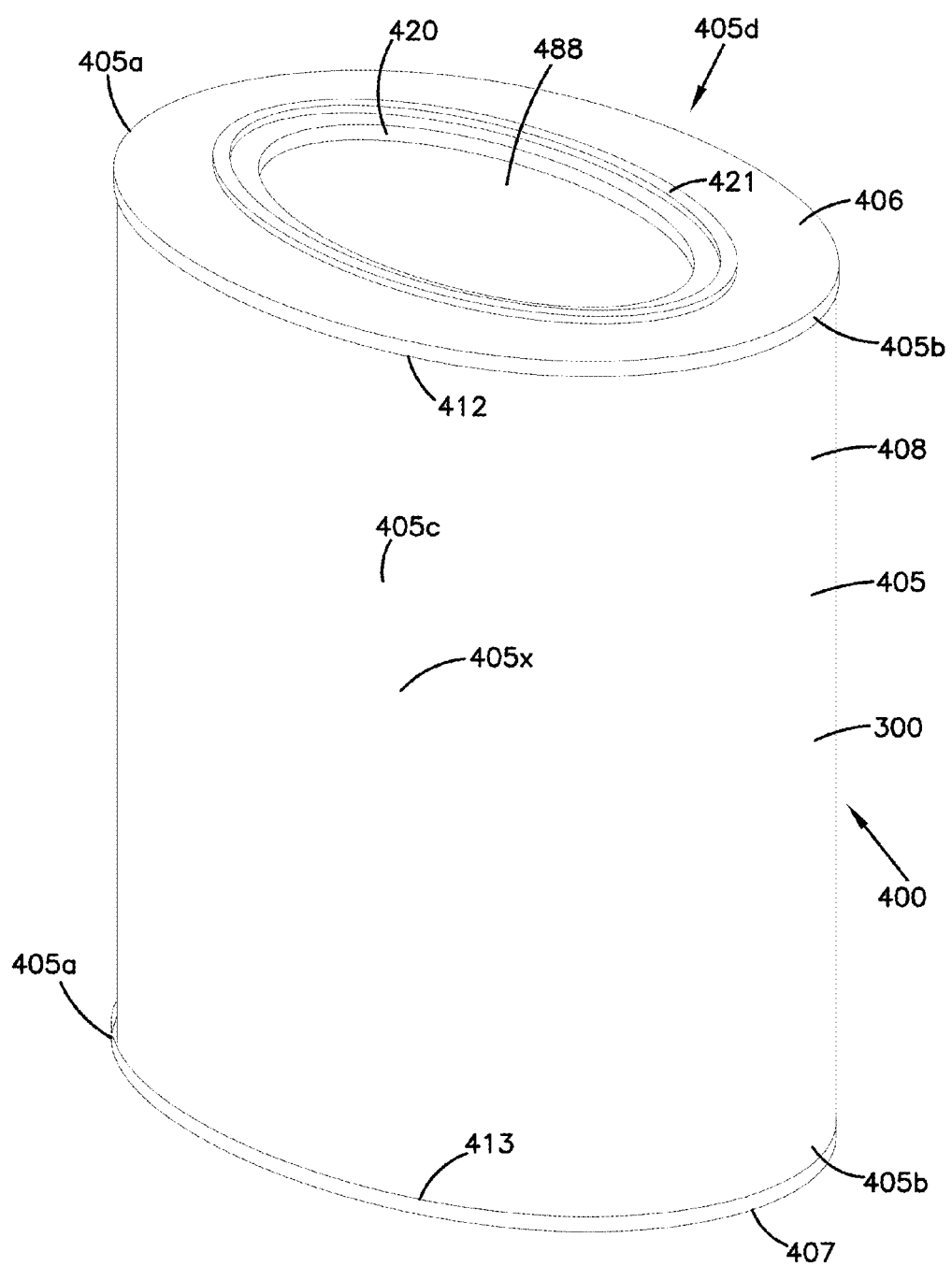
FIG. 15 is a schematic perspective view of a second filter cartridge incorporating a fanned media pack, configured in a complete 360°, or closed loop, arcuate shape, in this instance an oval shape.
Figure 16:
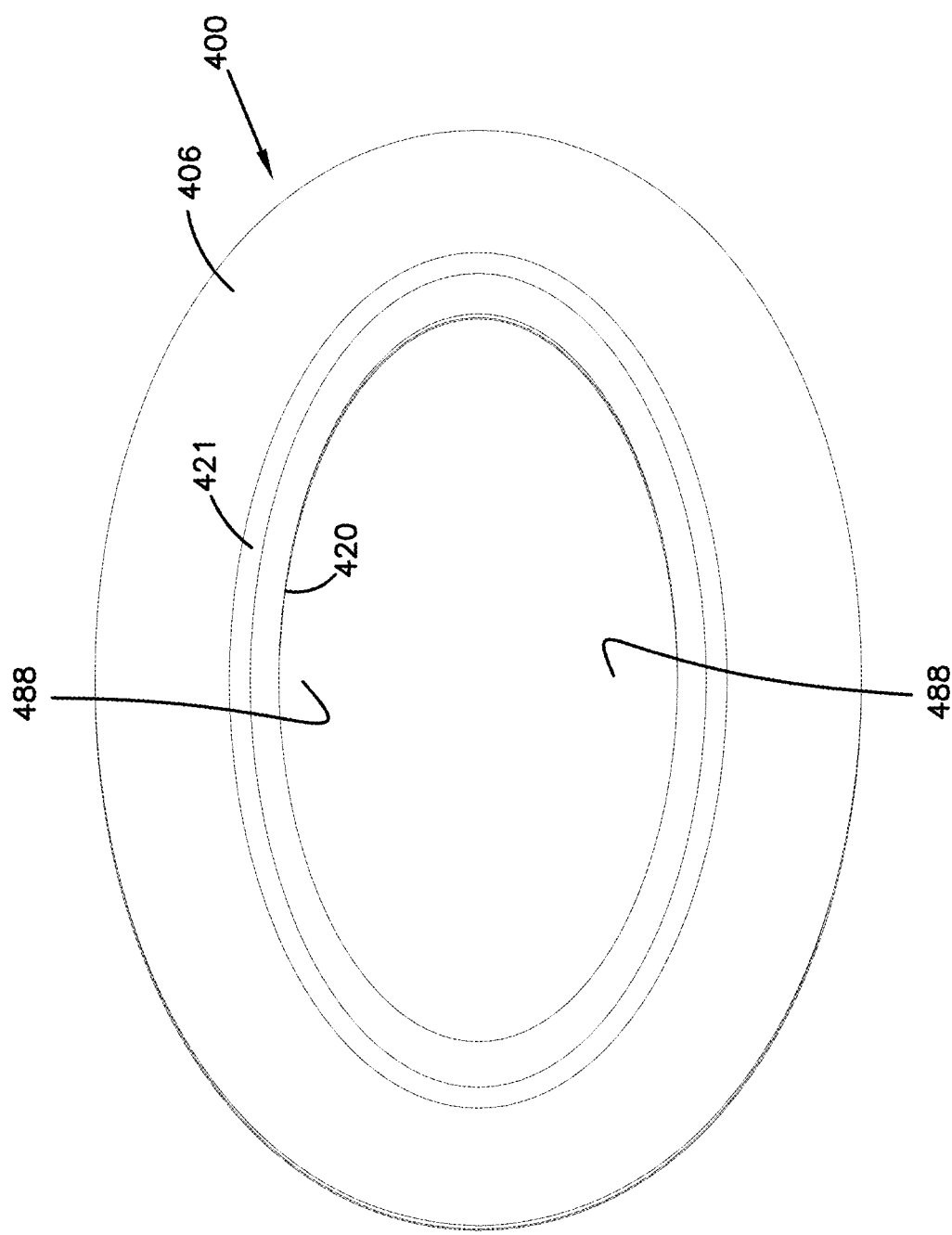
FIG. 16 is a schematic top plan view of the filter cartridge of FIG. 15.
Figure 17:
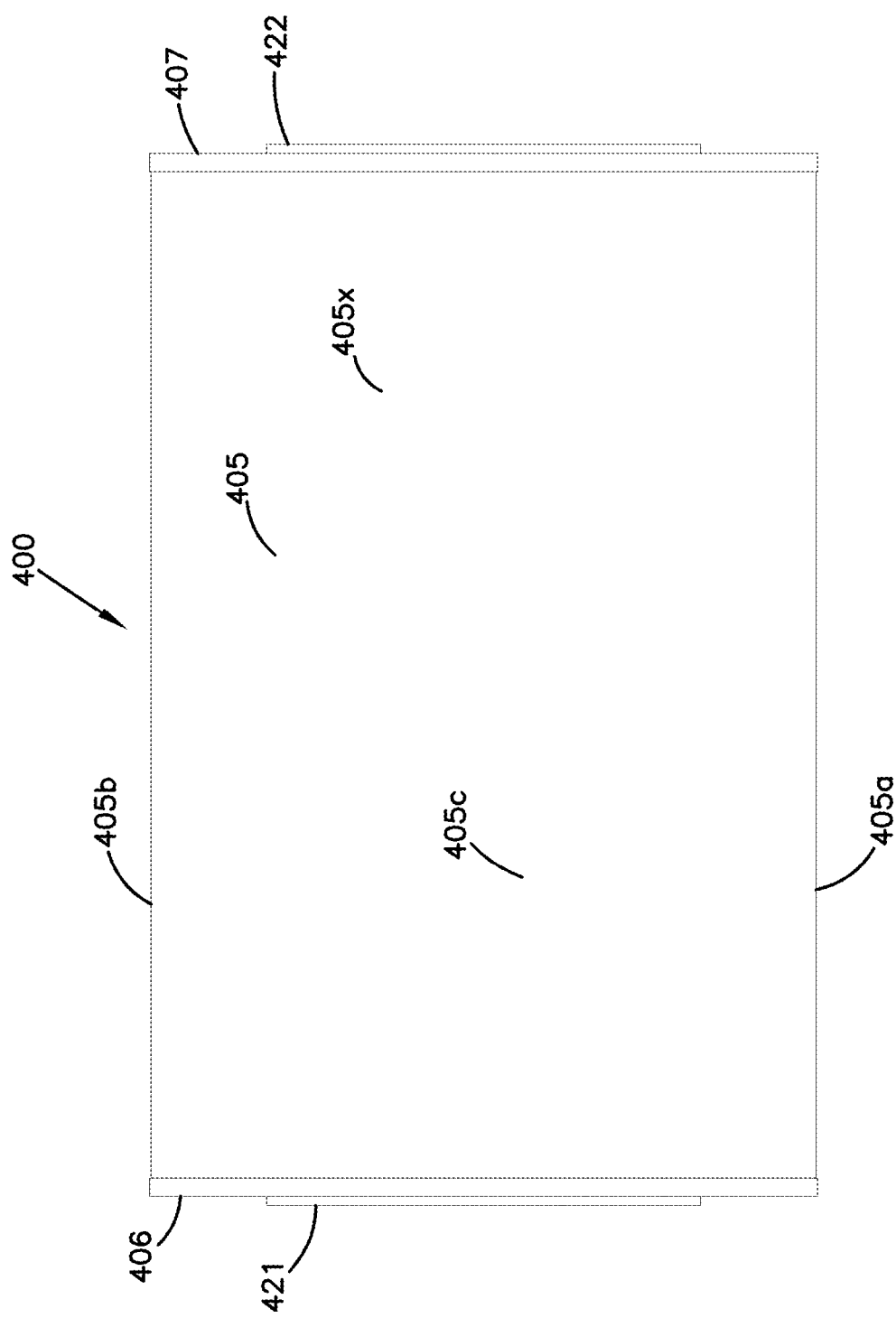
FIG. 17 is a schematic side elevational view of the cartridge of FIG. 15.

Attention is first directed to cartridge 400, FIGS. 15-17.

Referring first to FIG. 15, cartridge 400 generally comprises a media pack 405 extending between end pieces 406, 407. Media pack 405 generally comprises an arcuate media pack corresponding generally to media pack 300, fanned into a closed loop (arcuate) configuration 408. Thus media pack 405 comprises a plurality of single facer strips (301, FIG. 7) each comprising a fluted sheet secured to a facing sheet, and fanned around a 360 degree arc, to form a closed loop. The particular configuration of media pack 405, FIG. 15, is to an oval (in this example elliptical) shape, having opposite narrow, carved, ends 405a, 405b, and more widely arcuate opposite sides 405c, 405d.

It is noted that herein when it is said that media pack 300 is used in cartridge 405, reference is meant to the media pack generally. The specific number of layers, i.e. single facer sheets or strips, can be modified to accommodate the particular volume and shape desired.

In general, media pack 405 is configured for the fanning to surround an open central interior 488, which will generally comprise a clean air volume when cartridge 400 is used.

Still referring to FIG. 15, end pieces 406, 407 are positioned over opposite sides 412, 413 of media pack 405. For the particular example depicted, the end pieces 406, 407 can be molded-in-place, for example from a hard urethane, or can comprise metal or preformed plastic pieces, secured to the media pack 405 with potting.

Still referring to FIG. 15, end piece 406 has a central aperture 420 therethrough, providing air flow communication with an open interior 488. For the example cartridge 400 depicted, end piece 407 includes an aperture analogous to aperture 420 therethrough.

For the particular example cartridge 400 depicted in FIG. 15, aperture 420 has an oval shape, a specific example an elliptical shape. In a typical arrangement, the elliptical shaped aperture 420 would have a length ratio of longest axis-to-shortest axis, within the range of about 2.1 to 1.3, inclusive, although alternatives are possible.

Surrounding aperture 420, on end piece 406, is provided seal member 421. An analogous seal member 422, FIG. 17 is provided on end piece 407.

As a result of the above described instruction, cartridge 400 has opposite ends corresponding to end pieces 406, 407 which are the same. Thus, the cartridge 400 can be mounted in either of two orientations. This will be apparent from discussions below with respect to assembly 401.

As previously described with respect to FIGS. 12-14, the media pack 405 of cartridge 400 can be provided with either or both of an inner liner inside region 488 adjacent the media pack 405, and an outer liner around outer surface 405x, to provide support to the media pack 405 and/or axial strength to cartridge 400. For example, an expanded metal liner or plastic mesh can be used.

In FIG. 16, a top plan view of cartridge 400 is depicted, and the shape of aperture 420 and seal member 421 can be seen.

In FIG. 17, a side elevational view of cartridge 400 is depicted, taken generally toward side 405c. Here end piece 407 can be depicted, with seal member 422, analogous to seal member 421, thereon.

It is noted that in some applications, end piece 407 could be closed, i.e., not have a central aperture therethrough.

A variety of specific dimensions for the cartridge 400 are possible. In some typical applications, the cartridge will have a ratio of longest cross-sectional axis-to-shortest cross-sectional axis within the range of about 1.1-1.8, typically 1.1-1.4, although alternatives are possible. In a particular example system, the media pack longer cross-sectional dimension is 25.97 inches (66 cm) and has a narrower cross-sectional width, orthogonal to the longer cross-sectional width, of about 18.26 inches (46.4 cm). An example length of the media pack would be about 26 inches (66 cm).

Figure 18:
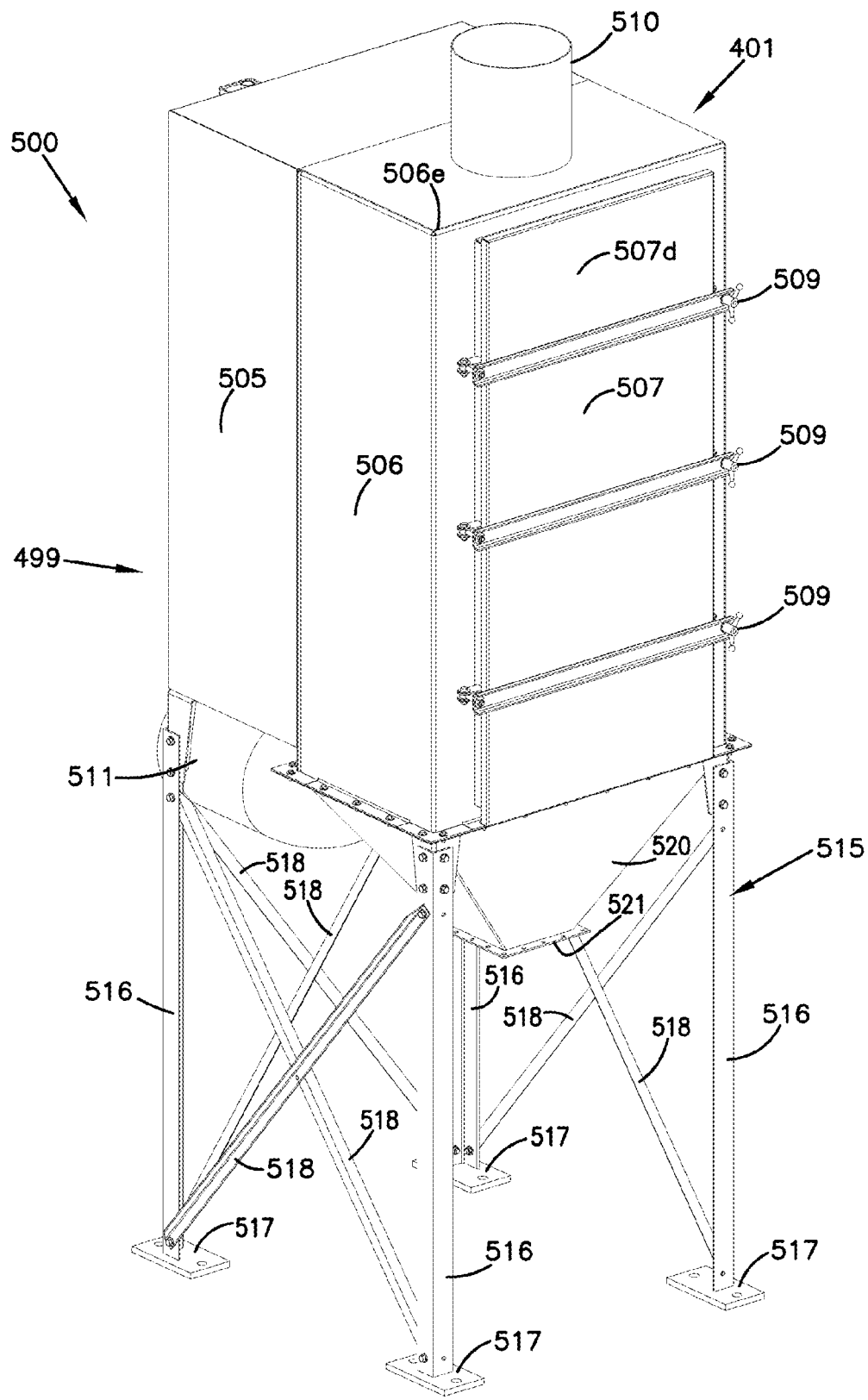
FIG. 18 is a schematic perspective view of an air filter assembly including at least one cartridge in accord with FIGS. 15-17 therein.

Attention is now directed to FIG. 18, which an air filter assembly 401 is depicted, configured, for example, for use with one or more air filter cartridges as generally characterized herein; i.e. which include a media pack comprising an arcuate, fanned, arrangement of single facer strips; each single facer strip comprising fluted media secured to facing media. The particular air filter assembly 401 depicted, is a dust collector for an industrial process. However, the features and characteristics described, can be used in air filter assemblies for alternate purposes.

Referring to FIG. 18, the particular air filter assembly 401 depicted, is of a type generally characterized herein as a reverse pulse air filter assembly 499. By the term "reverse pulse" air filter assembly and variants thereof, as used herein, it is meant that the air filter assembly 401 is configured so that one or more (selected) pulse jets of gas (typically air) can be directed through an operably installed air filter cartridge in a direction opposite to a direction of normal air flow during filtering. This effect allows for periodic cleaning of dust from the filter cartridge, regenerating the filter cartridge for continued filtering. This process can extend the lifetime of the filter cartridge use, before servicing; i.e. before replacement. In some instances "reverse pulse" air filter assemblies and features will also be characterized herein as "pulse jet" air filter assemblies and features, or by similar terms.

In general, pulse jet air cleaners with alternate filter cartridges are known; see for example WO 2006/105438, published Oct. 5, 2006; U.S. Pat. No. 6,488,746; and, WO 2007/149388, published Dec. 27, 2007; each of which is incorporated herein by reference. It is noted that many of the reverse pulse cleaning techniques described in these references can be incorporated in a reverse pulse jet air cleaner 499 including one or more filter cartridges with media packs as characterized herein.

It is also noted that the media of the filter cartridge in assembly 401, comprises single facer media (fluted sheet secured to facing sheet). It is advantageous for reverse pulse operation, for the media pack to be fanned at the inlet flow face. This means that as the reverse pulse cleaning jet, which extends into the outlet flow face of the media pack, leaves the media pack along the inlet flow face, it will help move dust in an efficient manner from the cartridge.

Still referring to FIG. 18, again the particular reverse pulse or pulse jet air filter assembly 499 depicted, is an industrial dust collector 500. Thus, the particular air filter assembly 401 depicted, is configured to be positioned in association with an industrial site or process, to filter air from the process, for removal of contaminant, for example, particulate comprising dust and related materials.

Referring to FIG. 18, in general terms, air filter assembly 401 comprises a housing 505 including a housing body 506 and access cover 507. The access cover 507 is positioned over an end 506e, of the housing body 506. The access cover 507 is configured to open housing end 506e, for service access to an interior of housing 505.

A variety of alternate configurations for the access cover 507 are possible. The particular access cover 507 depicted, comprises a door 507d, which is hingedly mounted and which can be opened by turning of latches 509. It is noted that in alternative applications of the techniques according to the present disclosure, the access cover 507 can be configured to be completely removed from housing body 506 when opened.

Still referring to FIG. 18, air filter assembly 401 generally includes an air flow inlet arrangement 510 and an air flow outlet arrangement 511. Air to be filtered generally enters housing 505 through air flow inlet arrangement 510. Filtered air from the air cleaner assembly 401, is removed via air flow outlet 511.

Still referring to FIG. 18, the housing 505 includes a mounting pad arrangement 515 thereon. The mounting pad arrangement 515 allows the housing 505 to be positioned appropriately for use. The particular mounting pad arrangement 515 comprises a plurality of legs 516 and feet 517 with interconnecting braces 518.

The air filter assembly 401 further includes a dust ejection assembly 520, with a dust outlet 521.

In general terms, when the air cleaner assembly 401 is operated with reverse pulsing, at least a portion of dust which is dislodged from an enclosed filter cartridge, eventually falls into dust ejector assembly 520. This dust can be removed from the ejector assembly 520 through the dust outlet 521, and be directed, for example, into a bin, not depicted.

Generally, during an operation of filter assembly 401, dust outlet 521 will be closed. A variety of arrangements to close dust outlet 521 can be used including: a hose and drum collector arrangement; attachment to a screw conveyor or other mechanism for moving dust; or, providing a slide gate or air lock in association with outlet 521. In general terms, what is desired is that during operation, unfiltered air is not drawn into assembly 401 through dust outlet 521.

Figure 19:
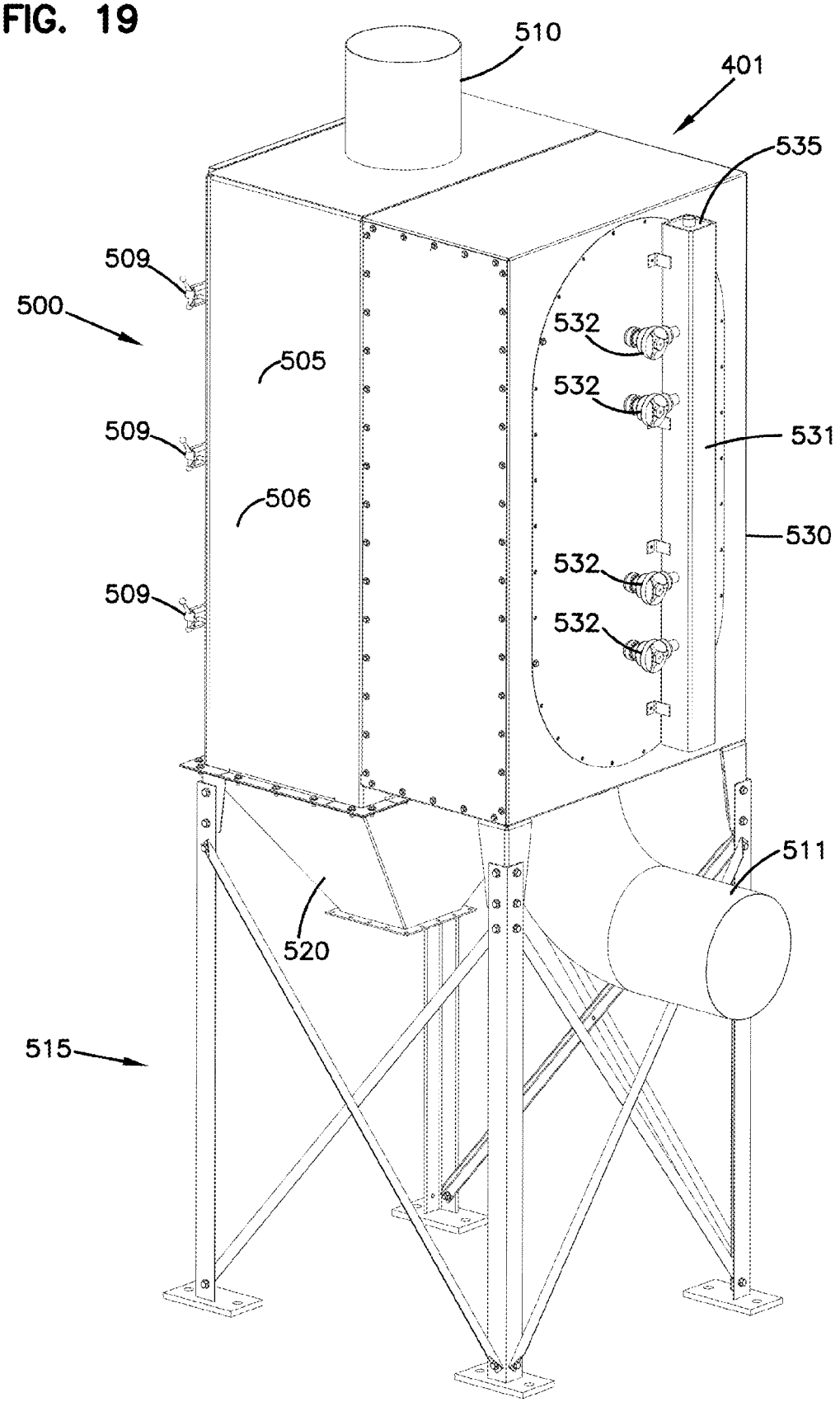
FIG. 19 is a schematic second perspective view of the air filter assembly of FIG. 18.

Attention is now directed to FIG. 19. Selected features already characterized are generally indicated by like reference numerals. In FIG. 19, pulse jet cleaning assembly 530 is depicted, comprising a charge tank 531 and a plurality of pulse jet valves 532. In general terms, the charge tank 531 is positioned to be periodically charged with a compressed gas, for example air, to be used for the pulse jet cleaning operation. Pulse jet valves 532 are positioned to receive compressed gas from the charge tank 531 and to be operated (for example controlled by a solenoid switch arrangement) to selectively direct a pulse jets of gas into housing 505, directed in a desirable manner, as discussed below, to provide pulse jet cleaning of one or more enclosed filter cartridges. It is noted that the charge tank 531 can be attached via compressed air lines to a compressed air source, such as a remote tank or compressor system. A nozzle 535 for such a connection is shown. It is also noted that the air filter assembly 401 can be provided with a variety of electronic systems, for control of the pulse jet valves 532, as desired.

Figure 20:
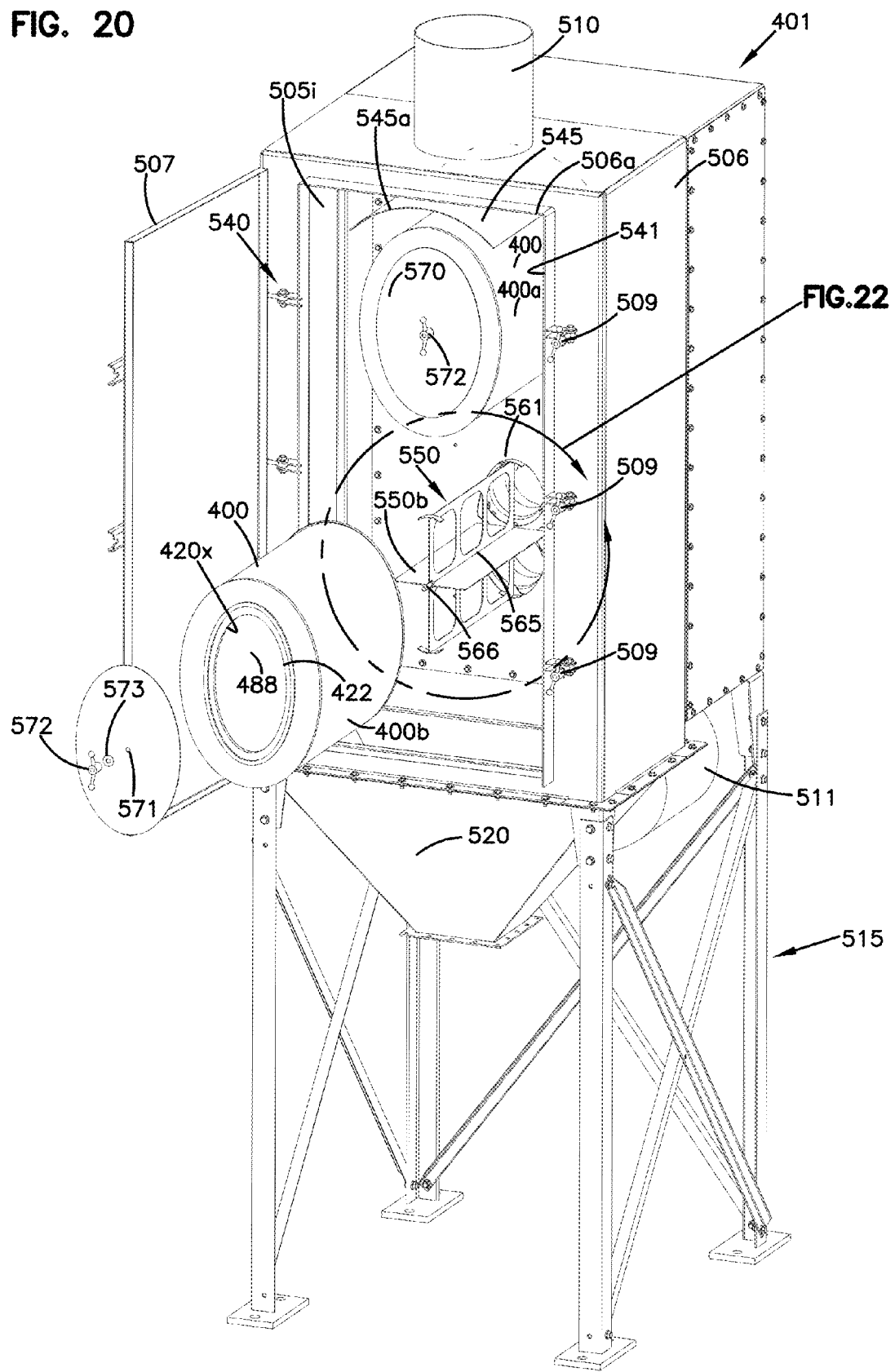
FIG. 20 is a schematic, exploded, access end perspective view of the air filter assembly of FIGS. 18 and 19, depicted with a first, upper, filter cartridge installed and a second, lower, filter cartridge being installed.

Attention is now directed to FIG. 20. Here air filter assembly 401 is depicted, with access cover 507 opened. That is, latches 509 have been rotated to allow access cover 507 to pivot around hinge arrangement 540, opening an access aperture 541 at end 506e of housing body 506 for service access to an interior 505i of housing 505.

Still referring to FIG. 20, it is noted that the particular housing 505 depicted is configured to receive, operably installed therein, two filter cartridges 400a, 400b, in the example shown each generally corresponding to filter cartridge 400, FIGS. 15-17. It is noted that alternate configurations for the housing 505, to receive an alternate number of, or shape of, cartridges, is possible.

Referring to FIG. 20, it is noted that the air cleaner assembly 401 is depicted in partial exploded view, with one of the cartridges 400, in particular cartridge 400b, shown in exploded view, i.e. as it generally would appear either during mounting or dismounting.

Referring to FIG. 20, mounted inside of housing 505, adjacent inlet arrangement 510, is depicted deflector plate arrangement 545. The deflector plate arrangement 545 is positioned as a baffle so that inlet air passing into interior 505 from inlet arrangement 510 is diverted from direct impingement on cartridge 400a. Rather, the air is forced to become distributed within in interior 505i, to help with more even distribution of dust loading of the two cartridges 400a, 400b. Deflector plate 545, then, in general comprises an inlet baffle or shield 545a.

Figure 21:
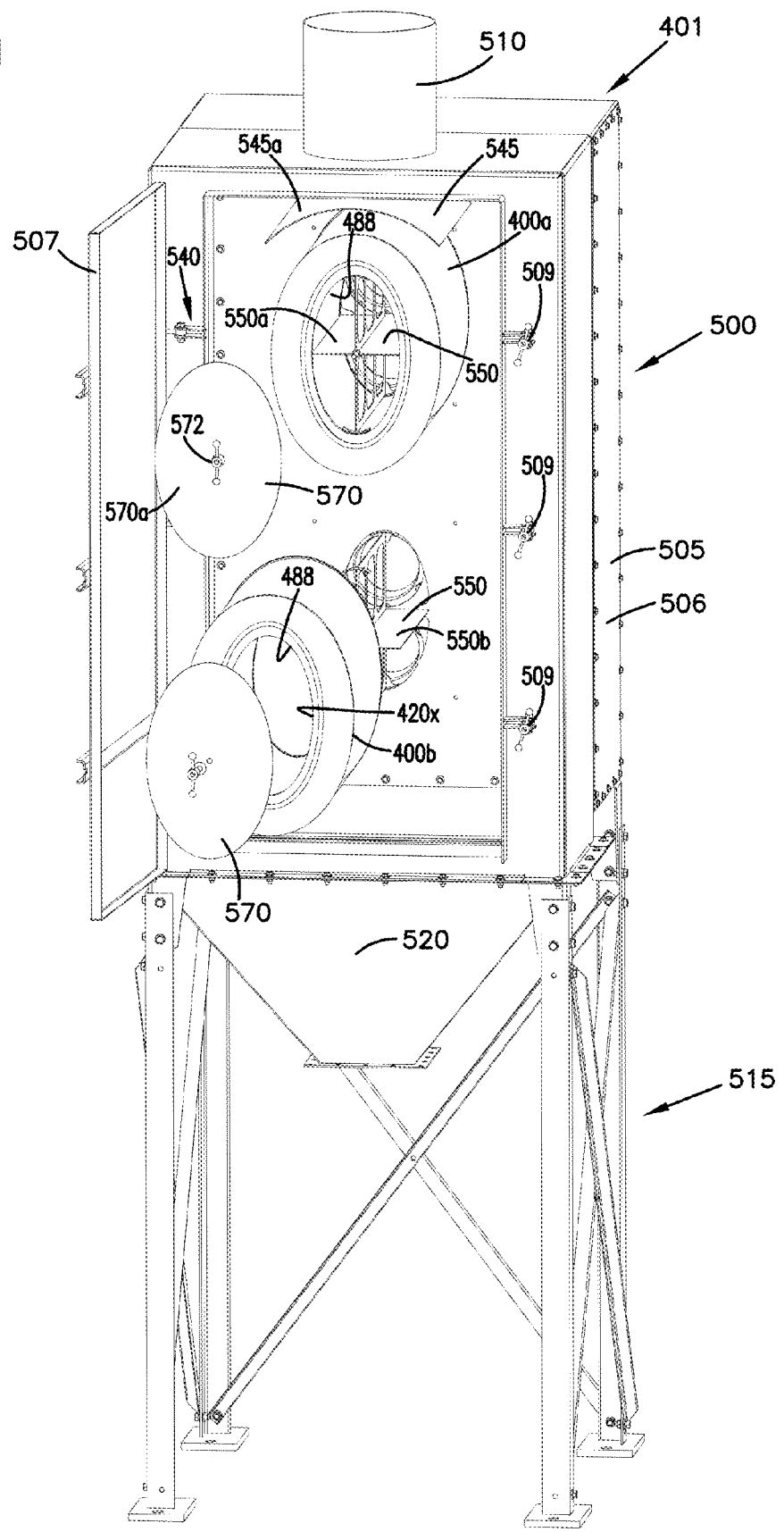
FIG. 21 is a second schematic, exploded, access end view analogous to FIG. 20, but depicting a retainer plate for first cartridge in exploded view as well.

Still referring to FIG. 21, each cartridge 400a, 400b is mounted over a separate cartridge support or yoke 550. In FIG. 20, the particular cartridge support or yoke 550b, for cartridge 400b is depicted. Of course, an analogous cartridge support or yoke (550a) would be positioned with cartridge 400a mounted thereover.

Figure 22:
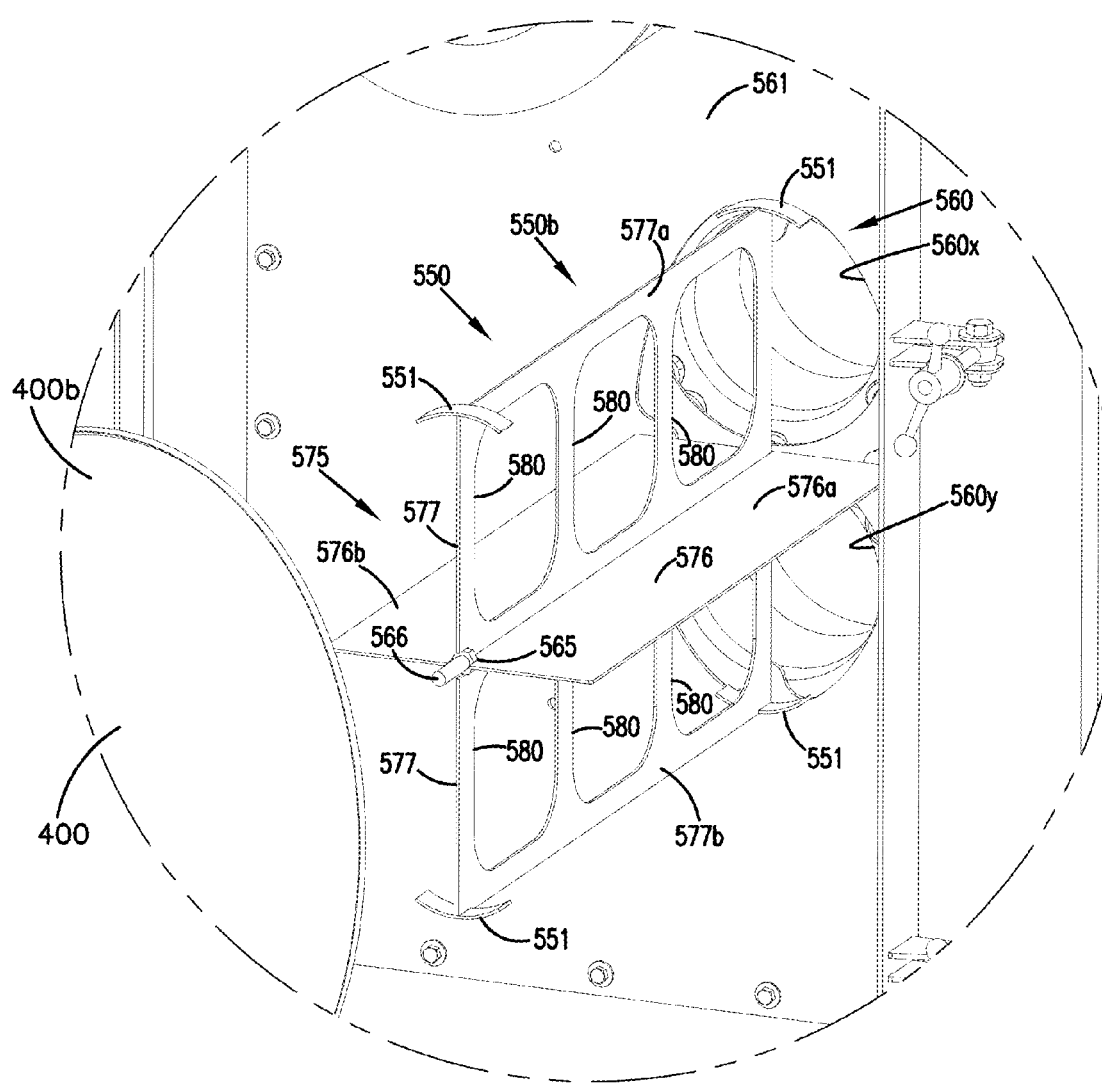
FIG. 22 is an enlarged, fragmentary, schematic view of a selected portion of FIG. 20.

Attention is now directed to FIG. 22, a fragmentary view of a selected portion of FIG. 20, in which cartridge support or yoke 550b is depicted in greater detail.

Referring to FIG. 22, cartridge support 550b includes arcuate cartridge engagement members 551. These arcuate cartridge engagement members 551 are configured to engage interior surfaces of apertures (such as aperture 420) in end pieces 406, 407 of cartridge 400b. This will support the cartridge 400b over the cartridge support or yoke 550b.

Cartridge support or yoke 550b is positioned so that when cartridge 400b is positioned thereover, an outlet aperture, corresponding to aperture 420, FIG. 16, for cartridge 400b is aligned for air flow exit through air flow outlet arrangement 560. Air flow outlet arrangement 560, for the example depicted, comprises a pair of apertures 560x, 560y, through tube sheet or wall 561. The outlet arrangement 560 is configured so that air flow exiting cartridge 400b through outlet aperture 420, FIG. 16 can pass through the apertures 560x, 560y, and into a clean air plenum. From there, the air can reach air flow outlet arrangement 511 and exit housing 505. Such an alignment between filter cartridge 400 and an air flow aperture or outlet arrangement 560 will sometimes be referred to herein as "air flow communication" or by similar terms.

Still referring to FIG. 22, it is noted that cartridge support or yoke 550 includes a center yoke member 565. The center yoke member 565 includes threaded end 566, remote from wall 561. Referring to FIG. 20, when cartridge 400b is mounted over yoke 565; end 566 will project through cartridge 400b. Seal (pressure) plate 570, FIG. 20, is positioned over threaded end 566, with the threaded end projecting through central aperture 571. Nut 572 and washer 573 can be positioned over end 566, pressing plate 570 in place. In general, this will lead to a sealing of aperture 420x, FIG. 20, by compressing plate 570 against seal member 422. Further, a corresponding seal member 421, on an opposite end of cartridge 400b corresponding to seal member 421, FIG. 16, will press against wall 561, providing for an axial sealing of cartridge 400b in place, with each opposite axial seal 421, 422 being compressed into sealing engagement with housing structure. This will ensure that air flow, to reach outlet aperture arrangement 560, FIG. 22, must pass through cartridge 400b.

An analogous mounting arrangement, with a corresponding cartridge support 550 and analogous features, with an analogous seal plate 570 and nut 572, is provided for cartridge 400a.

Referring again to FIG. 22, the particular cartridge support or yoke 550 depicted, includes a vane arrangement 575, comprising a first pair of vanes 576a, 576b forming, a first cross vane 576; and, a second pair of vanes, 577a, 577b forming second cross vane 577. The vane arrangement 575 is configured to facilitate a pulse jet cleaning operation of cartridge 400b. For the particular assembly depicted, cross vane 577 is orthogonal to cross vane 576.

Referring to FIG. 22, first cross vane 576 is impermeable, i.e. it does not include apertures therethrough, and is orientated to extend across interior 488 of cartridge 400b, in a direction corresponding to the shorter axis of the oval (elliptical) interior 488. The second cross member 577 is not solid, i.e. is not closed, but rather is permeable includes an aperture arrangement 580 therethrough, in the example depicted comprising a plurality of apertures. The second cross vane 577, with apertures 580 therethrough, is configured to extend across interior 488 of cartridge 400b in a direction generally corresponding to a longer axis of the oval (elliptical) interior 488.

Referring to FIG. 22, it is noted that the first cross vane 576, which is generally imperforate, i.e. solid, is positioned between air flow exit apertures 560x, 560y. As will be understood from detailed description below, during a pulse jet cleaning operation, apertures 560x, 560y operate as pulse jet entrances into interior 488 of cartridge 400b. First cross vane 576, then, being imperforate allows for a general separation of the effects of pulses through apertures 560x and 560y.

On the other hand, aperture arrangements 580, allow for the distribution of pulse entering aperture 560x, across the interior 488 of cartridge 400b, in a half of that interior at (i.e., to one side of) impermeable vane 576. An analogous effect is also provided for aperture 560y, for an opposite half of interior 488.

In general terms, the typical cartridge support or yoke 550, with respect to each cartridge is configured for one or more of the following:
(a) It will support the associated cartridge, when positioned thereover, centered over outlet arrangement 560.
(b) It includes yoke arrangement 565 for engagement with a seal plate, to provide for a sealing of the cartridge 400 in position.
(c) It also includes an internal vane arrangement for allowing air flow exit through two apertures, 560x, 560y, of outlet arrangement 560, while generally separates reverse pulse flow into the cartridge, through apertures 560x, 560y, with respect to which portions of the cartridge 400 are maximally effected.

It is noted that an analogous effect can be accomplished with an analogous cartridge support 550 associated with cartridge 400a, FIG. 20.

Indeed, attention is now directed to FIG. 21, in which a seal plate 570 (570a), for cartridge 400a is shown removed, and a cartridge support 550 (550a) is shown positioned within an interior 488 of cartridge 400a.

Figure 23:
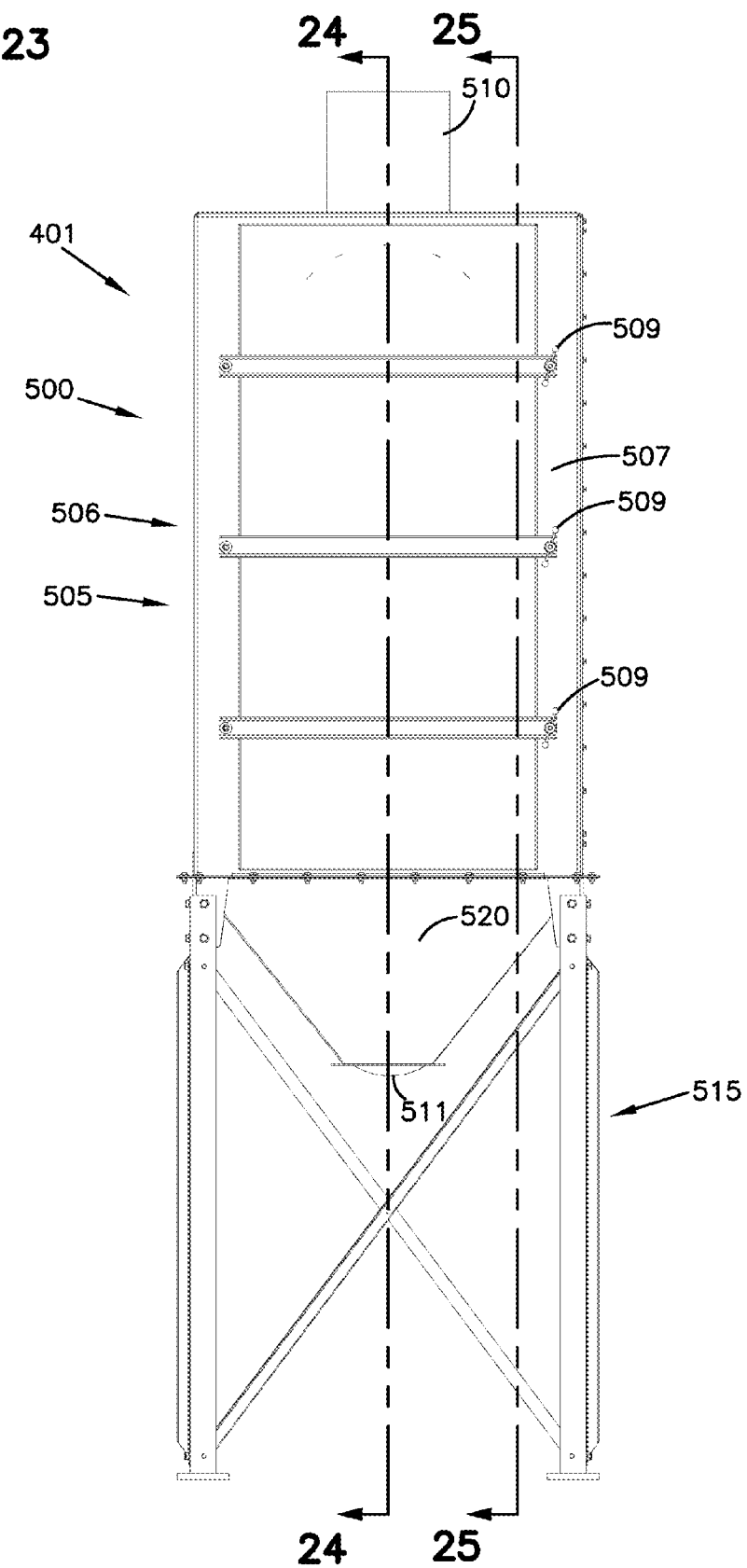
FIG. 23 is a schematic access end elevational view of the assembly of FIGS. 18 and 19.

Attention is now directed to FIG. 23, a side elevational view of air filter assembly 401, depicted generally toward a side having access cover 507 thereon. Selected features as previously characterized are generally viewable.

Figure 24:
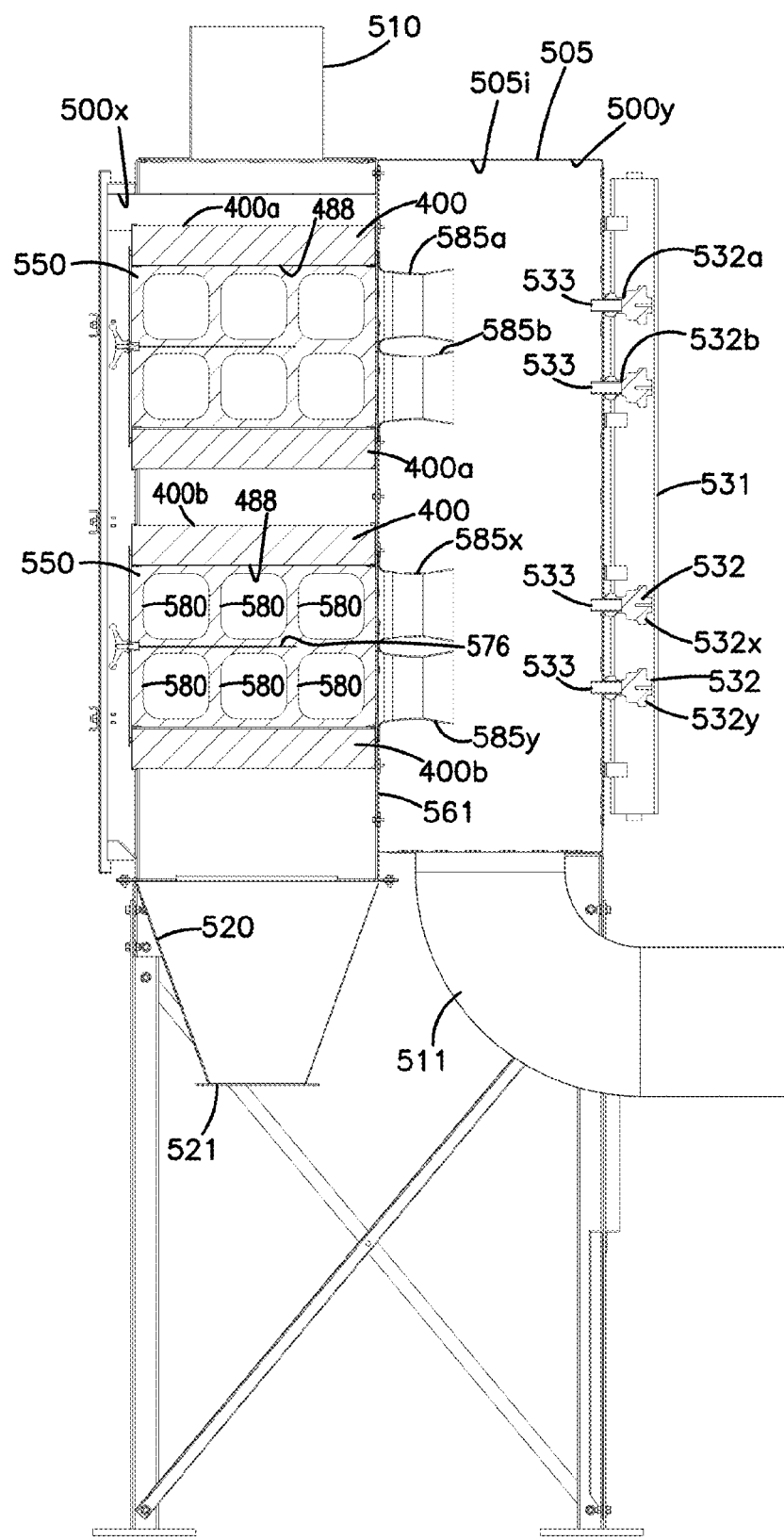
FIG. 24 is a schematic cross-sectional view taken along 24-24, FIG. 23.

In FIG. 24, a cross-sectional view taken generally along line 24-24, FIG. 23, is provided. Referring to FIG. 24, the cartridges 400, corresponding to cartridges 400a, 400b, are shown mounted over cartridge supports or yokes 550.

Referring first to cartridge 400b, it can be seen that positioned with interior 505i, of housing 505, two venturi members 585x, 585y are positioned on wall 561, in association with cartridge 400b. Venturi members 585x, 585y are positioned with one each associated with each of apertures 560x, 560y, respectively. It is noted that in FIG. 24, in reference to cartridge 400b, yoke apertures 580 can be seen.

In general, referring to FIG. 24, within housing 505, region 500x is a dirty air region and region 500y is a clean air region or clean air plenum. Referring specifically to the operation of cartridge 400b, as air laden with dust enters the housing 505 through inlet arrangement 510, the air will distribute dust on cartridge 400b as it passes therethrough, into interior 488. This air will then exit cartridge 400b through apertures in wall 561, those apertures corresponding to apertures 560x, 560y, FIG. 22. This air will pass through venturi members 585x, 585y and into clean air plenum 500y. The filtered air then exits housing 505 through outlet arrangement 511. (Cartridge 400a operates analogously.)

Periodically, when pulse jet cleaning is desired, a selected pulse jet of gas from pulse jet valves 532 will occur. In particular, attention is directed to pulse jet valves 532x, 532y. Pulse jet valve 532x is positioned to direct the pulse jet of air from charge tank 531 through clean air plenum 500y into venturi member 585x. This pulse jet will then pass through pass through wall 561 (i.e. through aperture 565x, FIG. 22) and into interior 488 of cartridge 400b. First cross vane 576 will generally keep the distribution of this pulse gas jet from valve 532x in an upper half of cartridge 400, FIG. 24. Apertures 580 in second cross vane 577 and in particular in an upper half thereof, will allow a pulse from pulse jet valve 532x, to distribute across the upper half of cartridge 400b, driving the pulse through the media pack 405, and dislodging dust collected in the media 405 therefrom. The dust will eventually fall into dust ejection assembly 520, and in due course through outlet 521.

Analogously, pulse jet valve 532y is positioned to direct a pulse jet of gas from charge tank 531 through venturi member 585y and into an interior 410 of cartridge 400b, to dislodge dust from a lower half of cartridge 400b.

Operation of valves 532x, 530y can be simultaneous or sequential, as the circumstances permit. It is generally considered that a sequential operation with upper valve 532x operated before the lower valve 532y will be desirable, for gravity assistance in moving dust from cartridge 400b eventually into dust ejection arrangement 520. Multiple pulses can be used.

Various pressures in charge tank 531, and various lengths and pulses can be used. Typically, the pressure within charge tank 531, i.e. the pressure of a pulse, will be about 90 psi; and, the length of a pulse will be about 0.1 second, although alternatives are possible.

Referring to FIG. 24, upper cartridge 400a is analogously associated with two venturi members 585a, 585b and two pulse jet valves 532a, 532b.

Still referring to FIG. 24, it is noted that each of the pulse jet valves 532a, 532b, 532x, 532y is provided in association with a pulse director 533. The pulse directors 533, sometimes referred to as pulse direction members, or as a pulse jet flow direction arrangement, are tubes configured to selectively direct a pulse jet of air from the associated pulse jet valve, into the associated venturi member. Herein in some instances the combination of a pulse jet valve and a pulse jet director, will be referred to as a pulse jet valve/pulse direction (or pulse director) assembly or combination.

The particular sequence of operation of pulse jet valves of a pulse jet cleaning system, is matter of choice for desirable effects. For an arrangement in accord with FIG. 24, in which two cartridges 400a, 400b are positioned interiorly, with one above the other, it is generally expected that a sequential pulse from the upper most valve 532a to the lower most pulse valve 532y will be preferable, again to obtain some gravity assistance in moving the dust from the cartridges 400a, 400b downwardly, into the dust ejection arrangement 520.

Figure 25:
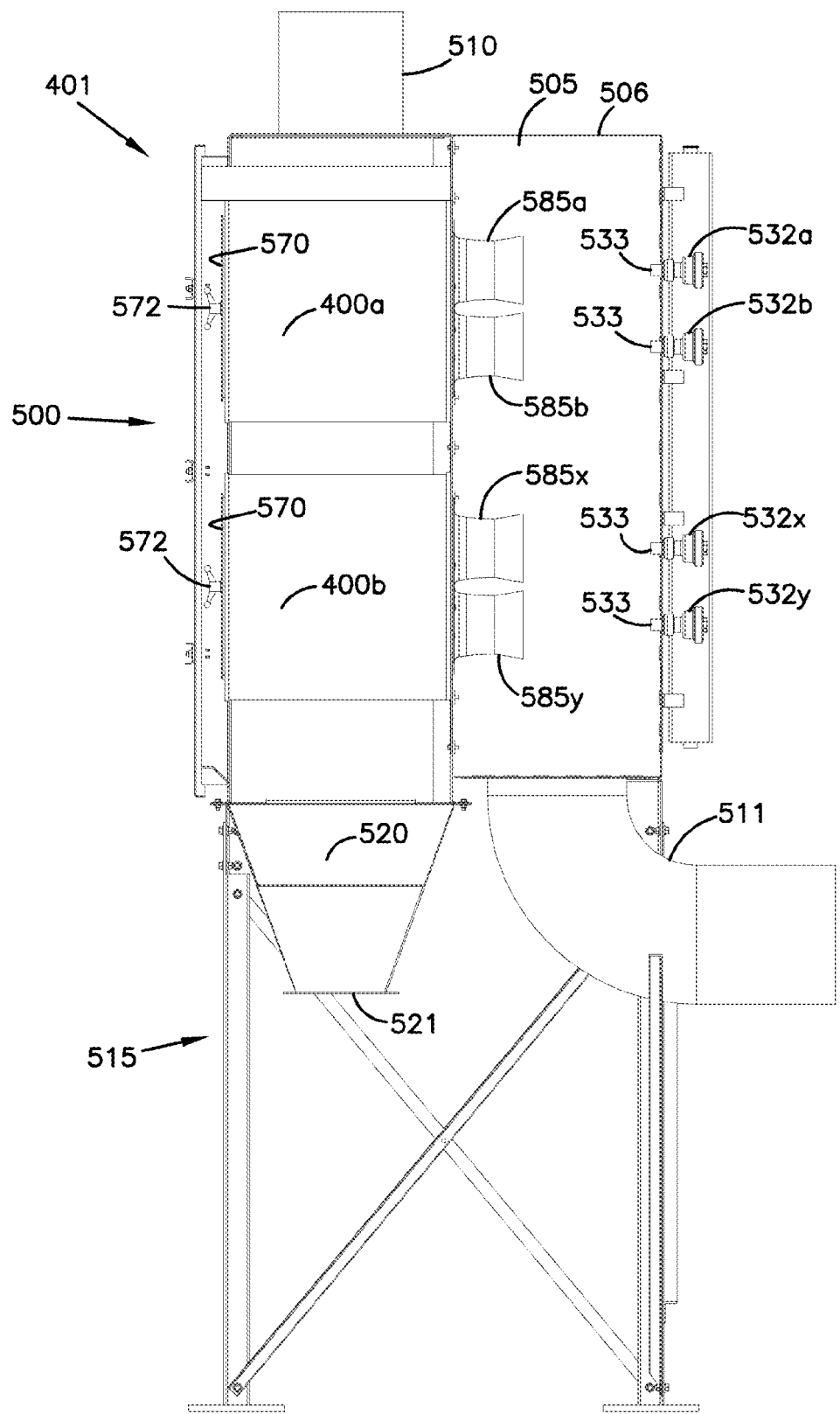
FIG. 25 is a schematic cross-sectional view taken along 25-25, FIG. 24.

Attention is now directed to FIG. 25, a cross-sectional taken along line 25-25, FIG. 23. Here, the cross-section is taken such that the cartridges 400a, 400b are not shown in cross-section. Each can be seen secured in place by seal plate 570 and nut 572.

Figure 26:
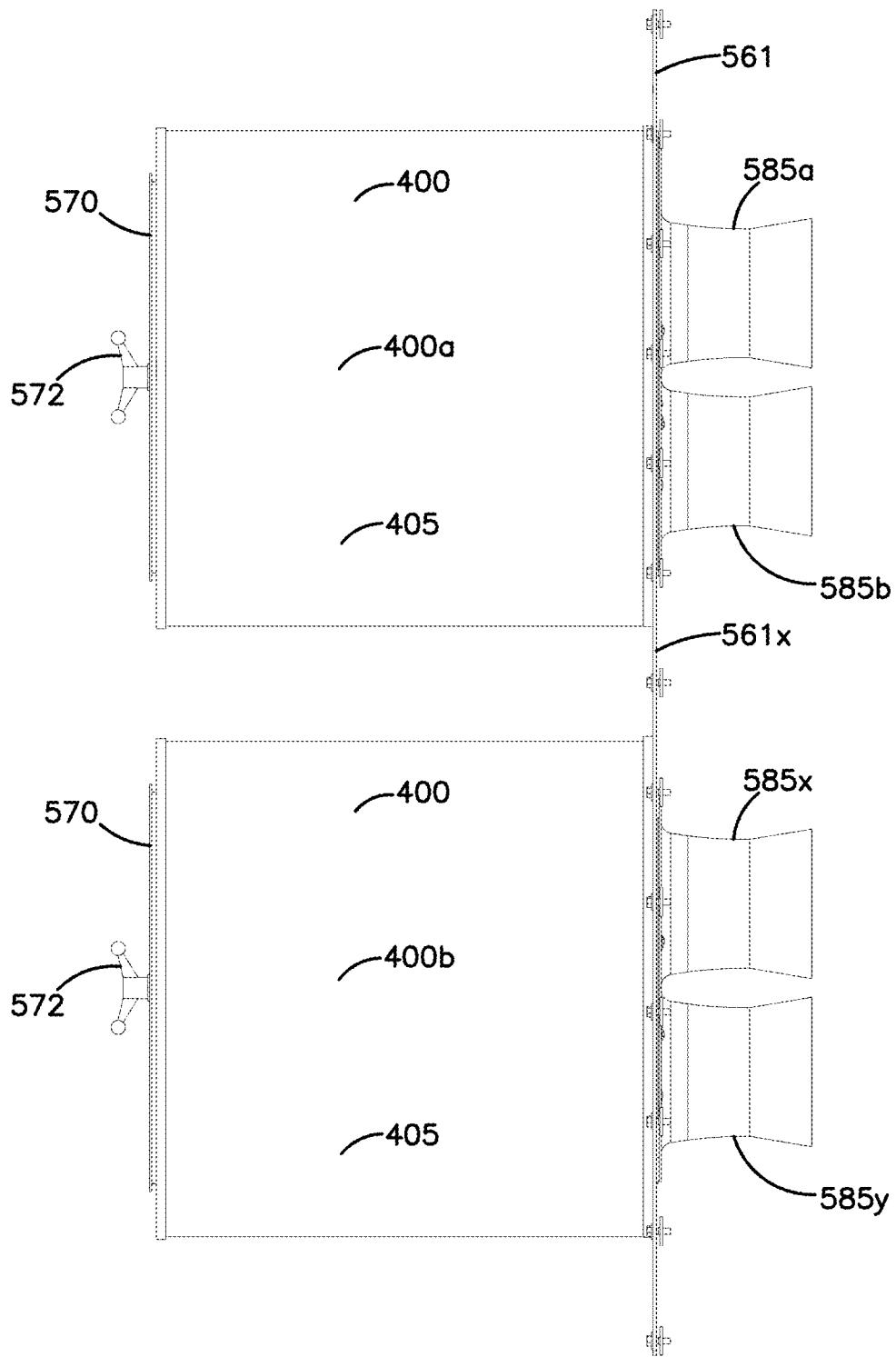
FIG. 26 is a fragmentary, schematic view of selected componentry within the assembly of FIGS. 18, 19 and 23.

In FIG. 26, an enlarged fragmentary view of a selected portion of FIG. 25 is viewable. In particular, in FIG. 26, wall 561 comprising tube sheet 561x, is shown with venturi members 585a, 585b, 585x, 485y on one side thereof, and with cartridges 400a, 400b on an opposite side thereof, comprising cartridges 400a, 400b secured in place by seal plates 570 and nuts 572. It can be seen that each cartridge 400a, 400b, is associated with two venturi members; cartridge 400a is associated with venturi members 585a, 585b; and, cartridge 400b is associated with venturi members 585x, 585y. This allows for a selected pulsing from a pulse jet assembly described above in connection with FIGS. 24 and 25, to be configured such that one venturi member is associated with each half of a cartridge 400; and, one pulse jet valve is associated with each venturi member. This can provide for an efficient cleaning operation of the cartridges 400. For the particular assembly depicted, use of two venturi members, and thus two pulse jet valves associated with each cartridge 400 is facilitated by the oval (in the example elliptical) shape.

It is noted that in alternate applications of the techniques described herein, assemblies will be configured in which only venturi member is associated with each cartridge, or which more than two venturi members are associated with a selected cartridge.

Figure 27:
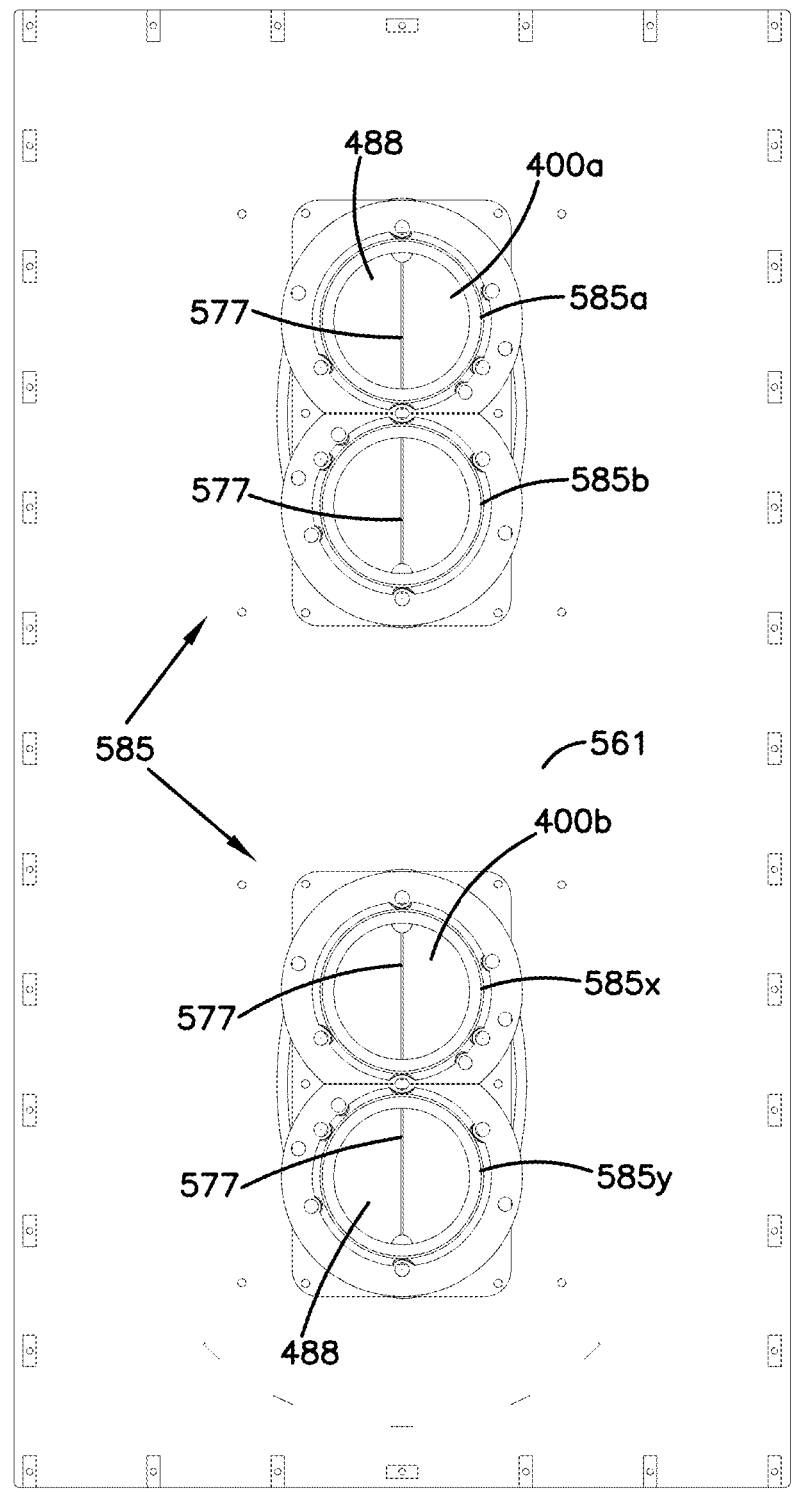
FIG. 27 is a venturi end elevational view of the componentry of FIG. 26.

Attention is now directed to FIG. 27. In FIG. 27, a view of the structure depicted in FIG. 26 is shown, generally directed toward the venturi arrangement 585. Here, one can see through the individual venturi members (585a; 585b; 585x; and, 585y) and thus through the wall 561 and into the interiors 488 of the two cartridges 400a, 400b, positioned on the opposite side of the wall 561. In the particular view of FIG. 27, one can see the vertical or second cross vane 577 positioned within an interior of each of the cartridges 400a, 400b.

Figure 28:
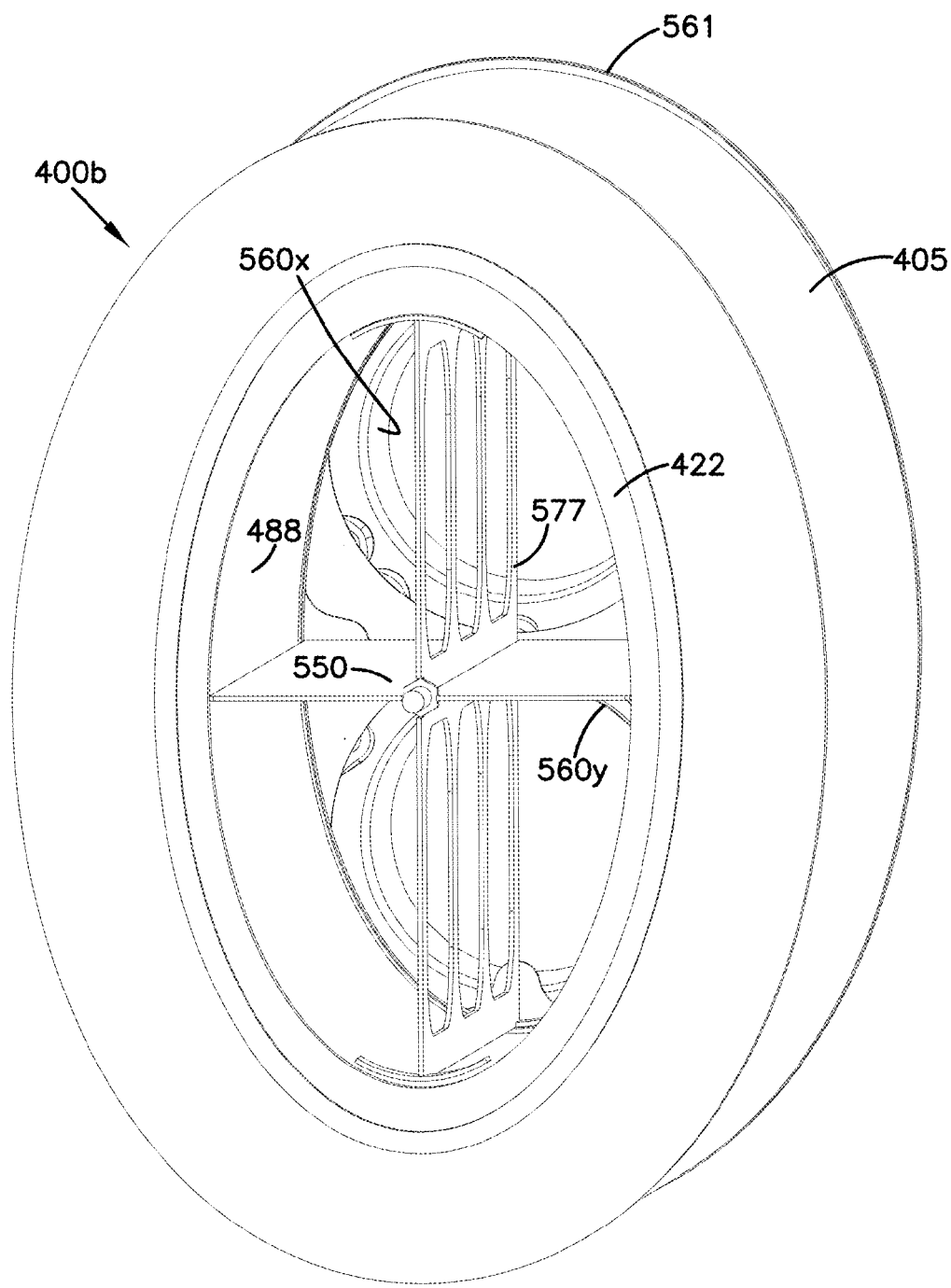
FIG. 28 is a cartridge end perspective view of selected componentry of FIG. 26, depicted with a pressure plate removed.

In FIG. 28, a perspective view is provided of selected structure on the opposite side of the wall 561 from the side viewable in FIG. 27. Referring to FIG. 20, cartridge 400b can be seen positioned over cartridge support or yoke 550. Here, alignment with the two apertures 560x, 560y can be seen. Other features viewable in FIG. 28 are generally as previously described.

Figure 29:
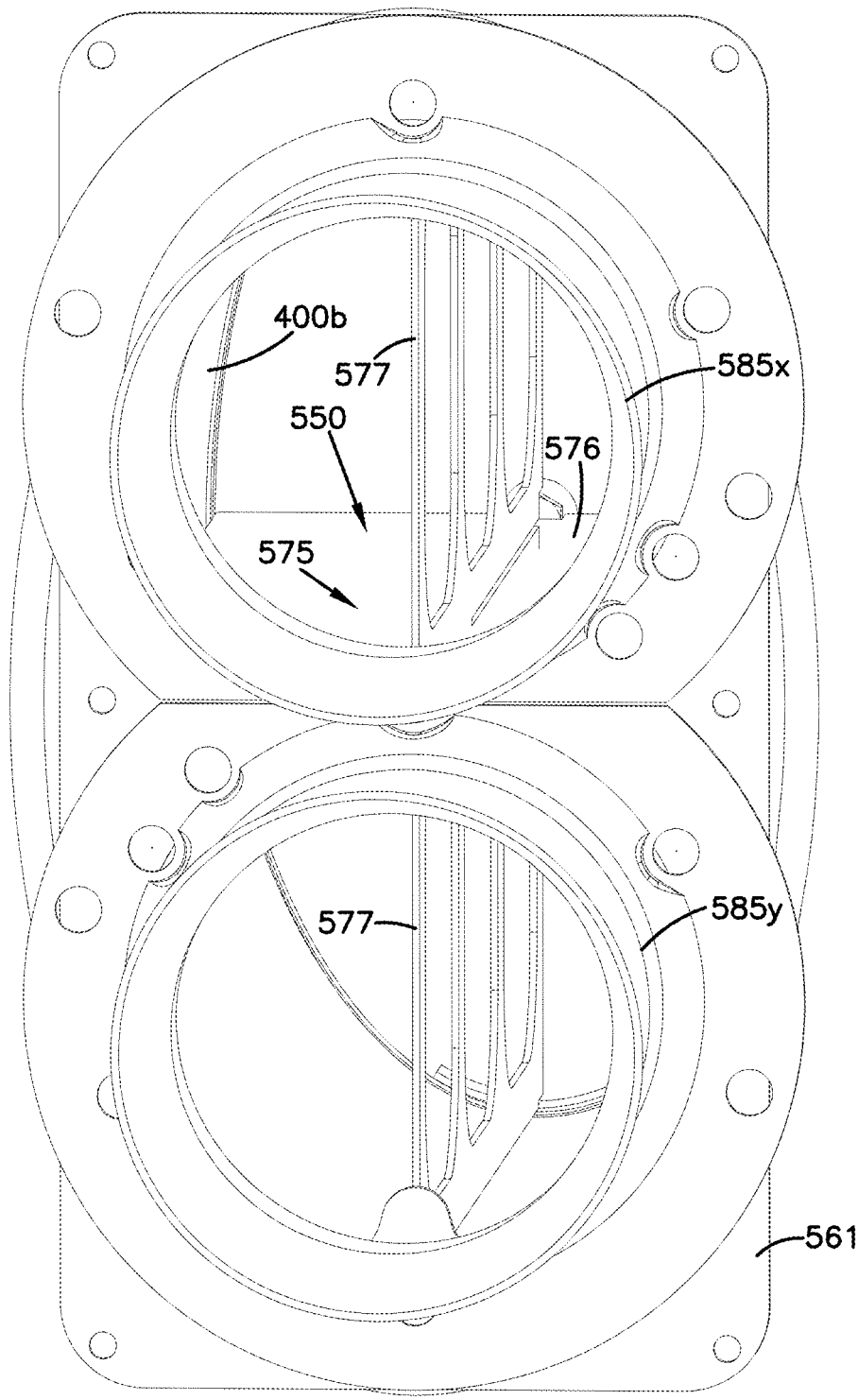
FIG. 29 is an enlarged, fragmentary, schematic, venturi end plan view of selected componentry of FIG. 27.

Finally, in FIG. 29, an enlarged view of a selected portion of FIG. 27 is depicted. This view can generally can be considered opposite that viewable in FIG. 28, with a portion of wall 561 also being shown. Referring to FIG. 29, it is noted that cartridge support 550 can be viewed in an interior of cartridge 400b, with vane arrangement 575 viewable, having impermeable or solid first, horizontal, cross vane 576 and permeable, second, in this instance, vertical cross vane 577. The two venturi members 585x, 585y are also viewable.

For the particular assembly 401 depicted, i.e. an industrial dust collector, the DCI A flute, Table A, can be used for the corrugated sheet in the single facer strips, although alternatives are possible.

In general terms, an example air filter assembly includes at least one air filter cartridge therein. Typically, each air filter cartridge is associated with a venturi arrangement or assembly, within the housing, positioned to help direct air flow from the filter cartridge into a clean air plenum of the housing. For an example system depicted, using oval shaped filter cartridges, each filter cartridge is associated with at least two venturi members, and in a specific example, two venturi members only. A pulse jet air cleaning assembly is provided, having at least one pulse jet valve/pulse direction arrangement associated with each filter cartridge, and in a particular example depicted, two with respect to each filter cartridge. A variety of alternate applications of the techniques will be understood, given the above characterizations.

V. Alternate Media Pack Configurations, FIGS. 30 and 31

The media pack arrangements characterized herein above are generally depicted as configured formed from a media pack comprising a stack of single facer strips configured with ends opposite a stacking bead spread apart somewhat. That is, in each example arrangement, the media pack can be characterized as having flow faces, one being an inlet flow inlet face and the other being an outlet flow face; and, the stacking bead is positioned adjacent one of the flow faces (i.e. closer to one of the flow faces than the other). Fanning can occur by spreading apart layers of the stack, adjacent a flow face opposite the one having the stacking bead adjacent thereto.

Figure 30:
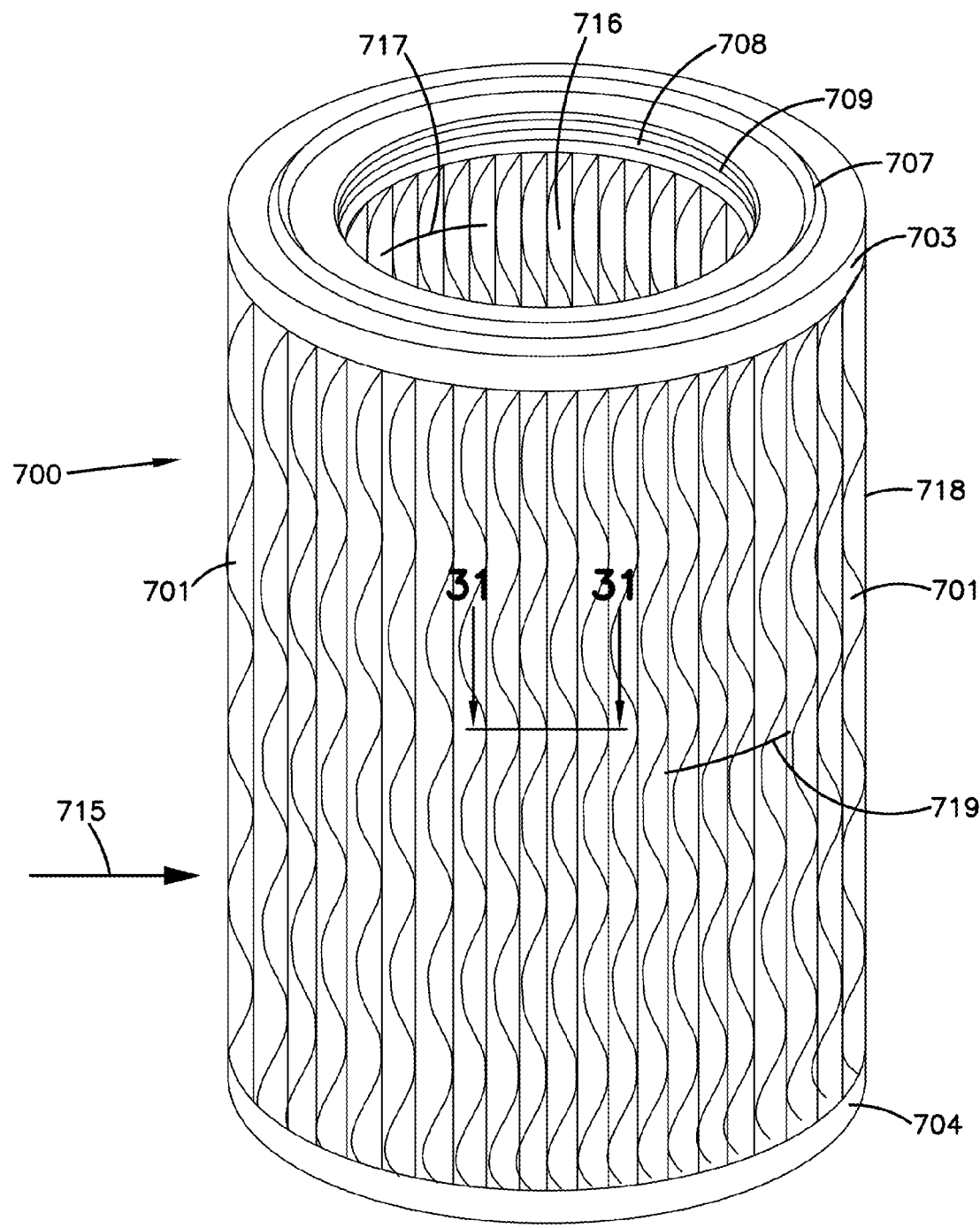
FIG. 30 is a schematic perspective view of a further filter cartridge incorporating a media pack according to the present disclosure.
Figure 31:
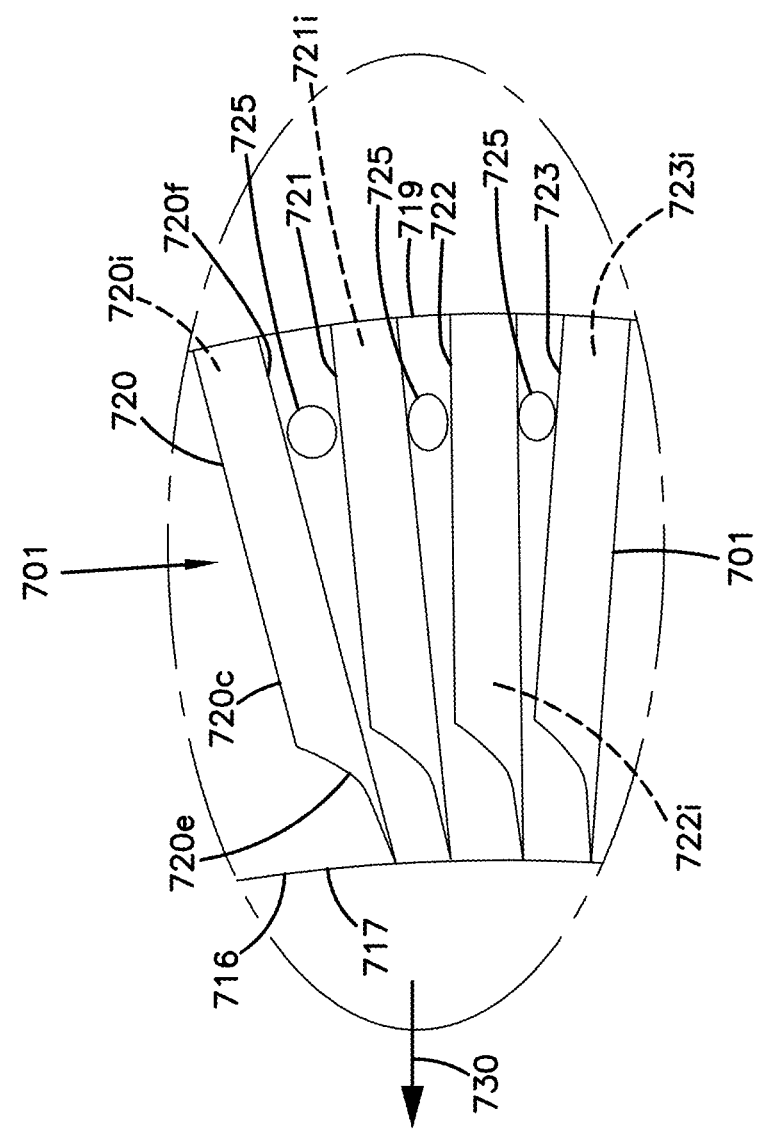
FIG. 31 is a fragmentary, cross-sectional view depicting a portion of the media pack of the filter of FIG. 30.

In contrast, in Figs. FIGS. 30 and 31, principles are analogously applied in which the arcuate shape is made by providing an inside arc, to the stack of single facer strips, by compressing the strips toward one another, and with the outside arc being adjacent the stacking bead. Again, herein the term "inside arc" and variants thereof, is meant to refer to the flow face portion with the shorter arc (concave surface), and the outside arc is meant to refer to the arcuate portion of the face which has the larger arc (convex surface).

Referring to FIG. 30, an example filter cartridge comprising such a media pack is depicted generally, at 700. The cartridge 700 depicted has a generally cylindrical configuration for the media pack 701, although alternatives are possible. The particular cartridge 700 depicted comprises a media pack 701 extending between first and second end caps or end pieces 703, 704. Although a variety of end piece configurations are possible, the particular end pieces 703, 704 depicted are generally molded-in-place, for example from foamed polyurethane. In alternate applications of the principles described herein, one or more of the end pieces 703, 704 can be preformed, for example from a hard plastic or metal, and be potted in place by adhesive/sealant.

A variety of configurations are possible. In the example cartridge 700, FIG. 30, end piece 704 is closed, i.e. has no central aperture therethrough. End piece 703, on the other hand, is open, having a central aperture 708 therein.

The cartridge 700, as thus far characterized, as generally analogous to cartridge 380, FIG. 12. An analogous housing seal could be used for cartridge 700, to housing seal arrangement 396, FIG. 12; such an optional axial seal being shown at 707. However, for the example cartridge 700 depicted, aperture 708 is lined by a framework or housing radial seal member 709, configured to seal around an outlet tube or similar construction with radially directed forces (i.e. toward or away from a central axis of media pack 701). Herein, a seal arrangement having sealing forces directed toward or away from a central axis of a media pack, are generally characterized as a "radial seal" or by similar terms; the particular seal 708 depicted, being an inwardly directed radial seal. Herein, a seal arrangement such as 396, FIG. 12, which is sealed by compression forces in the general direction of a central axis for the cartridge, will be referred to as an "axial seal" or by various similar terms.

In use, air flow would be in the general direction of arrow 715, for air to be filtered. The air would pass through the media pack 701 into open interior 716, and then the filtered air could leave the cartridge 700 through aperture 708.

In the terms used above, the internal arc of the media pack 701 will be along the interior 716, or concave side, as indicated generally at 717, and the exterior arc will be along an outer surface 718 (or convex side) as indicated generally by arc 719.

Attention is now directed to FIG. 31, a schematic cross-sectional view taken generally along line 31-31, FIG. 30.

FIG. 31 is a schematic depiction of a portion of the media pack 701. The portion 701a depicted, shows, schematically, four (4) single facer strips 720, 721, 722 and 723. Referring to strip 720, as an example, the strip 720 comprises a corrugated sheet 720c and a facing (in this instance flat) sheet 720f secured to one another. Adjacent end 720e, the corrugated sheet 720 has been darted, folded or otherwise compressed closed.

Each of the single facer strips 720, 721, 722, 723 would have a similar construction. Between each adjacent two single facer strips, is provided a stacking bead 725. The stacking bead 725 provides for prevention of exterior air flow, unfiltered, extending through the media pack between the single facer strips.

Filtering air flow would generally be into an interior 720i, 721i, 722i and 723i of each of the strips 720-723, respectively, along arc 719. The darted or compressed ends (corresponding to end 720e) means that the air will exit those flutes by filtering passage through media, into the region between the single facer 720-723, downstream from the sealing beads 725. The filtered air will exit the media pack in the general direction shown by arrow 730. Thus, for the example shown, filtering air flow is from the exterior arc 719 to the interior 717.

Referring to FIGS. 30 and 31, it is apparent that the "fanning" in this instance is with the ends of the single facer strips adjacent the outer or exterior arc 719 spread apart, and with the ends adjacent the interior arc 717 pressed together. Further, the ends that are spread apart are generally those adjacent the stacking beads 725. This, then, leads to a different media pack configuration than is shown in the example of FIG. 12, where the stacking bead was adjacent the interior arc, and with the opposite outer ends spread apart.

From review of FIGS. 30 and 31, it will be understood that the term "fanned" as used herein in connection with identified characteristics of the media pack 701, is meant to refer to a media pack in which one of the end of the strips (inlet or outlet) is spread apart relative to the opposite end of the strips. There is no specific requirement, unless otherwise stated, that this "spreading apart" occurs from actual physical pulling apart of the layers. It could occur, for example, by pressing the layers together adjacent the opposite end.

Thus, in the general terms used herein, media pack 701 includes a plurality of single facer strips positioned in a stack defining opposite ends and flow surfaces, 716 and 718 respectively. Each one of the single facer strips in the stack comprises a sheet of fluted media secured to a sheet of facing bead. A stacking bead at 725 is provided between adjacent single facer strips. The stack includes at least a first portion (in the example depicted, the entire stack) configured in an arcuate configuration of individual single facer strips oriented with respect to one another to form an arcuate configuration. The media pack is closed to passage of unfiltered air completely therethrough, this being provided by a combination of the stacking beads 725 and the closed end 728.

VI. Selected Configurations Using a Fanned, Slanted Stack, Media Pack, FIGS. 32-45

It is noted that selected fanned media pack configurations, having arcuate sections, in a media pack or media pack that is comprised of one or more stacks of single facer media as characterized herein, can be configured from one or more slanted stacks. This will be understood by reference to FIGS. 32-45.

Figure 32:
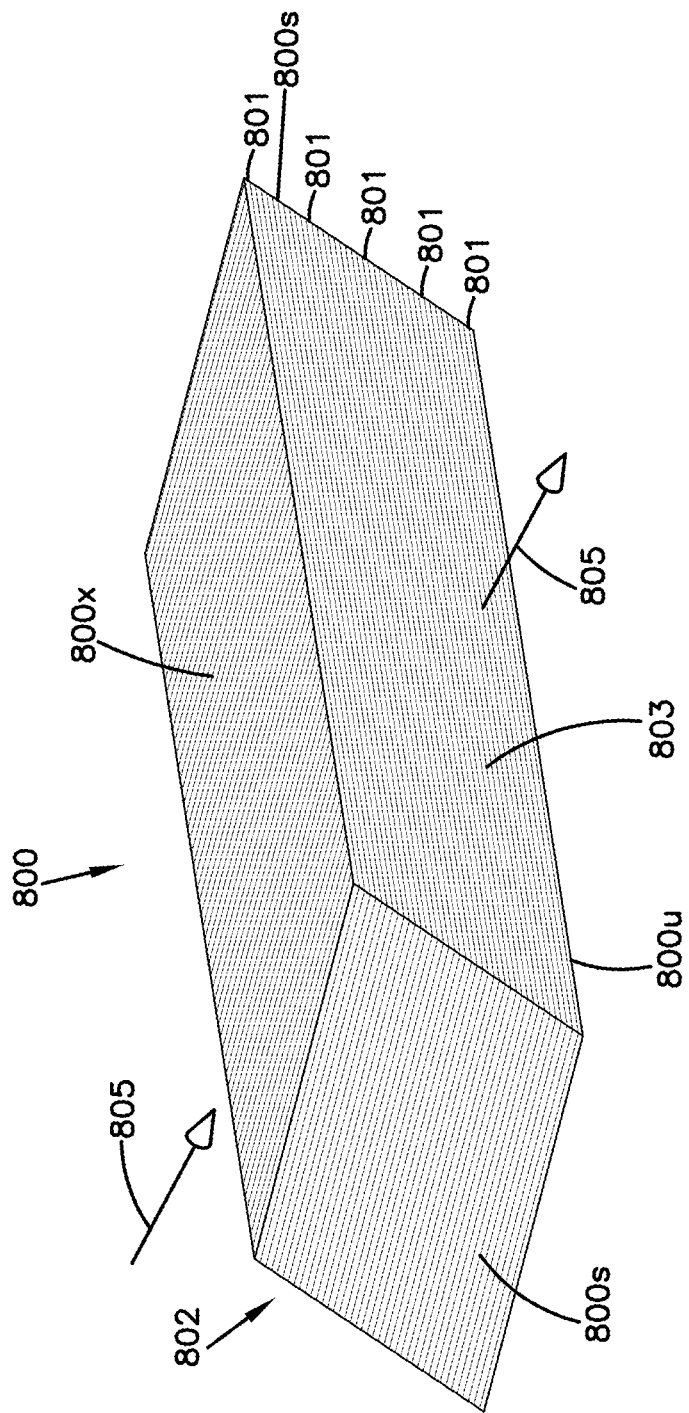
FIG. 32 is a schematic, perspective, view of a slanted stack media pack usable in arrangements according to the present disclosure.

Attention is first directed to FIG. 32, in which a slanted stack 800 is depicted schematically. Referring to FIG. 32, stack 800 is generally analogous to stack 201, FIG. 6, except as described. The stack 800 comprises a plurality of layers 801, depicted schematically, each of which comprises a single facer strip. The strips 801 have a first inlet end, thus defining inlet face 802 and a second outlet end defining an opposite outlet face 803. As a result, filtering air flow through the slanted stack 800 is, for the example depicted, in the general direction of arrows 805, although an alternate, opposite flow pattern is possible.

A difference between the slanted stack media pack 800, FIG. 32 and the "blocked" stacked arrangement 201, FIG. 26 is that in slanted stack 800, FIG. 32, while the opposite inlet and outlet flow faces 802, 803 are parallel to one another, they are not perpendicular to all adjacent sides; i.e. to opposite top and bottom 800x, 800u, and to opposite sides 800s. This results from having adjacent single facer strips offset from one another toward one of the flow faces. Stack 201, FIG. 6, a contrast, is typically referred to herein as a "blocked" stack, since each pair of adjacent sides is configured to extend at right angles to one another, resulting from adjacent single facer strips not being offset from one another.

Still referring to FIG. 32, it is noted that the media pack can be fanned apart, for example if a stacking bead is located adjacent face 803, strips along face 802 can be fanned apart. Also, if the stacking bead adjacent face 803 is appropriately positioned, and the media pack is appropriately long, adjacent face 802 the layers can be compressed toward one another to create arcuate shapes.

It is also again noted that there is no specific requirement for the air flow pattern to be in the direction of arrow 805; i.e. it could opposite to that direction as well.

An example filter cartridge configured from slanted stacked media pack arrangements is depicted in FIGS. 33-43.

Figure 33:
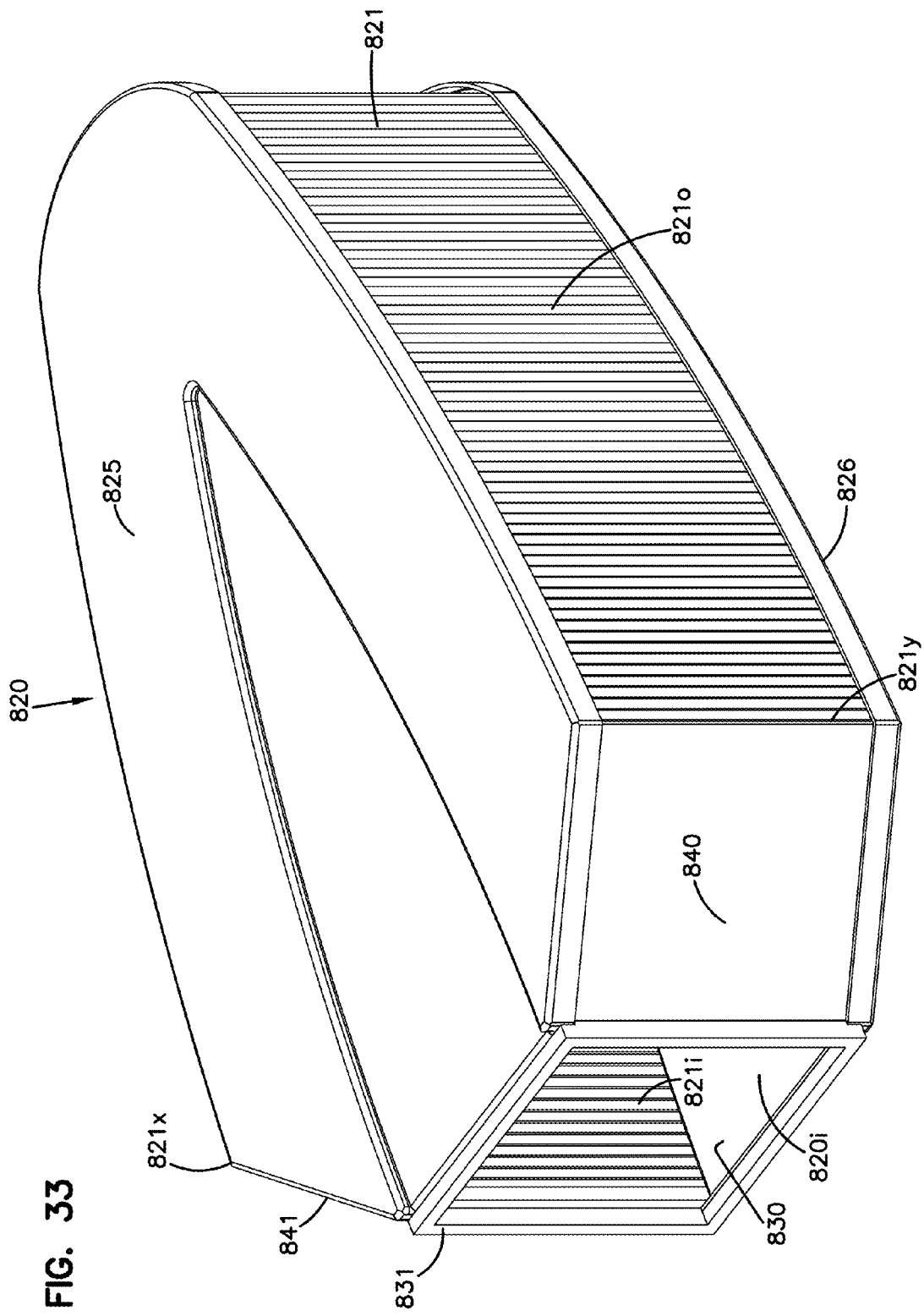
FIG. 33 is a schematic top, outlet end perspective view of a filter cartridge including a media pack comprising two media pack sections each of which is made from a slanted stack.

Attention is first directed to FIG. 33 in which a cartridge 820 is depicted. Cartridge 820 generally comprises a media pack 821. The media pack 821 comprises a z-filter configuration, and comprises a media pack 821 having an arcuate, fanned, portion. Further, the media pack 821 is formed from at least one (in the example depicted two (2)) slanted stacks of media, generally corresponding to stack 800, FIG. 32.

Still referring to FIG. 33, the media pack 821 is positioned between first and second, opposite, side pieces 825, 826. The side pieces 825, 826, close sides of the media pack 821. The side pieces 825, 826 can be molded-in-place, or can comprise preforms secured to the media pack 821, with sealant adhesive. When preforms are used, the preforms can be formed from metal or plastic, for example. In the example arrangement depicted, the sides 825, 826 can comprise plastic preforms to which the media pack 821 is sealed and secured, for example by being potted with an adhesive, such as a polyurethane adhesive.

Still referring to FIG. 33, the cartridge 820 comprises an air flow exit aperture 830 providing for air flow passage between an interior 820i and an exterior environment. Although air flow can be in either direction, in a typical application it is expected that aperture 830 will be an exit aperture for filtered air from interior 820i. Surrounding aperture 830 is provided a framework or housing seal arrangement 831. The framework or housing seal arrangement 831 comprises seal or gasket material surrounding the aperture 831 and oriented to form a seal against an air filter housing or other structure, in use.

As indicated above, although alternatives are possible, the particular cartridge 820 depicted, is configured for "out-to-in" flow during filtering. Thus, air to be filtered enters outer surface 8210 of media pack, and exits inner surface 821i, into interior 820i. Filtered air then exits aperture 830, and is directed on as intended by the equipment with which cartridge 820 would be used. Framework or housing seal arrangement 831 will prevent air from bypassing the cartridge 820 in the system of use.

Figure 34:
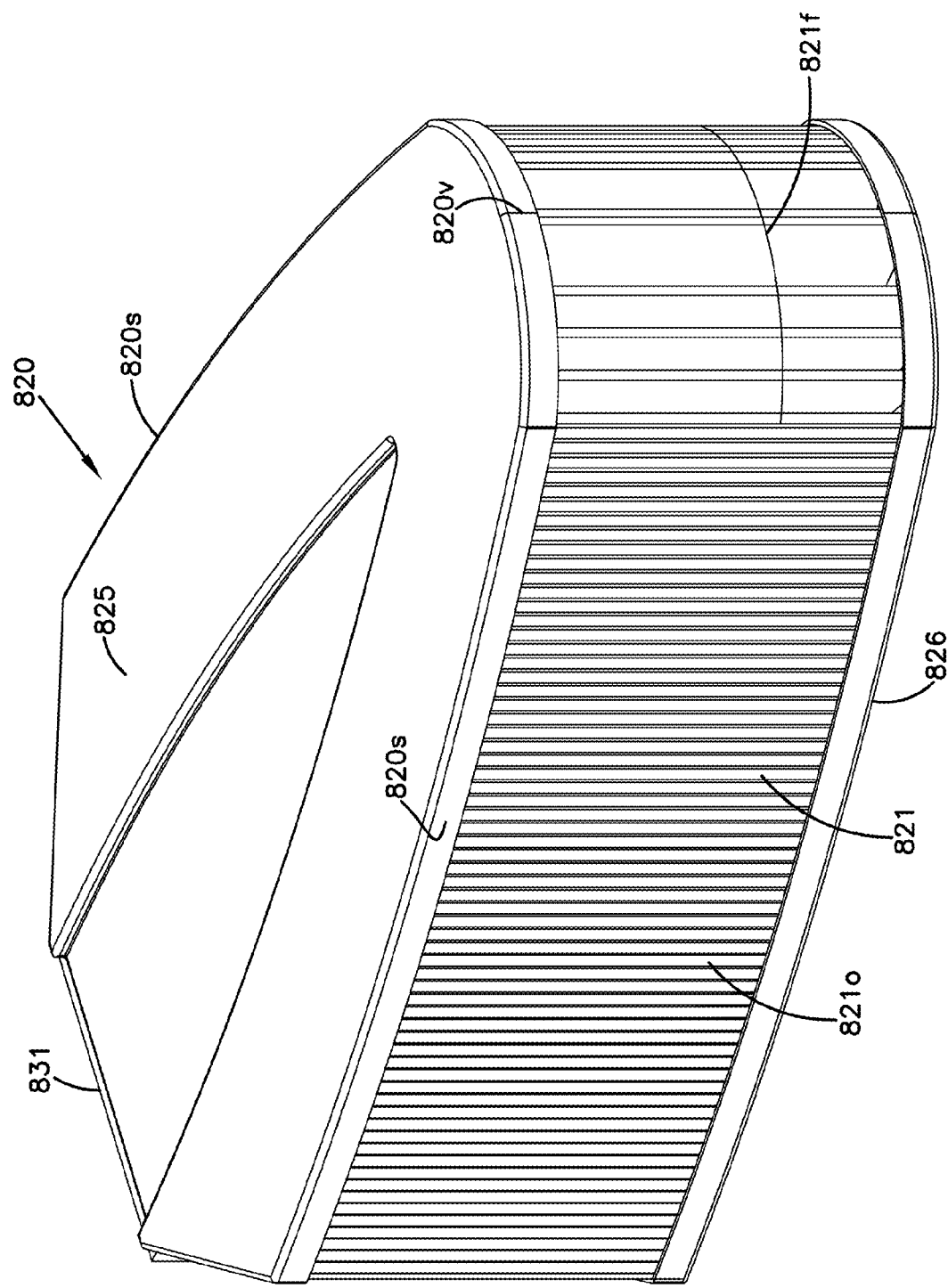
FIG. 34 is a second schematic top perspective view of the filter cartridge of FIG. 33.

In FIG. 34, a second schematic perspective view of the cartridge 820 is depicted. Here, a fanned or arcuate portion 821*f* of the media pack 821 is depicted. This portion and its formation is described further herein below.

In general, cartridge 820 will sometimes be referred to herein as having an overall "arrow" or "arrow head" shape. By this it is meant that the overall cartridge shape can be characterized as having a point or vertex 820*v*, FIG. 34, with sides 820*s* diverging therefrom.

Figure 35:
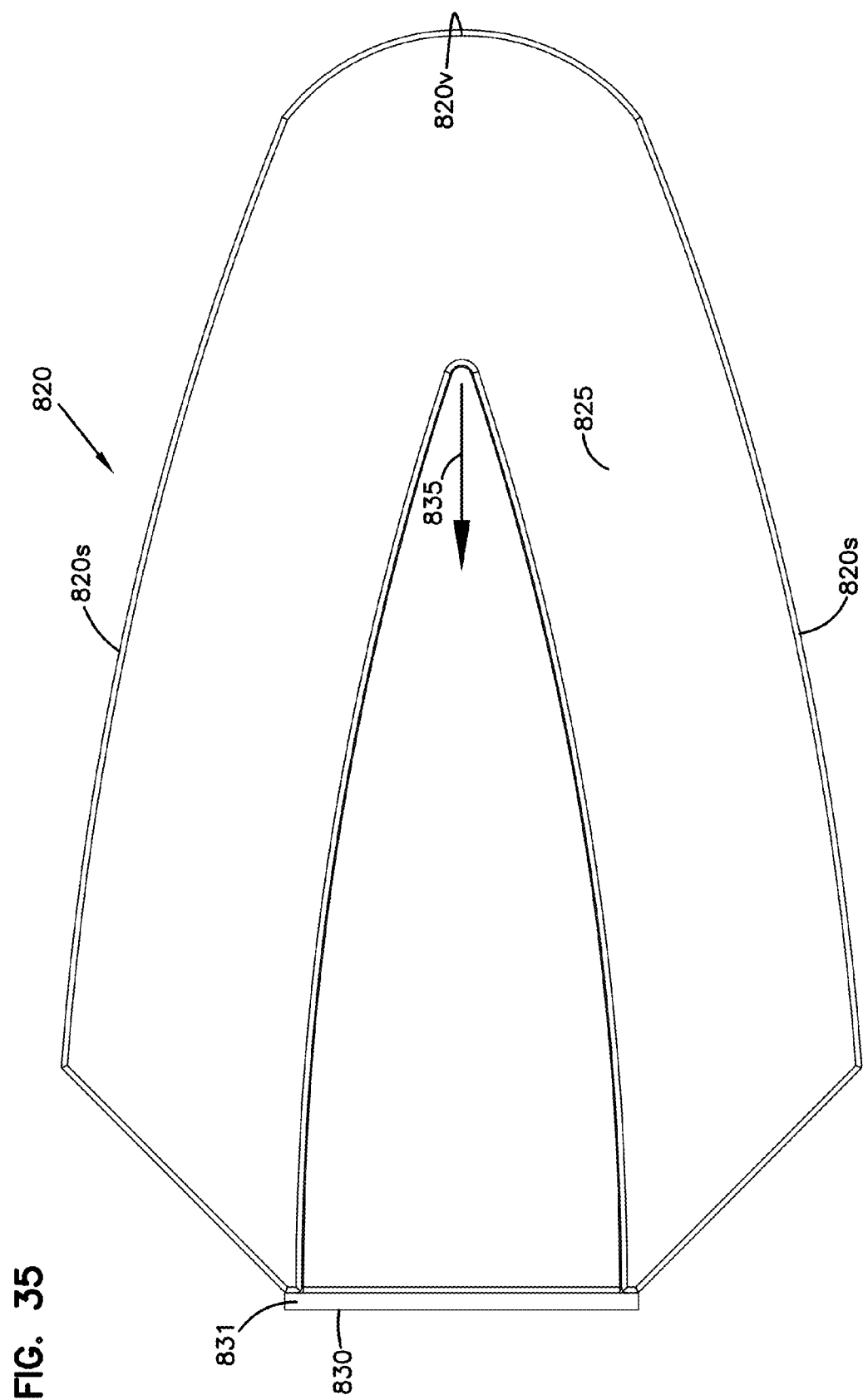
FIG. 35 is a schematic top plan of the filter cartridge of FIGS. 33 and 34.

In FIG. 35, a top plan view of cartridge 820 is depicted. It is noted that when installed in an air cleaner assembly, typically cartridge 820, when configured as shown, will be secured in place by framework appropriate to provide compression in the general direction of arrow 835 so that framework or housing seal arrangement 831 is compressed against a housing or tube sheet (i.e. framework) portion, around an exit aperture.

Figure 36:
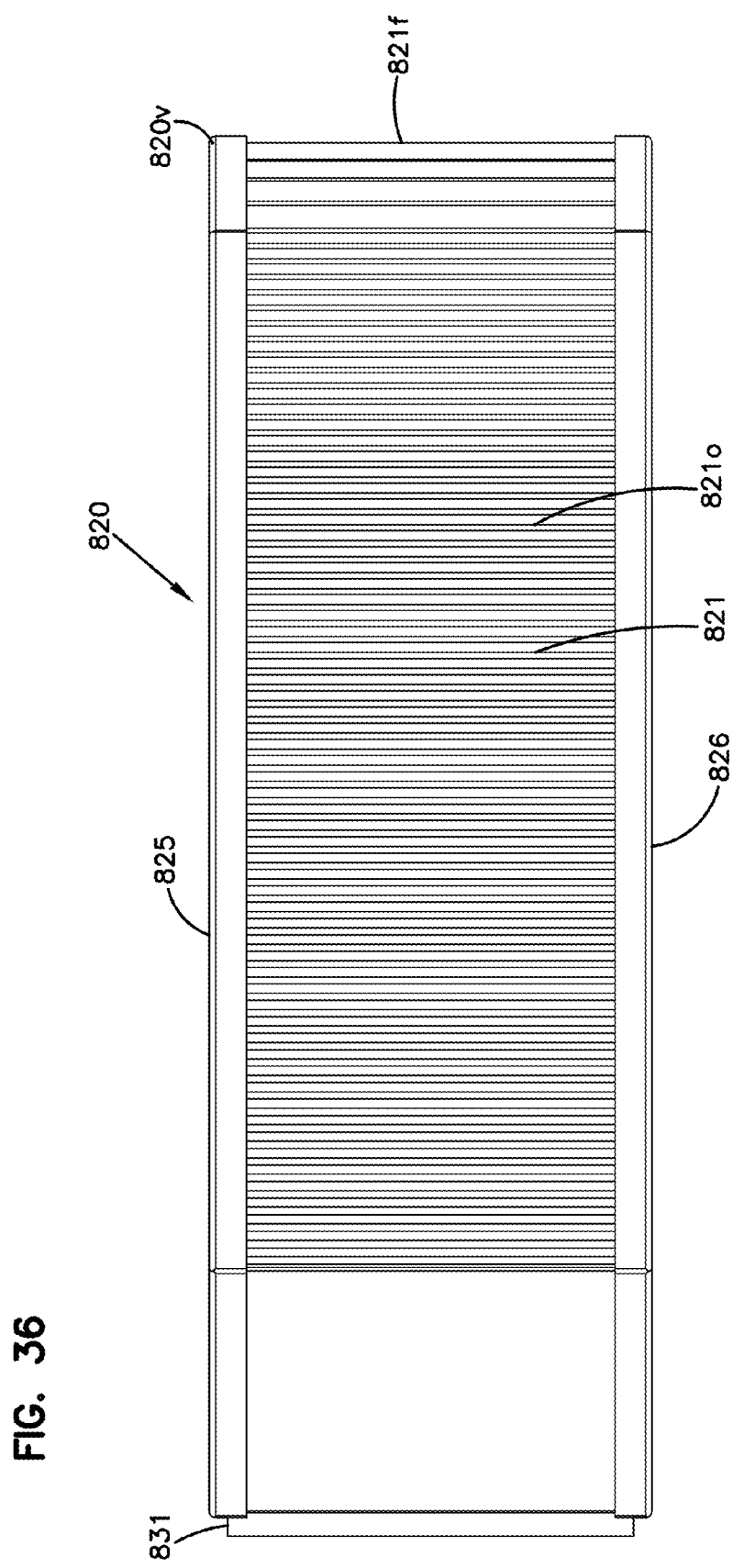
FIG. 36 is a schematic side elevational view of the filter cartridge of FIGS. 33 and 34.

In FIG. 36 a side elevational view of cartridge 820 is depicted.

Referring again to FIG. 33, the cartridge 820 includes a pair of end panels 840, 841 positioned adjacent opposite end 821*y*, 821*x* of the media pack 821. The end panels 840, 841 are generally secured to the media pack 821, and each preferably comprises an air impermeable structure. The end panels 840, 841 as a result, inhibit bypass of unfiltered air into interior 820*i*. Further, for the particular assembly depicted, the panels 840, 841 provide support for a section or portion of framework or housing seal arrangement 831 as described herein below. The panels 840, 841 can be preformed or be molded-in-place. In the example, they are preformed.

Figure 37:
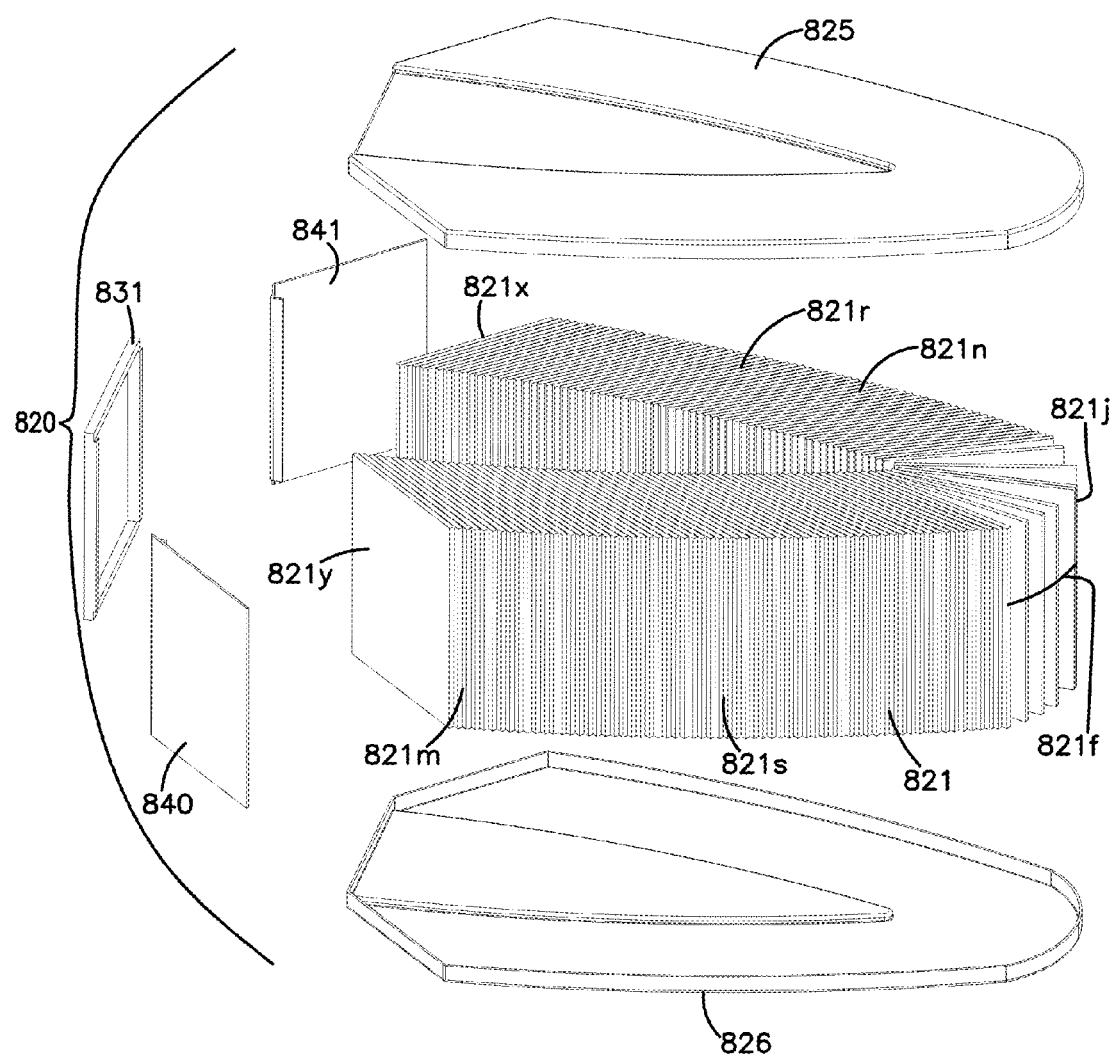
FIG. 37 is a schematic exploded perspective view of the filter cartridge of FIGS. 33 and 34.

Attention is now directed to FIG. 37, an exploded perspective view of cartridge 820. Here, the opposite side pieces 825, 826 can be seen positioned as mirror images of one another, along opposite sides 821*r*, 821*s* respectively of media pack 821. In addition, end panels 841, 840 can be seen adjacent ends 821*x*, 821*y* respectively.

Housing seal arrangement 831 is also viewable. It is noted that the housing seal arrangement 831 could be preformed and be adhered to a remainder of cartridge 820, for example with adhesive, or it can be formed in place, i.e. molded-in-place. By the term "molded-in-place", it is meant that the seal arrangement is molded onto the cartridge 820, instead of being preformed and then adhered with an adhesive or similar material.

Figure 38:
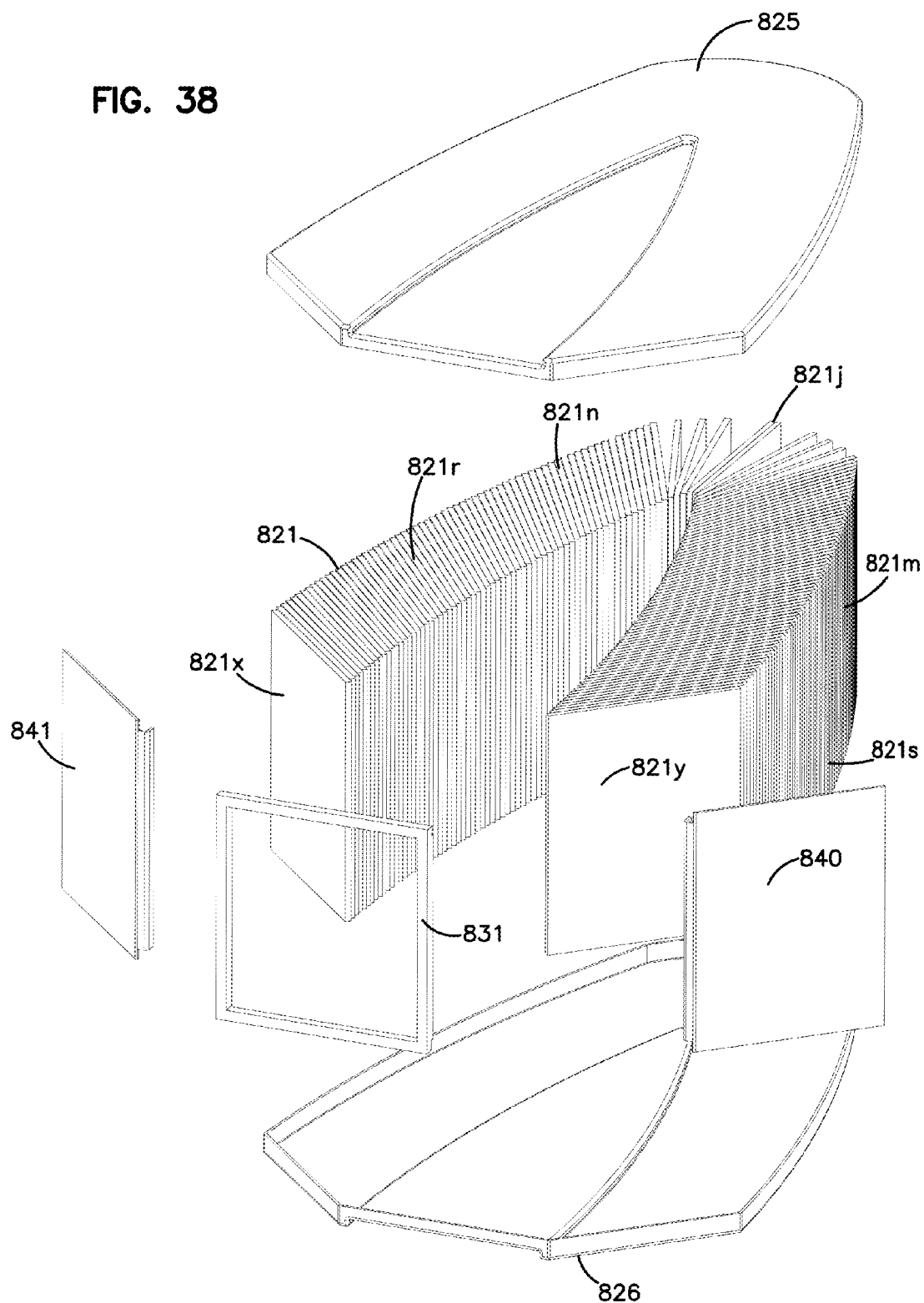
FIG. 38 is a second schematic exploded perspective view of the filter cartridge of FIGS. 33 and 34.

In FIG. 38, an alternate exploded perspective view of cartridge 820 is depicted. Features previously described are viewable.

Referring to FIGS. 37 and 38, it is noted that the particular media pack 821 depicted, is formed from two media pack stacks 821*m*, 821*n*, secured to one another along joint 821*j*. For the particular example depicted, each of the sections 821*m*, 821*n* comprises: a fanned, slanted stacked, media section having an arcuate, fanned, portion. The specific example configuration of these sections 821*m*, 821*n* is described further herein below.

Figure 39:
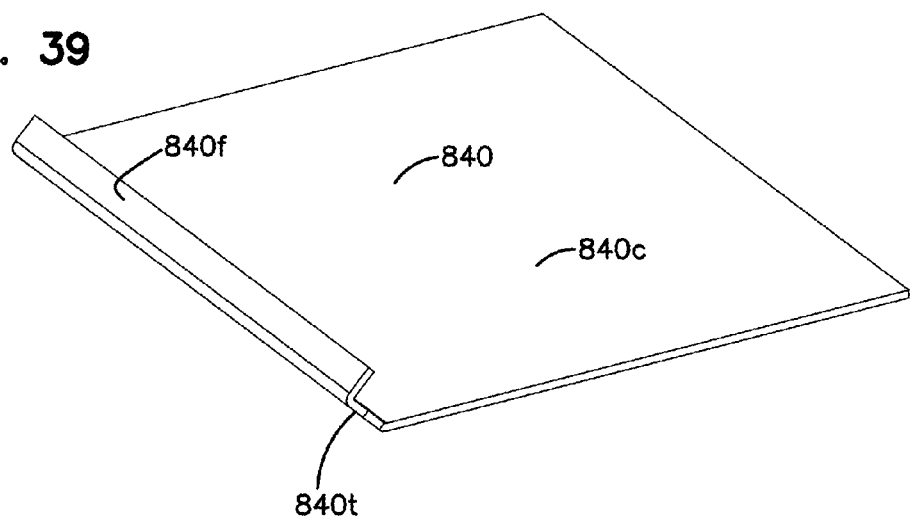
FIG. 39 is a schematic perspective view of an end panel component of the filter cartridge of FIGS. 33-38.
Figure 40:
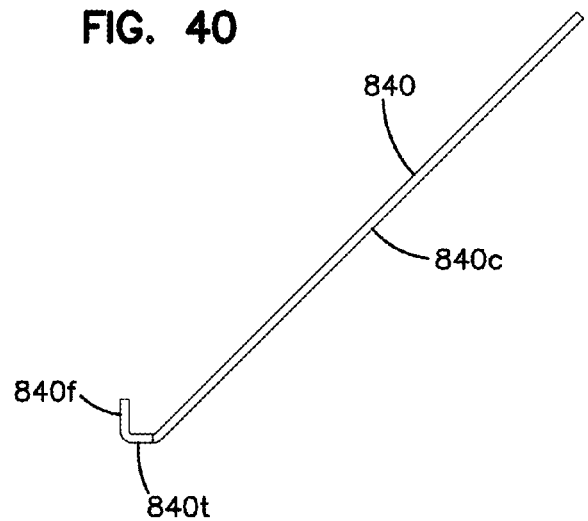
FIG. 40 is a schematic side elevational view of the end panel component of FIG. 39.
Figure 41:
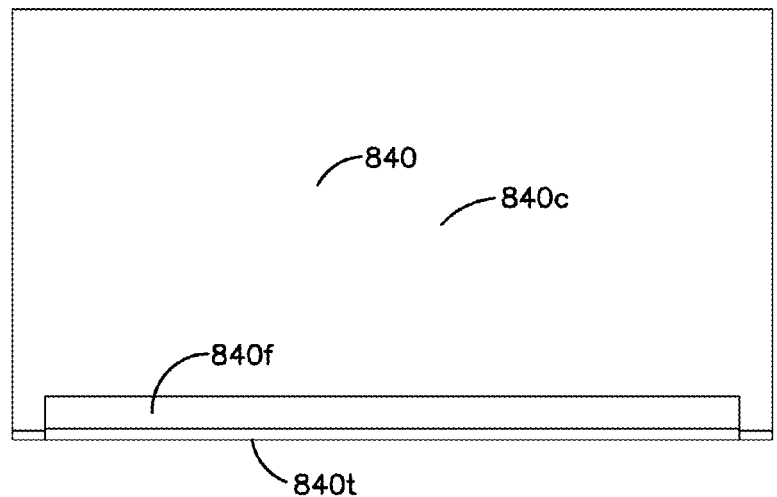
FIG. 41 is a schematic plan view of the end panel component of FIGS. 39 and 40.

In FIGS. 39-41, end panel 840 is depicted. It is noted that end panel 841 can comprise an analogous, identical panel. Referring to FIG. 39, end panel 840 comprises a preform of metal or plastic shaped to include: end cover section 840*c*, transition section 840*t* and seal support flange 840*f*.

Comparing FIGS. 39 and 37, panel section 840 would generally be adhered to an end, for example, end 821*y*, of the media pack 821 with an adhesive seal therebetween. The panel section 840 will be configured so that seal support flange 840*f* is appropriately positioned for mounting or positioning a portion of seal member 831 thereon.

A seal between the end 821*y* of the media pack 821 and end corner or panel 840 can be formed with a variety of adhesive of sealing materials, for example polyurethane can be used for this purpose.

In FIG. 40, a side elevational view of panel section 840 is depicted, and in FIG. 41 a plan view of panel section is viewable.

Again, section 841 can be an identical panel section to panel section 840, if desired.

Figure 42:
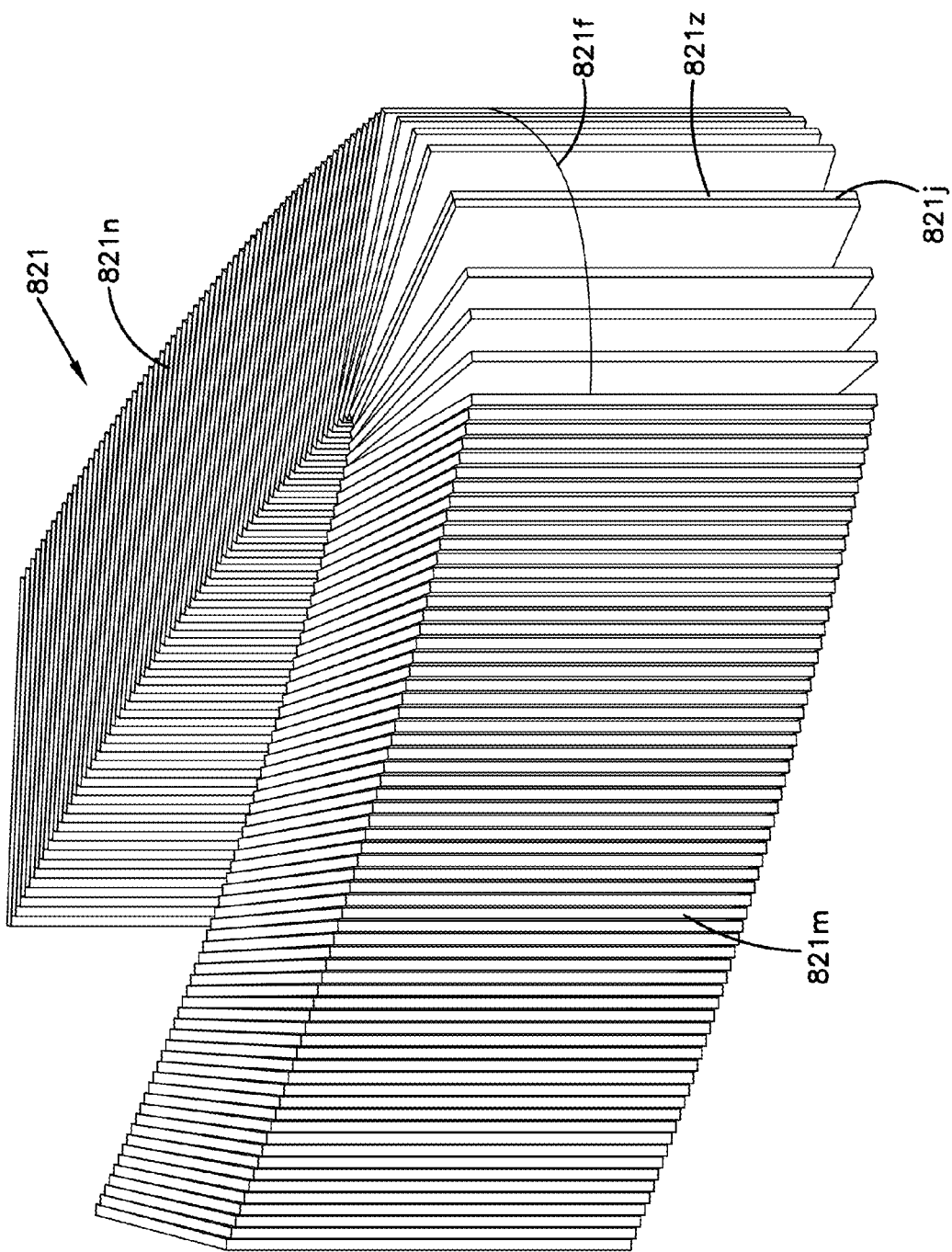
FIG. 42 is a schematic perspective view of the media pack of the filter cartridge of FIGS. 33-38.
Figure 43:
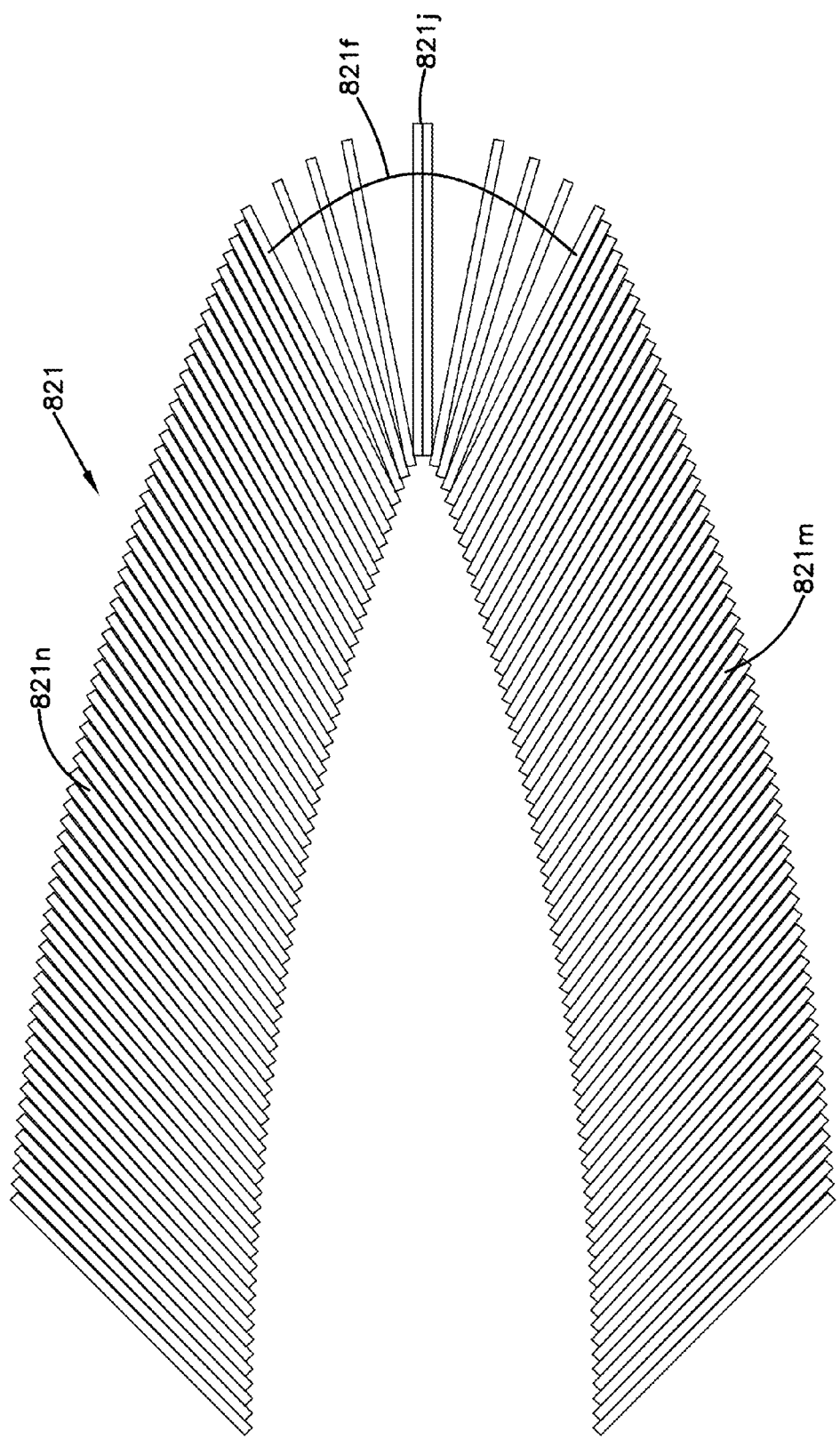
FIG. 43 is a schematic plan view of the media pack of FIG. 42.

In FIGS. 42 and 43, media pack 821 is schematically depicted. In FIG. 42 specifically, media pack 821 is viewable in perspective view, and in FIG. 43 in plan view.

It is noted that each of the views 42 and 43 is schematic, and individual features of each single facer strip are not viewable In general, referring to FIGS. 42 and 43, it can be seen that the two sides 821*m*, 821*n* are formed from separate media stacks, joined along joint 821*j*. Also that for each of the sides 821*m*, 821*n*, the arcuate, fanned, configuration depicted, is formed from a slanted stack.

Figure 44:
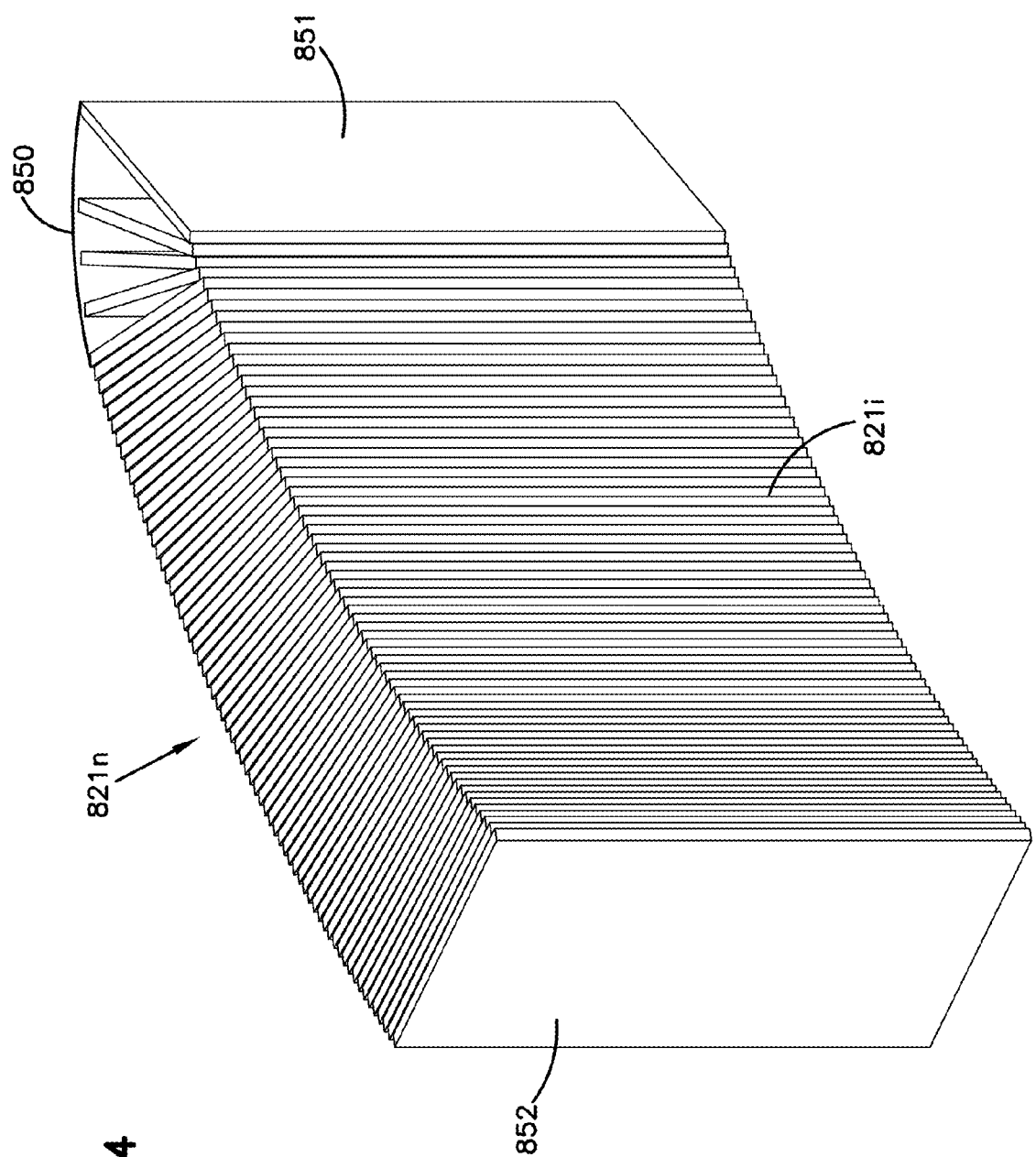
FIG. 44 is a schematic perspective view of a first media pack section of the media pack of FIGS. 42 and 43.
Figure 45:
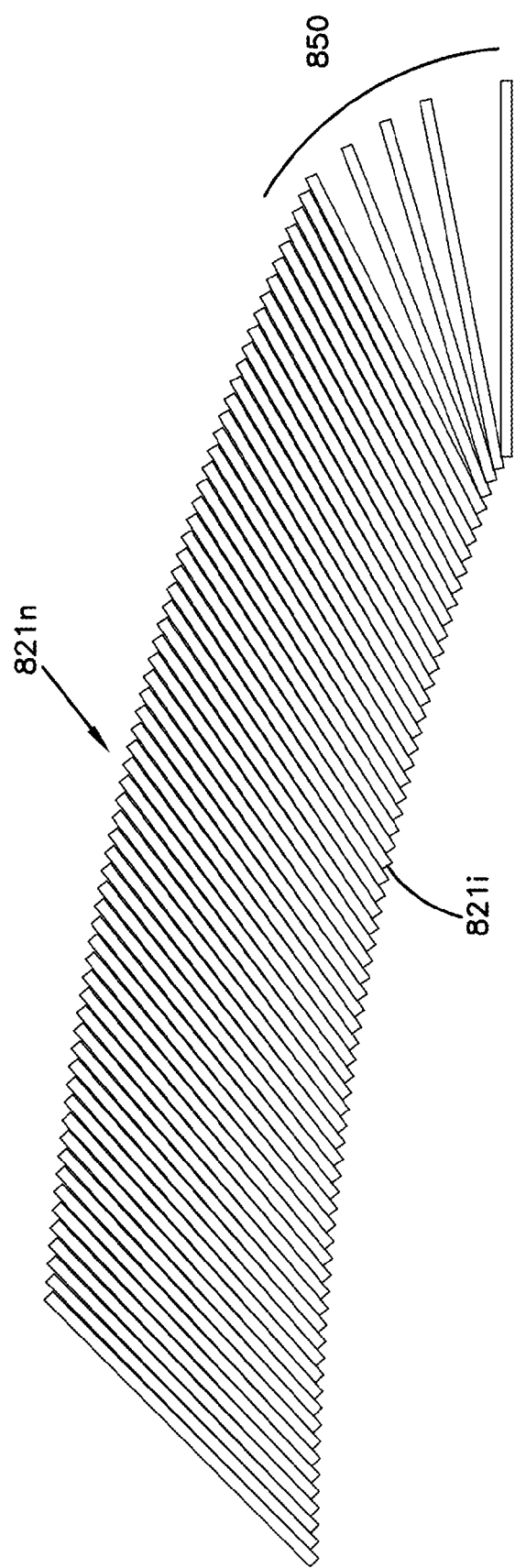
FIG. 45 is a schematic side plan view of the media pack of FIG. 44.

In FIGS. 44 and 45, one of the slanted stacks 821*n* is viewable. It is noted that the same stack can be used for section 821*m*, if reversed or flipped over.

Referring to FIGS. 44 and 45, the panel section 821*n* depicted, would typically include a stacking bead adjacent the inner surface 821*i*. In each figures, FIGS. 44, 45, arcuate, fanned, section 850 of the media pack 821*n* is viewable.

Still referring to FIGS. 44 and 45, it is noted that each media pack section 821*n* (and by comparison media pack section 821*m*) would include opposite end faces 851, 852 when the media pack section 821*n* is formed form a slanted stack as described herein above. One of faces 851, 852 would typically be corrugated; the other one of faces 851, 852 would typically comprise a flat sheet, although alternative constructions are possible. Which one of the faces 851, 852 is corrugated and which one of the faces 851, 852 is flat, is a matter of choice and is not critical to incorporation of the stack of a media pack section 821*n* into a media pack 821 as described herein. Further, and referring to FIG. 42, when the two sections 821*n*, 821*m* are brought together, there is no specific requirement that the joint 821*j* be formed from one corrugated sheet and one flat sheet, two corrugated sheets, or two flat sheets. In any of these alternatives, an appropriate seal can be obtained by providing one or more seal beads between the adjacent end faces of the two media packs 821*n*, 821*m*.

It is noted that although alternatives are possible, typically at least two seal beads will be used at the joint 821*j*: a first, along interior 821*i*, positioned for example adjacent stacking beads within search section 821*n*, 821*m*; and, typically, a second along outer edge 821*z*, FIG. 42. When this sealing bead 821*z*, is used, flow cannot readily enter joint 821*j* between the two media packs 821*n*, 821*m*. Such a bead may be desirable, for example, to prevent peeling apart of the media pack 821 at this location.

VII. Some Additional Media Pack Configurations, FIGS. 46-48

From principles described herein above, it will be understood that a wide variety of filter cartridges, with media pack configurations comprising z-filter media oriented with arcuate sections, can be made, using principles according to the present disclosure. Within the arcuate section, fanning can comprise spreading apart of layers along one arcuate face, or compression tighter of layers of one arcuate face.

Figure 46:
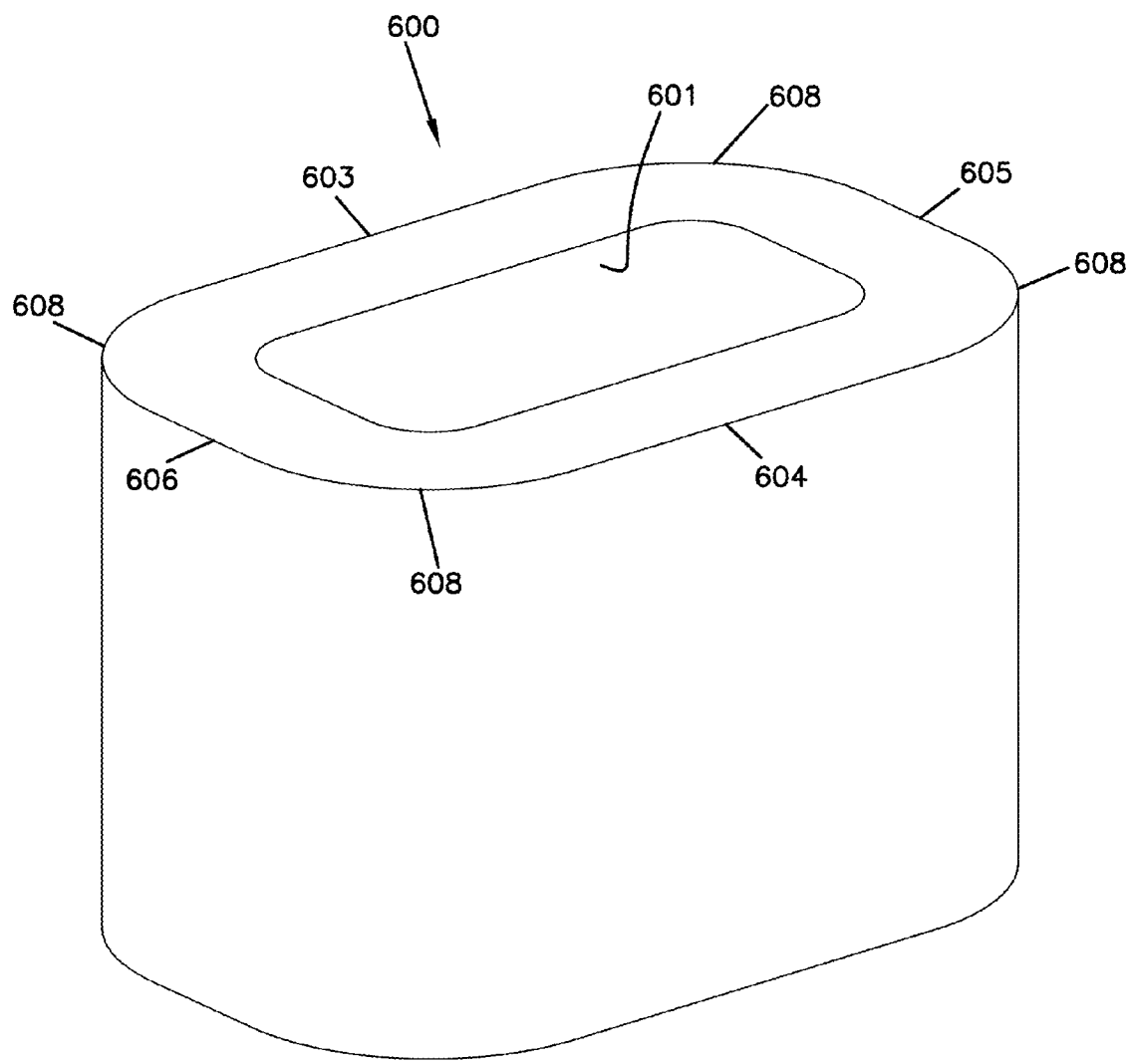
FIG. 46 is a schematic perspective view of a media pack configuration including multiple arcuate sections.
Figure 47:
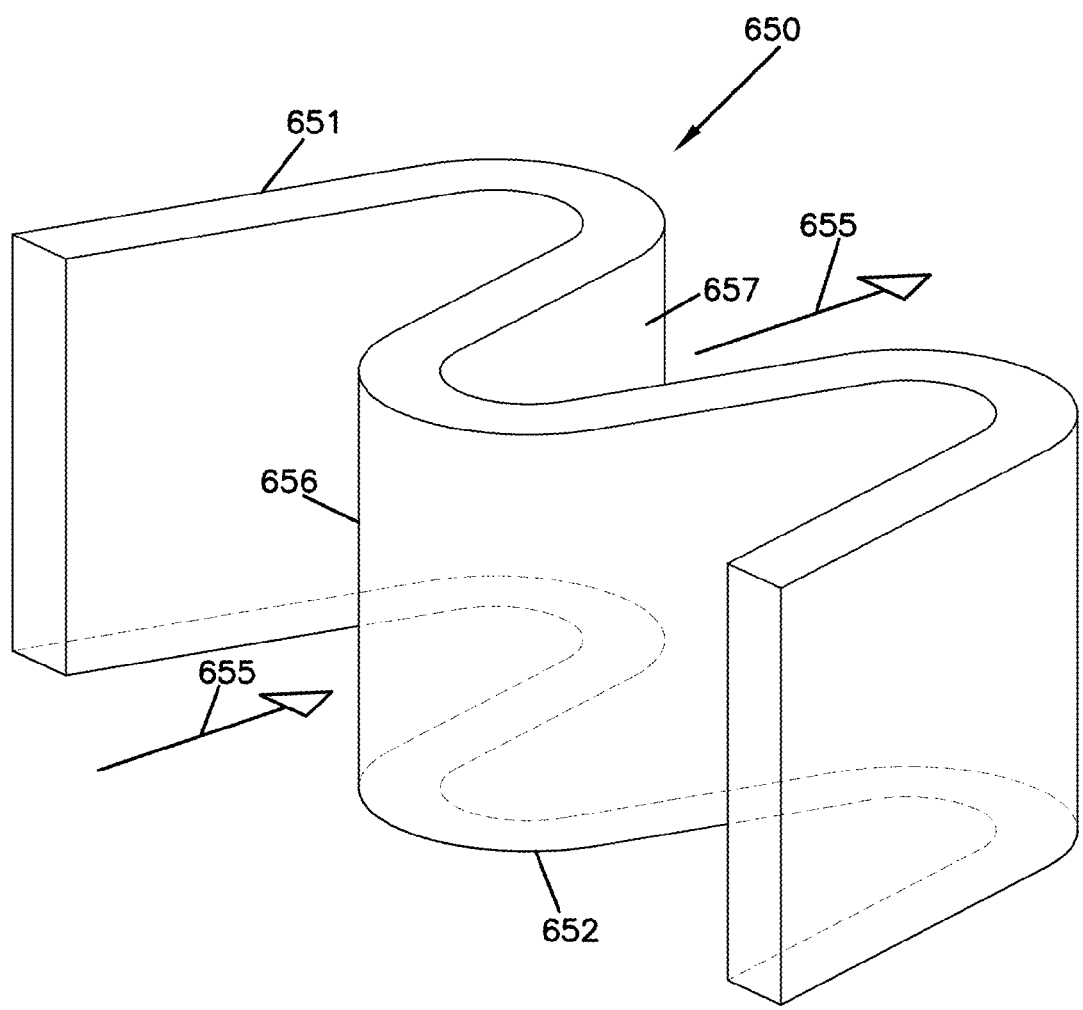
FIG. 47 is a schematic perspective view of a further alternate media pack configuration to those previously described herein; the media pack of FIG. 47 having multiple arcuate sections including at least two, adjacent, oppositely curved arcuate sections.
Figure 48:
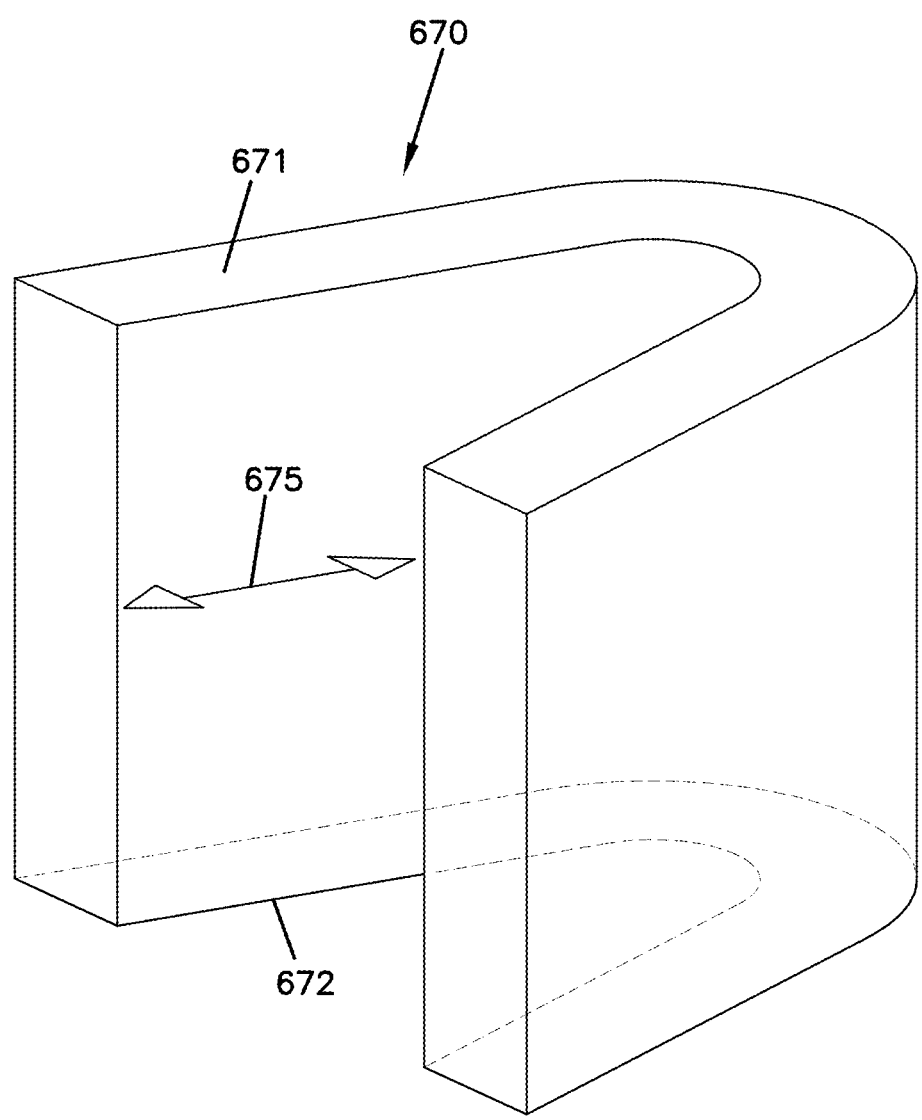
FIG. 48 is a schematic perspective view of a further example media pack configuration.

In FIGS. 46-48, some additional variations are depicted.

Referring to FIG. 46, a media pack configuration is depicted generally at 600. The media pack 600 is shown comprising z-filter media positioned as a closed loop in extension around an interior 601; the media pack 600 being defined as having a first pair of opposite sides 603, 604; a second pair of opposite sides 605, 606 and four arcuate corners 608; each corner 608, for example, comprising an arcuate, fanned, extension of z-filter media. The media pack 600 can be formed from one or more stacks of media. The media pack 600, then, comprises multiple arcuate sections, each carved in the same general direction (i.e. convex side out, concave side in).

A media pack in accord with media pack 600 can be incorporated into an air filter cartridge; for example by having end pieces in accord with the arrangement of FIG. 30, although alternatives are possible.

In FIG. 47, an additional, alternate, media pack 650 is depicted, extending with a generally M- or W-shape. End pieces can be positioned over opposite sides 651, 652 with an appropriate housing seal arrangement, to allow for filtering flow in the general direction of (or opposite to) arrows 655, as an example. It is noted that the media pack 650 can be formed from one or more stacks of media. Further, it is noted that a characteristic of the media pack 650 is that it has multiple arcuate sections, at least which two (adjacent) of which are curved in directions oppositely to one another. By "oppositely" in this context, it is meant that when looking at one of the flow faces 650, 657, at least one convex arcuate section and at least concave arcuate section are observed.

In FIG. 48 yet a further media pack 670 is depicted, here having a general arrow, arrowhead, or v-shape. Again, housing pieces could be positioned over opposite sides 671, 672 to provide filtering flow in a direction corresponding to one of the directions indicated by double head arrow 675.

VII. Some General Comments and Observations

According to the present disclosure, filter assemblies and components therefor, as well as methods of assembly and use, are described. There is no specific requirement that an apparatus or method include all of the features, characteristics or steps described herein, to obtain some benefit according to the present disclosure. There is also no requirement that an apparatus or method only include features, characterizations or steps described herein, to obtain some benefit according to the present disclosure.

According to an aspect of the present disclosure, a filter cartridge is provided. The filter cartridge can be an air filter cartridge, for example. The filter cartridge generally includes a media pack comprising at least a first stack including a plurality of single facer strips defining opposite inlet and outlet flow faces. Each one of the plurality of single facer strips comprises a sheet of fluted media secured to a sheet of facing media. The stack (of single facer strips) includes a stacking bead between adjacent single facer strips. The various stacking beads are typically each positioned adjacent a selected one of the flow faces of the media pack. By the term "adjacent" herein, it is meant that the stacking beads are either aligned with a selected flow face, or are spaced therefrom, but are relatively close thereto. Typically, then, the stacking bead is closer to one flow face than the other. Typically the stacking beads within the stack of (single facer strips) are positioned within 25 mm, typically within 12 mm and often within 5 mm of the selected flow face. In this context, the reference to the position of the stacking bead "within" a distance, means that at least an edge portion of the stacking bead is within that distance, and reference is not meant necessarily to the entire width of stacking bead.

Often, the stacking beads are positioned adjacent the outlet flow face of the media pack. However alternatives are possible; for example, arrangements are described herein in which the stacking bead is adjacent the inlet flow face of the media pack.

Herein, media packs are characterized in which the first stack (of single facer strips), or at least a portion thereof, is configured in an arcuate configuration. By the term "arcuate" in this context, it is meant that the stack (or portion of stack) is bent or curved over an arcuate shape; however no specific shape of arc is meant to be referenced, and it is not meant to be referenced that a single, constant, curvature is necessarily provided, unless otherwise stated. In some examples characterized, the arcuate curvature is typically either circular or elliptical; however alternatives are possible. The arcuate portion or configuration is in at least in a portion of at least one of the inlet and outlet flow faces; and, typically is in opposite portions of each, one side being convex the other side being concave.

It is noted that within a given media pack, more than one arcuate section or configuration can be provided, and in at least one example described, two oppositely curved arcuate sections are provided in the same media pack.

Further, the media pack can be formed from more than one media stack, with one or more of the media stacks having curved or arcuate sections or configuration therein. It is noted that adjacent media stacks, in a pack, need not necessarily all be positioned with the stacking bead adjacent the same flow face.

In some example configurations characterized herein, the arcuate section or configuration is formed by providing therein fanned strips. Herein, the term "fanned" is meant to indicate that adjacent strips of single facer, in an arcuate section, do not extend parallel to one another, but rather diverge outwardly from one another in extension from adjacent one flow face toward the other flow face. Typically the outward divergence, is an extension from the outlet flow face toward the inlet flow face. When this is the case and the stacking bead is adjacent the outlet flow face, it may be said that the single facer strips are "fanned apart" adjacent the inlet face or inlet flow face, relative to the outlet flow face. This can be accomplished by spreading apart strips or layers adjacent the inlet flow face.

Alternately, in some configurations the stacking bead is adjacent the inlet face, and the arcuate shape results from compressing together ends of strips adjacent the outlet flow face. Alternately stated, the layers can be spread apart adjacent an outside arc and be diverged; and, in some instances they can be compressed together adjacent an inside arc In a typical arrangement characterized herein, a stack (or stack portion) of single facer strips is configured with an arcuate configuration (section) extending over an internal arc of at least 30°, although alternatives are possible. By the term "internal arc" in this context, reference is meant to an angle between opposite end strips of the stack (of single facer strips) in the arcuate portion, which angle also extends through the media pack.

It is noted that the arcuate configuration can extend over an internal arc of up to 360°. When the arc is 360°, the stack of single facer strips is curved in a complete loop, around an open filter interior. Such a construction is sometimes referenced herein as "closed loop" construction. In a closed loop construction, the open filter interior is typically positioned adjacent the outlet flow face of the media pack, although alternatives are possible. It is noted that an example closed loop is provided herein, in which the media pack comprises a arcuate section separated by straight side sections, and thus the arcuate sections do not extend over an internal arc of 360°.

It will typically be that the stack of single facer strips (or stack portion) is configured with one or more arcuate configurations, or sections extending over an internal arc within the range of 30°-360°, inclusive. However, smaller arcs, for example 10°-30°, inclusive, can be used with some media packs according to the present disclosure.

When the media pack is configured in a closed loop, the closed loop can be provided with a variety of alternate cross-sectional configurations. An example is shown, in which the cross-sectional configuration is generally circular. An alternate configuration is shown, in which the cross-sectional configuration is oval, an example oval configuration characterized herein being elliptical. Herein the term "oval" in this context, is generally meant to refer to a cross-sectional configuration which is not circular, but which does have two opposite curved (or rounded) ends; and, which generally has a longest cross-section and a shortest cross-section orthogonal to one another. A shape which has two opposite curved ends, and two opposite sides extending between the rounded ends, which sides have central straight sections extending generally parallel to one another over an extended distance, would be included in the meaning of "oval". Such a shape, in some instances, may be characterized as "race track". Another shape which is intended to be within the meaning of "oval" as used herein, is elliptical.

Another example shape characterized herein, is one in which, in cross-section, the media pack can be characterized as configured with two sets of opposite parallel side sections, joined by four (4) curved corners.

Example cartridges are characterized herein, in which the media pack is positioned in extension between first and second end pieces; at least the first end piece including an aperture therethrough in air flow communication with an open, central, volume. An example such filter cartridge includes a seal member positioned on a side of the first end piece opposite the media pack. An example such seal member is depicted, which comprises an axial framework or housing seal, oriented for sealing engagement with a portion of a frame or housing during installation of the cartridge in an air cleaner assembly.

An example filter cartridge is characterized herein in which the aperture through the first end piece is a circular aperture. In an alternate example also characterized herein, the aperture through the first end piece is an oval (for example elliptical) aperture. Typically, a circular aperture will be used with the media pack having a circular cross-sectional configuration; and, an oval (for example elliptical) aperture will be used with a media pack having an oval (for example elliptical) cross-sectional configuration, but alternatives are possible.

In some example cartridges characterized herein, the second end piece also includes an aperture therethrough, in air flow communication with the open central volume. Further, the cartridge includes a second seal member positioned on a side of the second end piece opposite the media pack, the second seal member typically comprising an axial framework or housing seal member. The aperture in the second end piece can have a variety of shapes, example shapes corresponding to a circular shape and an elliptical shape. While alternatives are possible, a typical shape of the aperture in the second end piece, as with first end piece, will generally correspond with the cross-sectional shape of the media pack.

Example elliptical (oval) cartridges are characterized herein, in which the aperture(s) through the end piece(s), when oval shaped, is (are) also elliptical, with a length ratio of longest axis-to-shortest axis within the range of 2.1 to 1.3, inclusive. It is noted that alternatives to this can be practiced with techniques characterized herein.

When a cartridge comprises a media pack extending between first and second end pieces, and the end pieces have an aperture therethrough, the end pieces can be molded-in-place, or they can comprise a preformed construction, for example, a metal or plastic construction, to which the media pack is potted (i.e. secured). The housing seal member positioned on the various end pieces, can be preformed and be attached thereto with adhesive, or can be molded-in-place. For example, the end pieces can comprise sheet metal cut and shaped into the appropriate shape; and, the seal member can comprise a polymeric gasket adhered to the metal end piece with adhesive. In an alternative, the end pieces can comprise, molded-in-place, polyurethane; with the seal members comprising soft, compressible, molded-in-place foamed polyurethane.

Also characterized herein are filter cartridges in which the media pack is positioned with the single facer strips extending between first and second molded-in-place end pieces. Example molded-in-place end pieces will comprise polyurethane foam. A useable soft, molded-in-place polyurethane foam for this purpose, would be a foam having an as molded density no greater than 30 lbs/cu. ft. (0.46 g/cc) typically no greater than 15 lbs/cu. ft. (0.24 g/cc) and often no greater than 10 lbs/cu. ft. (0.16 g/cc); and, having a hardness, shore A, no greater than 30, typically no greater than 25 and often within the range of 12-20, inclusive, although alternatives are possible.

These constructions can be configured with a variety of types of framework or housing seal arrangements, and several examples are described. In one example, the framework or housing seal arrangement comprises a pinch seal molded-in-place in extension peripherally completely around a media pack and across the end pieces. A second example is provided in which the framework or housing seal arrangement comprises a radially directed seal, projecting from a flow face (typically an outlet flow face) of the media pack. A third example system is characterized in which the framework or housing seal arrangement comprises a seal member surrounding an outlet flow aperture in one of the end (side) pieces.

Example arrangements are described, in which the media pack has at least two curved arcuate sections, spaced from one another. An example is provided in which the at least two spaced curved arcuate sections are oppositely curved.

Another example arrangements are described herein in which the media pack is formed from more than one stack of media. Also examples are described in which the media pack is one or more blocked stacks, and other examples are described in which the media pack is made from one or more slanted stacks.

An example filter cartridge is provide herein having an arrow shape with a vertex and two sides.

Also according to an aspect of the present disclosure, an air filter assembly is provided. The air filter assembly generally includes a housing comprising housing body and an access cover, the housing including an air flow inlet and an air flow outlet. At least one (first) air filter cartridge in accord with selected ones of the characterization previously provided, is operably positioned within the housing, and generally is removable therefrom when the access cover is open. The (first) cartridge is typically sealed in the housing in such a manner such that air flow from the air flow inlet to the air flow outlet must pass through media of the media pack. A preferred configuration would be with the (first) air filter cartridge oriented such that the fanned face of the media pack, toward which the single facer strips diverge away from one another, is positioned as an inlet flow face. When the (first) cartridge is configured with the media pack as a closed loop, this would correspond to the outer periphery of the media pack.

The various features previously characterized for a filter cartridge can be incorporated in the air filter cartridge. In addition, the housing can be configured for positioning therein of more than one filter cartridge. An example housing is depicted that is configured for positioning therein of at least two, and in the example two, filter cartridges during use; the two cartridges being positioned vertically disposed with respect to one another, i.e. with one cartridge above the other. In the particular example depicted, each cartridge has an elliptical (oval) shape, and the cartridges are positioned with a longer axis of the elliptical (oval) shape oriented generally vertically.

In some applications of the techniques described herein, a filter cartridge has a closed loop configuration, and the housing includes at least one venturi member in air flow communication with an open, central, volume of the closed loop media pack.

In an aspect of the present disclosure, the air filter assembly includes a reverse pulse jet air cleaning system. In general, a pulse jet cleaning system is a system configured for selected direction of a pulse jet of gas (typically air) through the media pack of a filter cartridge in a direction opposite to a normal filtering flow, i.e., in a pulse jet direction from the outlet flow face toward the inlet flow face. Such a pulse of gas (air) will tend to blow dust off of the filter cartridge, for collection in a bottom of the air cleaner housing, and typically to be ejected therefrom by a dust ejector arrangement.

A typical pulse jet cleaning assembly includes a pulse jet valve/pulse director configured to selectively direct a pulse jet of gas typically (air) into the media pack. Typically in examples characterized herein, this pulse jet is directed through a tube sheet or wall, into an interior of the media pack. The assembly can include multiple pulse jet valve/pulse directors. In general, the pulse jet valve comprises a valve, for example actuated with solenoid switch central arrangement that opens to allow a pulse jet of gas from a compressed air tank to pass therethrough, selectively. A pulse director, typically a tube connected to or associated with the valve, is configured to direct a pulse from the valve in a selected direction. The term "pulse jet valve/pulse director" and variants thereof is meant to refer to operable combination of a pulse jet valve and pulse jet director.

A particular assembly is depicted, in which each media pack is associated with a venturi assembly. The venturi assembly is configured for passage therethrough of filtered air coming from the filter cartridge, and, in an opposite direction, a pulse jet from the pulse jet valve/distributor arrangement. The term "venturi" is generally meant to refer to a tube with has flared ends connected by a constricted middle, that provides for a venturi effect in flow or gas therethrough.

An example assembly is depicted, in which each air filter cartridge is associated with at least two at least venturi members, each venturi member being aligned for gas flow communication with an interior the same cartridge. The pulse arrangement includes a separate pulse jet valve/distributor arrangement associated with each venturi member. (In some alternate applications each air filter cartridge is associated with only one venturi member).

An example depicted configuration is one in which the cartridge has a generally oval (for example, elliptical) cross-sectional shape, with an oval (generally elliptically) shaped interior associated with two venturi members, of a venturi arrangement. The venturi members would typically be oriented vertically with respect to one another, and the cartridge would typically be oriented with a longer axis oriented vertically.

A yoke arrangement can be positioned within the housing, with an air filter cartridge fit thereover. In an example described, the yoke arrangement includes a first pair of vanes configured to form a barrier vane arrangement extending across an interior of a cartridge fit thereover. Each vane of a "barrier" vane arrangement, is typically impermeable gas to flow therethrough.

In an example characterized herein, the yoke arrangement includes a second pair of vanes forming a second vane arrangement extending generally orthogonal to the first (barrier) vane arrangement, with a vane extending on opposite sides of the first (barrier) vane arrangement. In an example depicted, the second pair of vanes is permeable, i.e., each one of the second pair has gas flow apertures therethrough.

In general terms, the vane arrangement comprises multiple vanes forming a yoke over which the cartridge is mounted, during installation. When the air cleaner assembly is configured for more than one cartridge, it could include more than one yoke.

In the example arrangements described herein, vane arrangements are characterized which include two pair of vanes; a first pair forming the first (barrier) vane arrangement and a second pair forming the second vane arrangement orthogonal to the barrier vane arrangement.

In an example arrangement depicted herein, a cartridge having an oval (for example elliptical) interior is fit over a yoke, with the barrier vane arrangement extending across an interior of the cartridge. The cartridge is aligned with two venturi members, each of which is oriented direct air flow to an opposite side of the barrier vane arrangement, from the other.

The air filter assembly can include a charge tank for compressed gas (typically air) to be used for the pulse jet. The assembly can include an appropriate control arrangement, for selective actuation to direct pulse jets as desired.

From the above general characterizations and descriptions, a variety of applications, techniques and features characterized herein can be understood. Again there is no specific requirement that an assembly or application include all of (or only) the features characterized herein, to obtain some benefit.

What is claimed:
1. An air filter cartridge comprising:
 (a) a media pack comprising at least a first stack including a plurality of single facer strips defining opposite inlet and outlet flow faces;
  (i) each one of the plurality of single facer strips in the first stack comprising a sheet of fluted media secured to a sheet of facing media;

(ii) the first stack including a stacking bead between adjacent single facer strips;

(iii) the first stack including at least a first portion configured in an arcuate configuration of individual single facer strips oriented with respect to one another to form the arcuate configuration having an internal angle of at least 10° and less than 360°, in at least a portion of at least one of the inlet and outlet flow faces;

(iv) the media pack being closed to passage of unfiltered air completely therethrough;

(v) the media pack being positioned in extension between first and second, opposite, end pieces; and, (b) a seal member positioned in extension around the media pack.

2. An air filter cartridge according to claim 1 wherein:
(a) the first portion of the first stack, that is configured in the arcuate configuration, defines an arcuate portion in the outlet flow face and an arcuate portion in the inlet flow face;
  (i) the single facer strips within the arcuate configuration being fanned apart adjacent a flow face.

3. An air filter cartridge according to claim 1 wherein:
(a) the media pack is positioned with the single facer strips extending between first and second, opposite, molded-in-place, end pieces.

4. An air filter cartridge according to claim 1 wherein:
(a) the media pack comprises a plurality of stacks each of which includes a plurality of single facer strips.

5. An air filter cartridge according to claim 4 wherein:
(a) each one of plurality of stacks includes at least one portion configured in an arcuate configuration.

6. An air filter cartridge according to claim 5 wherein:
(a) the filter cartridge comprises two stacks each of which comprise a slanted stack.

7. An air filter cartridge according to claim 1 wherein:
(a) the media pack includes a plurality of arcuate sections.

8. An air filter cartridge according to claim 7 wherein:
(a) the media pack includes at least two, spaced, oppositely curved arcuate sections.

9. An air filter cartridge according to claim 1 wherein:
(a) the media pack is formed from at least one blocked stack.

10. An air filter cartridge according to claim 1 wherein:
(a) the media pack is formed from at least one slanted stack.

11. An air filter cartridge according to claim 1 wherein:
(a) a stacking bead in the first portion of the first stack is positioned adjacent an inside arc of the arcuate configuration.

12. An air filter cartridge according to claim 1 wherein:
(a) a stacking bead in the first portion of the first stack is positioned adjacent an outside arc of the arcuate configuration.

13. An air filter cartridge according to claim 1 wherein:
(a) the media pack has opposite end strips and is arcuate in complete extension therebetween.

14. An air filter cartridge according to claim 13 wherein:
(a) the internal angle is less than 180°.

15. An air filter cartridge according to claim 14 wherein:
(a) the internal angle is smaller than a right angle.

16. An air filter cartridge according to claim 14 wherein:
(a) the internal angle is within the range of 10°-30°, inclusive.

17. An air filter cartridge according to claim 14 wherein:
(a) the internal angle is at least 30°.

18. An air filter cartridge according to claim 1 wherein:
(a) the internal angle is less than 180°.

19. An air filter cartridge according to claim 1 wherein:
(a) the internal angle is smaller than a right angle.

20. An air filter cartridge according to claim 1 wherein:
(a) the internal angle is at least 30°.

\* \* \* \* \*